US008412107B2

(12) United States Patent
Hamada et al.

(10) Patent No.: US 8,412,107 B2
(45) Date of Patent: Apr. 2, 2013

(54) ON-BOARD COMMUNICATION DEVICE AND COOPERATIVE ROAD-TO-VEHICLE/CAR-TO-CAR COMMUNICATION SYSTEM

(75) Inventors: Yuji Hamada, Tokyo (JP); Yoshitsugu Sawa, Tokyo (JP); Yukio Goto, Tokyo (JP); Shigeki Morita, Tokyo (JP); Yoshiaki Tsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 342 days.

(21) Appl. No.: 12/937,605

(22) PCT Filed: Mar. 26, 2009

(86) PCT No.: PCT/JP2009/056057
§ 371 (c)(1),
(2), (4) Date: Oct. 13, 2010

(87) PCT Pub. No.: WO2009/133740
PCT Pub. Date: Nov. 5, 2009

(65) Prior Publication Data
US 2011/0034201 A1 Feb. 10, 2011

(30) Foreign Application Priority Data
Apr. 30, 2008 (JP) ................................. 2008-118689

(51) Int. Cl.
*H04B 7/26* (2006.01)
(52) U.S. Cl. ....... 455/66.1; 455/447; 455/446; 455/260; 370/328; 370/428; 370/389; 370/474; 370/392
(58) Field of Classification Search .................... None
See application file for complete search history.

(56) References Cited

U.S. PATENT DOCUMENTS

| 6,081,718 | A * | 6/2000 | Ando et al. .................... 455/447 |
| 6,496,502 | B1 * | 12/2002 | Fite et al. ...................... 370/389 |
| 6,597,278 | B1 * | 7/2003 | Ando ........................... 340/5.25 |
| 8,233,389 | B2 * | 7/2012 | Yim et al. ..................... 370/229 |

(Continued)

FOREIGN PATENT DOCUMENTS

| JP | 2005 286756 | 10/2005 |
| JP | 2006 209333 | 8/2006 |

(Continued)

OTHER PUBLICATIONS

International Search Report issued Jun. 2, 2009 in PCT/JP09/056057 filed Mar. 26, 2009.

(Continued)

*Primary Examiner* — Edward Urban
*Assistant Examiner* — Ganiyu A Hanidu
(74) *Attorney, Agent, or Firm* — Oblon, Spivak, McClelland, Maier & Neustadt, L.L.P.

(57) ABSTRACT

An on-board communication device and a cooperative road-to-vehicle/car-to-car communication system that are adaptable to a road-to-vehicle communication system and a car-to-car communication system. The on-board communication device includes a car-to-car communication transfer service processing section, a car-to-car communication management service processing section, an application processing section, a transaction managing section, a transfer service processing section, a transmission/reception service processing section, and a transmission/reception service managing section, in which the car-to-car communication transfer service processing section and the car-to-car communication management service processing section include interfaces to the transfer service processing section that is an existing road-to-vehicle communication protocol.

15 Claims, 53 Drawing Sheets

U.S. PATENT DOCUMENTS 8,294,594 B2 * 10/2012 Goudy et al. ............... 340/905
2006/0193282 A1 * 8/2006 Ikawa et al. ............... 370/328

FOREIGN PATENT DOCUMENTS

| JP | 2008 11343 | 1/2008 |
| WO | 2005 039075 | 4/2005 |
| WO | 2005/039075 A1 | 4/2005 |

OTHER PUBLICATIONS

Chinese Office Action mailed on Jan. 14, 2013, issued for Chinese Application No. 200980120459.2 (with Partial English translation).

* cited by examiner

F I G . 4
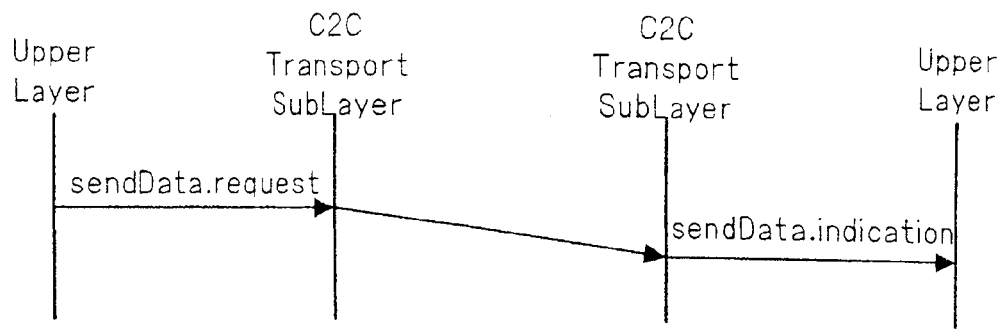
F I G . 5
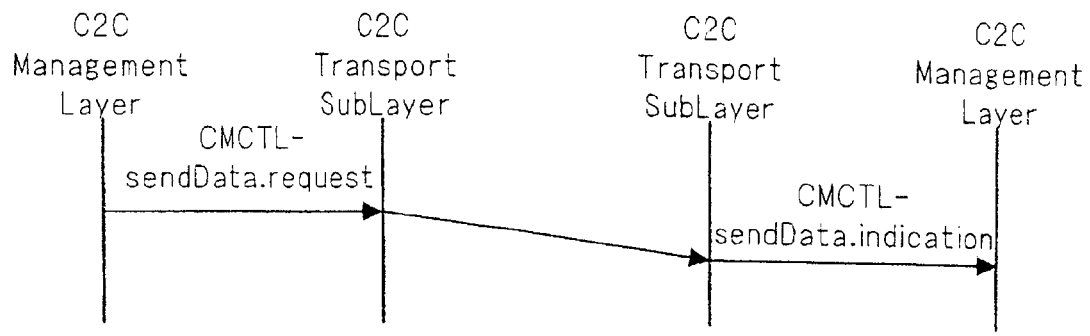
F I G . 6
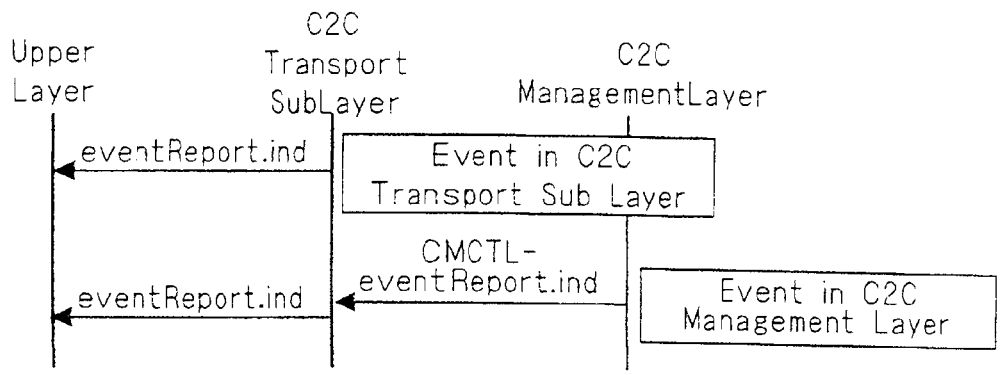

F I G . 1 6

| PRIMITIVE TYPE | ABBREVIATION | DESCRIPTION OF PRIMITIVE |
|---|---|---|
| Request | req | USED WHEN UPPER LAYER REQUESTS SERVICE FROM LOWER LAYER |
| Indication | ind | USED WHEN LOWER LAYER NOTIFIES UPPER LAYER OF SERVICE FROM COUNTERPART |
| Response | res | USED WHEN UPPER LAYER MAKES RESPONSE OF SERVICE FOR OPPOSITE APPLITATION TO LOWER LAYER |
| Confirm | cnf | USED WHEN LOWER LAYER NOTIFIES UPPER LAYER OF END OF REQUESTED SERVICE |

F I G . 1 7

| SYMBOL | DESCRIPTION |
|---|---|
| M(mandatory) | MANDATORY PARAMETER |
| C(conditional) | PARAMETER DESIGNATED IN A CASE OF BEING DESIGNATED BY IMMEDIATELY PRECEDING PRIMITIVE (req IN A CASE OF ind, res IN A CASE OF cnf) |
| O(optional) | OPTIONAL PARAMETER |
| (=) | INDICATING THAT VALUE OF PARAMETER IS EQUIVALENT TO THAT OF IMMEDIATELY PRECEDING PRIMITIVE (req IN A CASE OF ind, res IN A CASE OF cnf) |

FIG. 18

| SAP | primitive |
|---|---|
| ACML SAP (Application-C2C Management Layer SAP) | ACML-Connection.req |
| | ACML-Connection.cnf |
| | ACML-Notify.ind |
| | ACML-Registration.req |
| | ACML-Registration.ind |
| | ACML-Deregistration.req |
| | ACML-Deregistration.ind |
| | ACML-Get.req |
| | ACML-Get.ind |
| | ACML-Set.req |
| | ACML-Set.ind |
| ACTL SAP (Application-C2C Transport Sub Layer SAP) | sendData.req |
| | sendData.ind |
| | eventReport.ind |
| CMCTL SAP (C2C Transport Sub Layer -C2C Management Layer SAP) | CMCTL-SendData.req |
| | CMCTL-SendData.ind |
| | CMCTL-EventReport.req |
| | CMCTL-EventReport.ind |
| | CMCTL-Get.req |
| | CMCTL-Get.ind |
| | CMCTL-Set.req |
| | CMCTL-Set.ind |
| MLME - CML SAP (Media access control Layer Management Entity-C2C Management Layer SAP) | MLME-Set.req |
| | MLME-Set.ind |
| | MLME-Get.req |
| | MLME-Get.ind |
| PLME - CML SAP (Physical Layer Management Entity-C2C Management Layer SAP) | PLME-Set.req |
| | PLME-Set.ind |
| | PLME-Get.req |
| | PLME-Get.ind |

F I G . 1 9
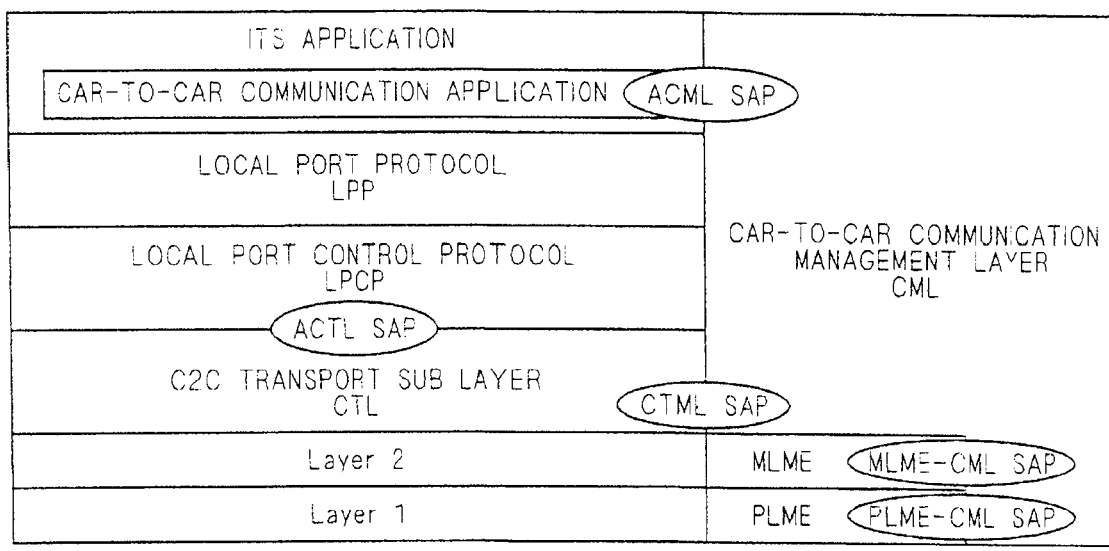

FIG. 20

| PRIMITIVE | ACML-Connection | |
|---|---|---|
| PARAMETER | req | cnf |
| portNo | M | M |
| serviceType | M | M |
| connectionFlag | M | — |
| destinationLID | O | O (=) |
| connectStatus | — | O |
| beaconFlag | O | — |

FIG. 21

| PRIMITIVE | ACML-Notify | |
|---|---|---|
| PARAMETER | req | ind |
| portNo | M | M |
| notifyCode | M | M |
| notifyParameter | O | O |

FIG. 22

| PRIMITIVE | ACML-Registration | |
|---|---|---|
| PARAMETER | req | ind |
| portNo | M | M (=) |
| priority | M | — |
| applicationType | O | — |
| resultCode | — | O |

F I G . 2 3

| PRIMITIVE | ACML-Deregistration | |
|---|---|---|
| PARAMETER | req | ind |
| portNo | M | M(=) |
| resultCode | — | M |

F I G . 2 4

| PRIMITIVE | ACML-Get | |
|---|---|---|
| PARAMETER | req | ind |
| mibIndex | M | M(=) |
| mibStatus | — | M |
| mibParameter | — | O |

F I G . 2 5

| PRIMITIVE | ACML-Set | |
|---|---|---|
| PARAMETER | req | ind |
| mibIndex | M | M(=) |
| mibStatus | M | M(=) |
| mibParameter | M | M(=) |

F I G . 2 6

| PRIMITIVE | sendData | |
|---|---|---|
| PARAMETER | req | ind |
| linkAddress | M | M |
| parameter | M | M(=) |

FIG. 27

| PRIMITIVE | eventReport | |
|---|---|---|
| PARAMETER | req | ind |
| linkAddress | — | M |
| eventCode | — | M |
| extensionParamter | — | O |

FIG. 28

| PRIMITIVE | CMCTL-SendData | |
|---|---|---|
| PARAMETER | req | ind |
| linkAddress | M | M(=) |
| pduIdentifier | M | M(=) |
| parameter | M | M(=) |
| priority | O | — |

FIG. 29

| PRIMITIVE | CMCTL-EventReport | |
|---|---|---|
| PARAMETER | req | ind |
| linkAddress | M | M |
| eventCode | M | M |
| extensionParamter | O | O |

FIG. 30

| PRIMITIVE | CMCTL-Get | |
|---|---|---|
| PARAMETER | req | ind |
| mibIndex | M | M(=) |
| mibStatus | O | M |
| mibParamter | O | O |

F I G . 3 1

| PRIMITIVE | CMCTL-Set | |
|---|---|---|
| PARAMETER | req | ind |
| mibIndex | M | M (=) |
| mibStatus | M | M (=) |
| mibParamter | M | O |

F I G . 3 2

| PRIMITIVE | MLME-Get | |
|---|---|---|
| PARAMETER | req | ind |
| mibIndex | M | M (=) |
| mibStatus | O | M |
| mibParamter | O | M |

F I G . 3 3

| PRIMITIVE | MLME-Set | |
|---|---|---|
| PARAMETER | req | ind |
| mibIndex | M | M (=) |
| mibStatus | M | M (=) |
| mibParamter | M | O |

F I G . 3 4

| PRIMITIVE | PLME-Get | |
|---|---|---|
| PARAMETER | req | ind |
| mibIndex | M | M (=) |
| mibStatus | O | M |
| mibParamter | O | M |

F I G . 3 5
| PRIMITIVE | PLME-Set | |
|---|---|---|
| PARAMETER | req | ind |
| mibIndex | M | M (=) |
| mibStatus | M | M (=) |
| mibParamter | M | O |
F I G . 3 6
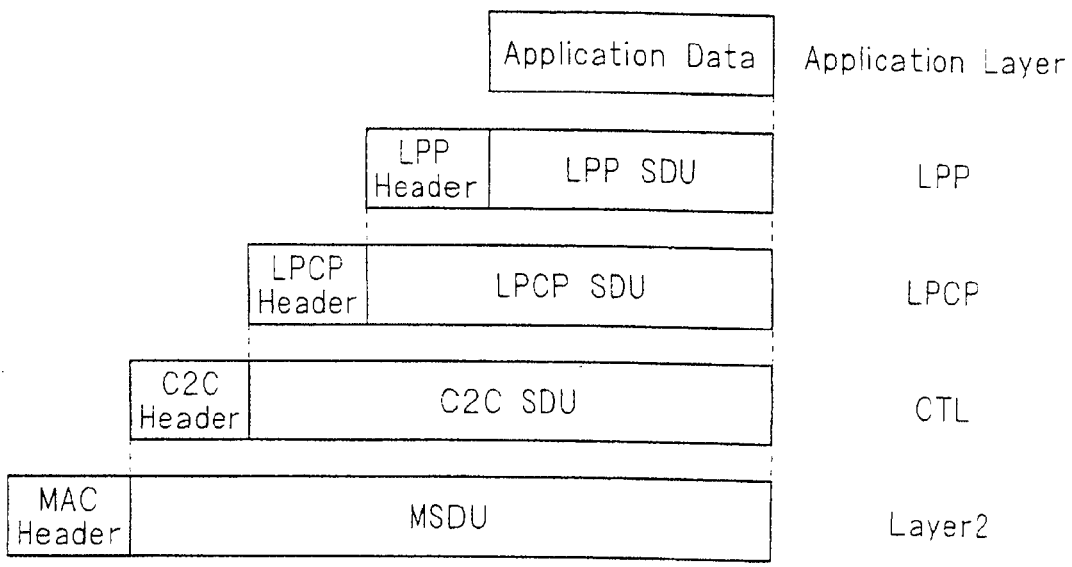
F I G . 3 7
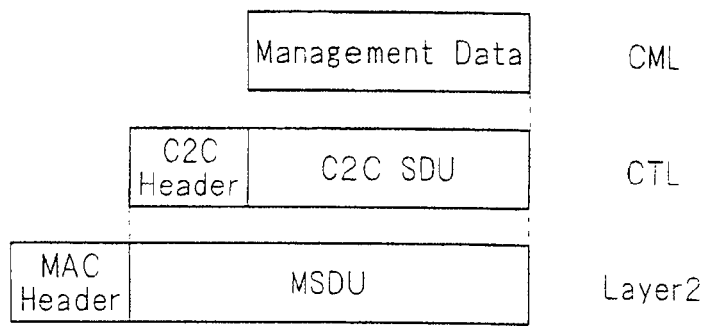

|   | 7 (MSB) | 6 | 5 | 4 | 3 | 2 | 1 | 0 (LSB) |
|---|---|---|---|---|---|---|---|---|
| 1 | Data Identifier | PDU Identifier | | | Node Priority | | | |
| 2 | Channel Occupancy | | | | | | | |
| 3 | Cyclic Interval | | | | | | | |
| 4 | Transmission Power | | | | | | | |
| 5 | Receiver Sensitivity | | | | | | | |
| 6 | Reserved | | | | | | | |
| 7 | | | | | | | | |
| 8 | | | | | | | | |

*Fig.38*

| Data Identifier | PDU Identifier | PDU |
|---|---|---|
| 0 | 0 | CAR-TO-CAR COMMUNICATION Application PDU |
| | 1 | ROAD-TO-CAR COMMUNICATION Application PDU |
| | 2 | Event PDU |
| | 3-7 | Reserved |
| 1 | 0 | Beacon PDU |
| | 1 | Connect Request PDU |
| | 2 | Connect Response PDU |
| | 3-7 | ACK PDU |
| | 4 | Congestion Control PDU |
| | 5-7 | Reserved |

|   | 7(MSB) | 6 | 5 | 4 | 3 | 2 | 1 | 0(LSB) |
|---|---|---|---|---|---|---|---|---|
| 1 | TSF Timer ||||||||
| ⋮ | ||||||||
| 10 | ||||||||
| 11 | Next Beacon Transmission Timing ||||||||
| 12 | ||||||||
| 13 | CML Profile ||||||||
| ⋮ | ||||||||
| n | ||||||||

FIG. 41

|   | 7(MSB) | 6 | 5 | 4 | 3 | 2 | 1 | 0(LSB) |
|---|---|---|---|---|---|---|---|---|
| 1 | Required Ack Flag | Retransmit Flag | Reserved |||||| 
| 2 | Sequence Number ||||||||
| 3 | CML Profile ||||||||
| ⋮ | ||||||||
| n | ||||||||

FIG. 42

|   | 7(MSB) | 6 | 5 | 4 | 3 | 2 | 1 | 0(LSB) |
|---|---|---|---|---|---|---|---|---|
| 1 | Result Code ||||||||
| 2 | Required Ack Flag | Retrans-mit Flag | Reserved ||||||
| 3 | Sequence Number ||||||||
| 4 | Profile Flag | Reserved |||||||
| 5 | CML Profile ||||||||
| ⋮ | ||||||||
| n | ||||||||

| VALUE | MEANING | NOTIFICATION TARGET | REMARKS |
|---|---|---|---|
| 0 | PROHIBITED TO USE | — | |
| 1-3 | UNUSED | — | |
| 4 | CONNECTED | OPPOSITE STATION | |
| 5 | NOT TO BE CONNECTED | OPPOSITE STATION | |
| 6 | NO APPLICATION TO BE CONNECTED | OPPOSITE STATION | |
| 7-127 | reservedorFutureUse | — | |

*Fig. 43*

| | 7 (MSB) | 6 | 5 | 4 | 3 | 2 | 1 | 0 (LSB) |
|---|---|---|---|---|---|---|---|---|
| 1 | Retransmit Flag | Reserved | | | | | | |
| 2 | Sequence Number | | | | | | | |

*Fig. 44*

| | 7 (MSB) | 6 | 5 | 4 | 3 | 2 | 1 | 0 (LSB) |
|---|---|---|---|---|---|---|---|---|
| 1 | Transmission Power for others | | | | | | | |
| 2 | Transmission Interval for others | | | | | | | |
| 3 | Receiver Sensitivity for others | | | | | | | |
| 4 | Reserved | | | | | | | |
| ⋮ | | | | | | | | |
| n | | | | | | | | |

*Fig. 45*

| | 7 (MSB) | 6 | 5 | 4 | 3 | 2 | 1 | 0 (LSB) |
|---|---|---|---|---|---|---|---|---|
| 1 | eventCode ||||||||
| 2 | extensionParameter ||||||||
| ⋮ | |||||||||

*Fig. 46*

| VALUE | MEANING | NOTIFICATION TARGET | DETAILS OF ExtensionParameter |
|---|---|---|---|
| 0 | PROHIBITED TO USE | | N/A |
| 1 | NO DATA IDENTIFIER | OPPOSITE STATION | OPTION |
| 2 | NO PDU IDENTIFIER | OPPOSITE STATION | OPTION |
| 3 | THIS FUNCTION IS NOT SUPPORTED | OPPOSITE STATION | OPTION |
| 4 | NOTIFICATION OF COMMUNICATION CONNECTION | OWN STATION | N/A |
| 5 | NOTIFICATION OF COMMUNICATION DISCONNECTION | OWN STATION | N/A |
| 6 | DESIGNATED GROUP BROADCAST LINK ADDRESS IS NOT VALID | OWN STATION | N/A |
| 7 | COMMUNICATION LOWER PROTOCOL IS NOT CONNECTED | OWN STATION | N/A |
| 8 | TRANSMISSION DESTINATION PORT NUMBER IS NOT VALID | OPPOSITE STATION | N/A |
| 9-127 | reservedorFutureUse | — | |

*Fig. 47*

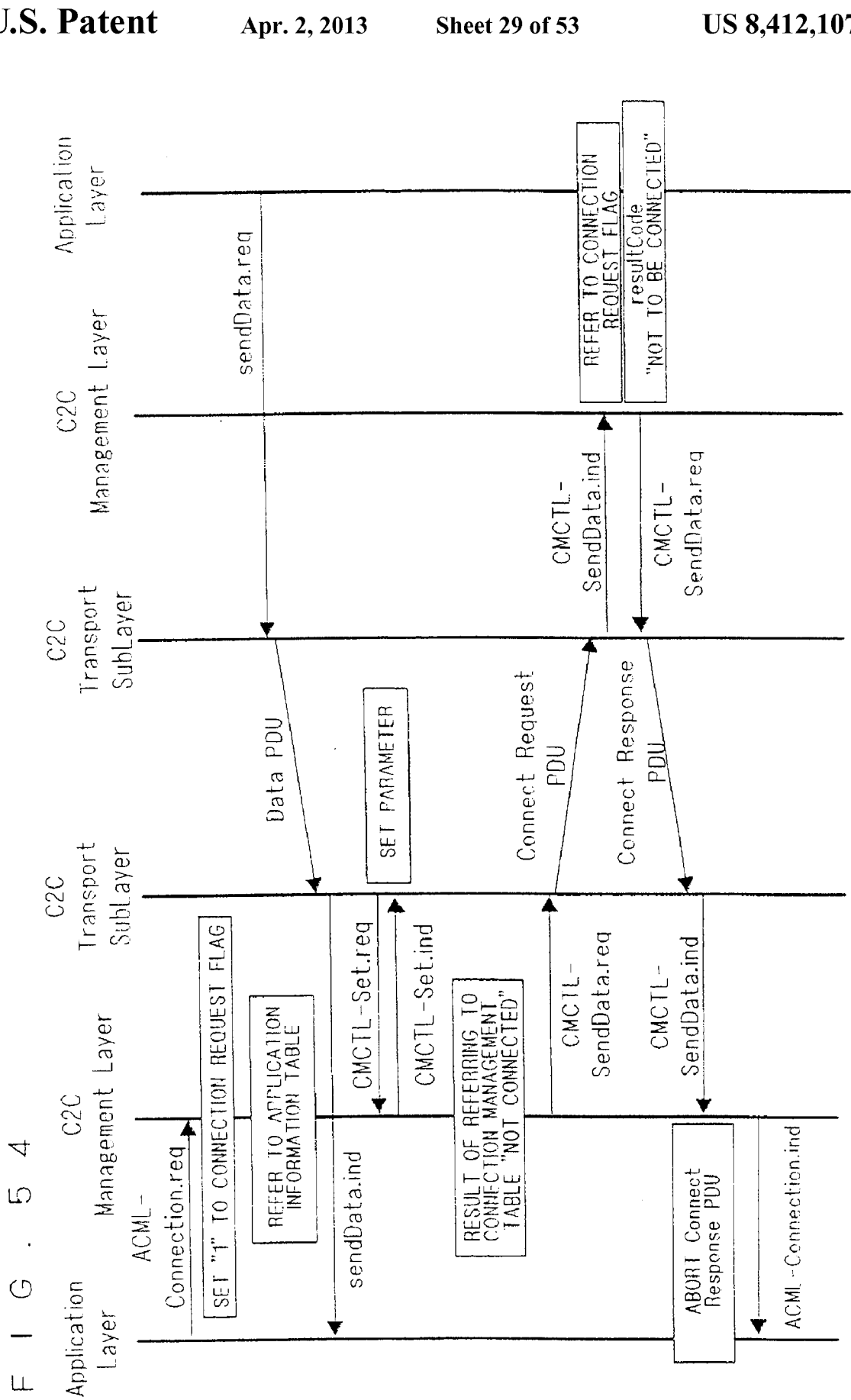

F I G. 5 5
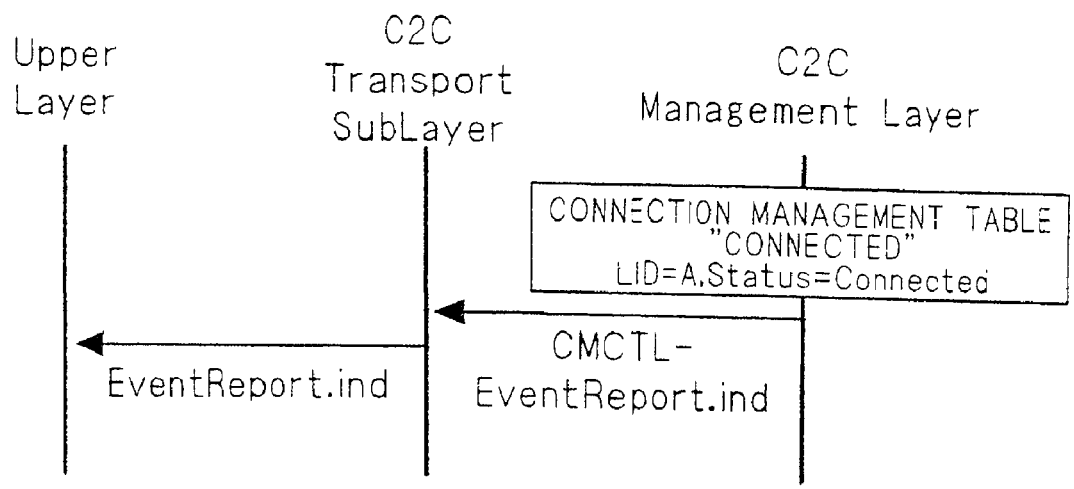
F I G. 5 6
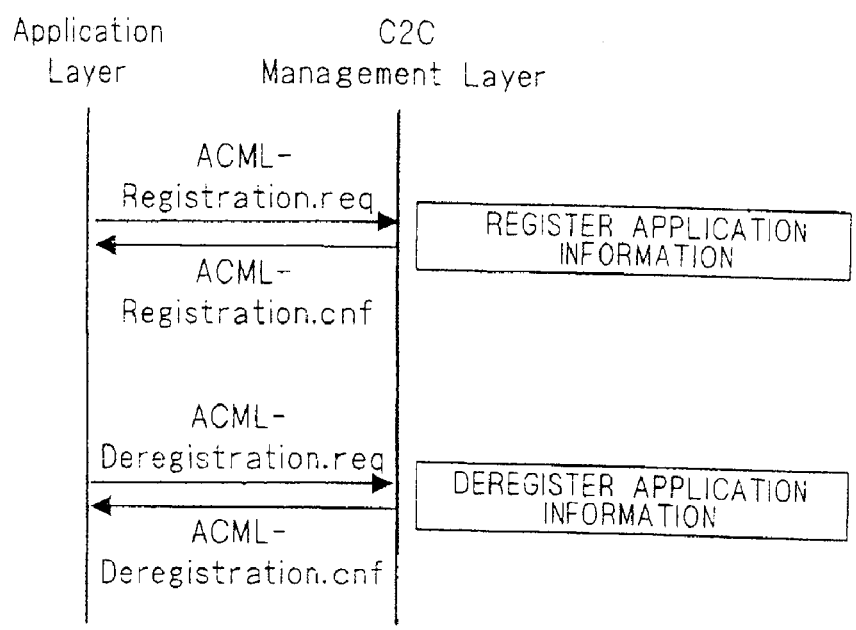

| | 7 (MSB) | 6 | 5 | 4 | 3 | 2 | 1 | 0 (LSB) |
|---|---|---|---|---|---|---|---|---|
| 1 | Data Identifier | PDU Identifier | | | Reserved | | | |
*Fig. 74*
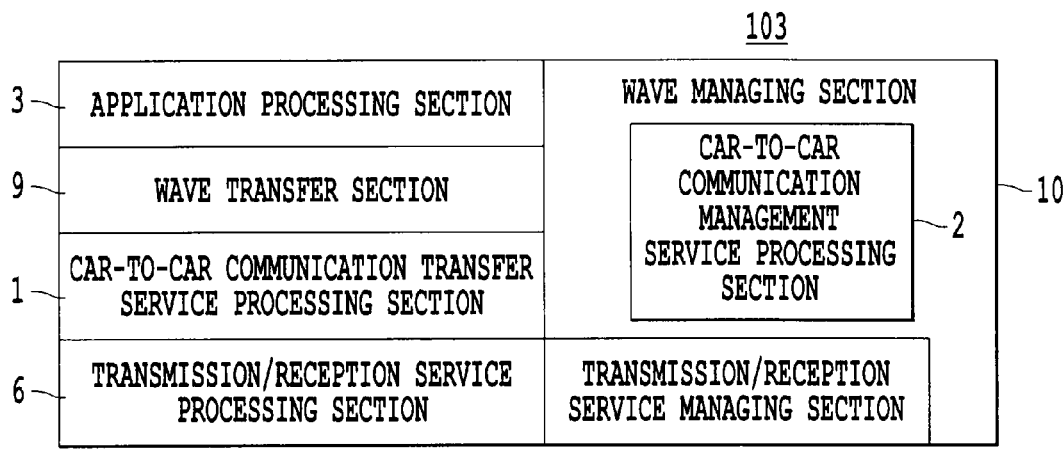
*Fig. 75*
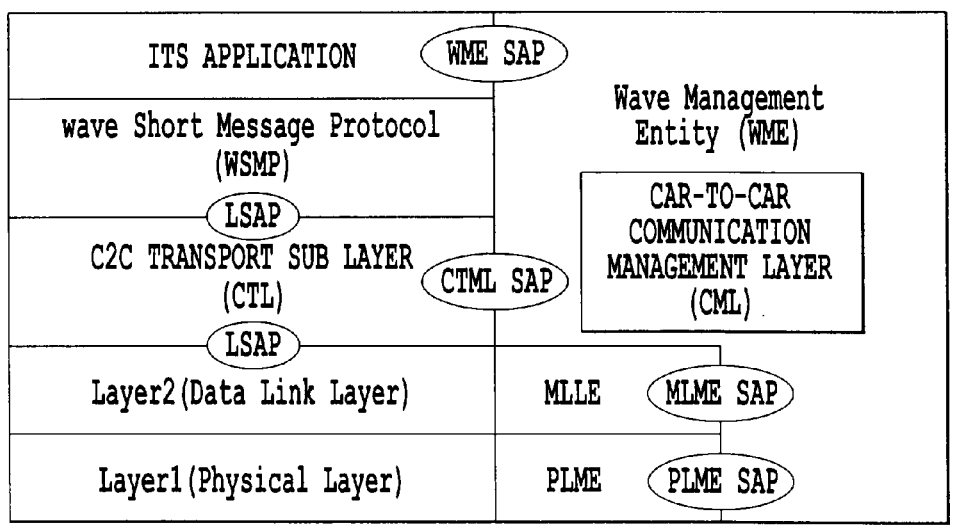
*Fig. 76*

| SAP | primitive | CORRESPONDING PRIMITIVE OF FIRST EMBODIMENT |
|---|---|---|
| WME SAP | WME-Application.request | ACML-Connection |
| | WME-Application.confirm | |
| | WME-Application.indication | |
| | WME-Application.response | |
| | WME-Notification.indication | ACML-Notify |
| | WME-ApplicationRegistration.request | ACML-Registration |
| | WME-Application.Registration.confirm | ACML-Deregistration |
| | WME-Get.request | ACML-Get |
| | WME-Get.confirm | |
| | WME-Set.request | ACML-Set |
| | WME-Set.confirm | |
| | WME-RCPIREQUEST.request | |
| | WME-RCPIREQUEST.indication | |
| LSAP | UL-UNITDATA.request | SendData |
| | UL-UNITDATA.indication | |

*Fig. 77*

| SAP | primitive | CORRESPONDING PRIMITIVE OF FIRST EMBODIMENT |
|---|---|---|
| A-SAP | A-Command.request | ACML-Connection ACML-Notify ACML-Registration ACML-Deregistration |
| | A-Command.confirm | |
| | A-Request.reuqest | |
| | A-Request.confirm | |
| | A-SetParam.request | ACML-Set |
| | A-SetParam.confirm | |
| | A-GetParam.request | ACML-Get |
| | A-GetParam.confirm | |
| C-SAP | UL-UNITDATA.request | SendData |
| | UL-UNITDATA.indication | |
| W-SAP | CIMAE-SetParam.request | MLME-Set |
| | CIMAE-SetParam.confirm | PLME-Set |
| | CIMAE-GetParam.request | MLME-Get |
| | CIMAE-GetParam.confirm | PLME-Get |

*Fig.80*

ON-BOARD COMMUNICATION DEVICE AND COOPERATIVE ROAD-TO-VEHICLE/CAR-TO-CAR COMMUNICATION SYSTEM

TECHNICAL FIELD

The present invention relates to an on-board communication device and a cooperative road-to-vehicle/car-to-car communication system that provide services to mobile stations using car-to-car communications carried out between mobile stations running on a road as well as road-to-vehicle communications carried out between a base station device installed on a road and mobile stations.

BACKGROUND ART

Nowadays, commercialization of driving safety support systems utilizing an on-board communication device that performs car-to-car communication is being considered. In this case, an information exchange application that transmits/receives information of own car between cars per certain cycle is typically used in the on-board communication device. Moreover, in the car-to-car communication system, it is known that a carrier sense multiple access (CSMA) system has been conventionally used as an access system such that each car transmits information by itself.

When an information exchange application is used in the CSMA system, in a case where the number of cars positioned in a communication area increases, communication traffic increases to exceed a communication capacity. Therefore, it is conceivable that congestion in which the reliability of communication deteriorates may occur, information through car-to-car communication may not be transmitted reliably, and accordingly safety support services cannot be provided.

Patent Document 1 discloses, in order to prevent congestion from occurring in a car-to-car communication system, the method of avoiding congestion by controlling a cyclic interval (controlling an information amount) of own car based on a dangerous situation of a car and a traffic amount of a communication path.

Further, it is assumed that in addition to an information exchange application, multiple applications such as an application that transmits emergency information will be used in a car-to-car communication system. Moreover, in order to provide those applications, messages need to be retransmitted or divided and assembled.

Therefore, the method of using a local port control protocol (LPCP) for correspondence with a multi-application and using a local port protocol (LPP) for correspondence with retransmission or division and assembly of a message in a road-to-vehicle communication system is disclosed in Patent Document 2 and the standard "dedicated short-range communication (DSRC) application sub layer ARIB STD-T88" defined by the association of radio industries and businesses (laid down May 25, 2004).

Patent Document 1: Japanese Patent Application Laid-Open No. 2006-209333
Patent Document 2: WO 2005-039075

DISCLOSURE OF INVENTION

Problems to be Solved by the Invention

In the on-board communication device described in Patent Document 1, communications are controlled on the assumption of only single application as an information exchange application, and thus is not adaptable to communication control when other multiple applications such as an emergency application are used at the same time. In addition, in the on-board communication device described in Patent Document 1, a communication band cannot be saved for other multiple applications such as an emergency application.

Further, in the on-board communication device described in Patent Document 1, congestion is avoided by controlling only communication of own car, which causes a problem that a traffic amount of an entire network cannot be reduced instantly through communication control of own car.

In the roadside-to-vehicle communication system described in Patent Document 2, correspondence with a multi-application is enabled by a local port control protocol, and messages are retransmitted and divided/assembled by a local port protocol, but correspondence with congestion control and priority control, which are required in car-to-car communication, are not enabled.

Further, in the roadside-to-vehicle communication system described in Patent Document 2, a connection status of dedicated short range communication (DSRC) is managed by a local port protocol, but a procedure of initial connection is not defined in the local port protocol. Accordingly, the roadside-to-vehicle communication system described in Patent Document 2 cannot be directly employed in a car-to-car communication system.

The present invention has been made to solve the above-mentioned problems, and an object thereof is to provide an on-board communication device and a cooperative road-to-vehicle/car-to-car communication system that perform communication control for avoiding information congestion, provide procedures of establishing priority control and initial connection required for a car-to-car communication system, are adaptable to multiple applications, are capable of retransmitting and dividing/assembling messages, and are adaptable to a road-to-vehicle communication system and a car-to-car communication system.

Means to Solve the Problem

An on-board communication device according to claim 1 of the present invention, which is mounted in mobile stations or a base station and serves as a receiving side or a transmitting side between the mobile stations and between the mobile stations and the base station through wireless communication, includes: an application processing section periodically transmitting messages to the on-board communication device on the receiving side; a transaction managing section connected to the application processing section and providing at least transaction services including retransmission and division/assembly of the messages received from the application processing section; a transfer service processing section connected to the transaction managing section and adding, to the messages received from the transaction managing section, local port numbers for identifying upper protocols including the application processing section; a car-to-car communication transfer service processing section connected to the transfer service processing section, transmitting the messages received from the transfer service processing section to the on-board communication device on the receiving side in an order of priorities of applications processed by the application processing section, transmitting/receiving the messages to the transfer service processing section, and notifying event information including error information; a transmission/reception service processing section connected to the car-to-car communication transfer service processing section and transmitting/receiving the messages received from the car-to-car communication transfer service processing section to/from the on-board communication device on the receiving side through wireless communication; and a car-to-car communication management service processing section connected to the application processing section and the car-to-car communication transfer service processing section, having the priority set by the application processing section, and notifying the priority in response to a request from the car-to-car communication transfer service processing section, wherein: the transaction managing section and the transfer service processing section constitute a road-to-vehicle communication protocol for performing road-to-vehicle communication between the mobile stations and the base station; the car-to-car communication transfer service processing section notifies the on-board communication device on the receiving side of communication control information of the car-to-car communication management service processing section; and the on-board communication device on the receiving side transmits, in the car-to-car communication transfer service processing section, the communication control information provided to the received messages to the car-to-car communication management service processing section, the received messages being transmitted to the transfer service processing section.

An on-board communication device according to claim 8 of the present invention, which is mounted in mobile stations or a base station and serves as a receiving side or a transmitting side between the mobile stations and between the mobile stations and the base station through wireless communication, includes: an application processing section transmitting messages from the transmitting side to the receiving side using road-to-vehicle communication and car-to-car communication; a cooperative road-to-vehicle/car-to-car communication service processing section providing transaction services including retransmission and division/assembly of the messages received from the application processing section, adding local port numbers for distinguishing upper protocols including the application processing section, and identifying transmission destinations of the messages in accordance with the upper protocols; a car-to-car communication transfer service processing section transmitting the messages received from the cooperative road-to-vehicle/car-to-car communication service processing section to the on-board communication device on the receiving side in an order of priorities of applications processed by the application processing section; a transmission/reception service processing section providing identifies for identification to the messages provided via the car-to-car communication transfer service processing section and the messages directly provided from the cooperative road-to-vehicle/car-to-car communication service processing service, to thereby transmit the messages to the on-board communication device on the receiving side through wireless communication; and a car-to-car communication management service processing section having the priority set by the application processing section, and notifying the priority in response to a request from the car-to-car communication transfer service processing section, wherein: the cooperative road-to-vehicle/car-to-car communication service processing section distinguishes whether to transmit the messages received from the application processing section by road-to-vehicle communication or car-to-car communication, provides the messages directly to the transmission/reception service processing section in a case of the road-to-vehicle communication, and provides the messages to the transmission/reception service processing section via the car-to-car communication transfer service processing section in a case of the car-to-car communication; and the transmission/reception service processing section of the on-board communication device on the receiving side transmits the messages to the cooperative road-to-vehicle/car-to-car communication service processing section or the car-to-car communication transfer service processing section, based on the identifies provided to the messages received from the on-board communication device on the transmitting side.

Effects Of The Invention

According to the on-board communication device of Claim 1 of the present invention, the car-to-car communication transfer service processing section and the car-to-car communication management service processing section are provided to the transaction managing section and the transfer service processing section that are existing road-to-vehicle communication protocols, whereby it is possible to obtain an on-board communication device that shares an on-board device that provides a road-to-vehicle communication system and an on-board device that provides a car-to-car communication system. Accordingly, it is possible to provide services to the road-to-vehicle communication system as well as the car-to-car communication system. In addition, the car-to-car communication transfer service processing section and the car-to-car communication management service processing section provide a priority per application, which enables priority control. Accordingly, it is possible to reduce a communication delay. Further, the cooperative road-to-vehicle/car-to-car communication system is configured with the on-board communication device, whereby it is possible to obtain a system enabling the above-mentioned services.

According to the on-board communication device of claim 8 of the present invention, the cooperative road-to-vehicle/car-to-car communication service processing section is provided, whereby the data of road-to-vehicle communication can be transmitted not via the car-to-car communication transfer service processing section, while the data of car-to-car communication can be transmitted to the counterpart via the car-to-car communication transfer service processing section after the required control is performed. In addition, the cooperative road-to-vehicle/car-to-car communication system is configured with the on-board communication device, whereby it is possible to obtain a system enabling the above-mentioned services.

BRIEF DESCRIPTION OF DRAWINGS

FIG. 4 is a diagram showing an example of an application data transfer procedure in a data transfer service according to the first embodiment of the present invention.

FIG. 5 is a diagram showing an example of a control data transfer procedure in the data transfer service according to the first embodiment of the present invention.

FIG. 6 is a diagram showing an example of an event notification service according to the first embodiment of the present invention.

FIG. 16 is a figure showing primitive types according to the first embodiment of the present invention.

FIG. 17 is a figure showing parameter types according to the first embodiment of the present invention.

FIG. 18 is a figure showing a primitive list according to the first embodiment of the present invention.

FIG. 19 is a diagram showing service interfaces on a protocol stack according to the first embodiment of the present invention.

FIG. 20 is a figure showing arguments of an ACML-Connection primitive according to the first embodiment of the present invention.

FIG. 21 is a figure showing arguments of an ACML-Notify primitive according to the first embodiment of the present invention.

FIG. 22 is a figure showing arguments of an ACML-Registration primitive according to the first embodiment of the present invention.

FIG. 23 is a figure showing arguments of an ACML-Deregistration primitive according to the first embodiment of the present invention.

FIG. 24 is a figure showing arguments of an ACML-Get primitive according to the first embodiment of the present invention.

FIG. 25 is a figure showing arguments of an ACML-Set primitive according to the first embodiment of the present invention.

FIG. 26 is a figure showing arguments of a sendData primitive according to the first embodiment of the present invention.

FIG. 27 is a figure showing arguments of an eventReport according to the first embodiment of the present invention.

FIG. 28 is a figure showing arguments of a CMCTL-SendData primitive according to the first embodiment of the present invention.

FIG. 29 is a figure showing arguments of a CMCTL-eventReport primitive according to the first embodiment of the present invention.

FIG. 30 is a figure showing arguments of a CMCTL-Get primitive according to the first embodiment of the present invention.

FIG. 31 is a figure showing arguments of a CMCTL-Set primitive according to the first embodiment of the present invention.

FIG. 32 is a figure showing arguments of an MLME-Get primitive according to the first embodiment of the present invention.

FIG. 33 is a figure showing arguments of an MLME-Set primitive according to the first embodiment of the present invention.

FIG. 34 is a figure showing arguments of a PLME-Get primitive according to the first embodiment of the present invention.

FIG. 35 is a figure showing arguments of a PLME-Set primitive according to the first embodiment of the present invention.

FIG. 36 is a diagram showing the relationship of a PDU of application data according to the first embodiment of the present invention.

FIG. 37 is a diagram showing the relationship of a PDU of control data according to the first embodiment of the present invention.

FIG. 38 is a diagram showing C2C header information according to the first embodiment of the present invention.

FIG. 39 is a diagram showing PDU identifiers according to the first embodiment of the present invention.

FIG. 40 is a diagram showing a Beacon PDU according to the first embodiment of the present invention.

FIG. 41 is a diagram showing a Connect Request PDU according to the first embodiment of the present invention.

FIG. 42 is a diagram showing a Connect Response PDU according to the first embodiment of the present invention.

FIG. 43 is a figure showing a list of Result Codes according to the first embodiment of the present invention.

FIG. 44 is a diagram showing an Ack PDU according to the first embodiment of the present invention.

FIG. 45 is a diagram showing a Congestion Control PDU according to the first embodiment of the present invention.

FIG. 46 is a diagram showing an Event PDU according to the first embodiment of the present invention.

FIG. 47 is a figure showing a list of Event Codes according to the first embodiment of the present invention.

FIG. 54 is a diagram showing an example of a procedure in a case where connection of the initial connection procedure according to the first embodiment of the present invention is invalid.

FIG. 55 is a diagram showing a procedure of notifying a connection status according to the first embodiment of the present invention.

FIG. 56 is a diagram showing a registration/deregistration procedure of an application according to the first embodiment of the present invention.

FIG. 74 is a diagram showing C2C header information added to a road-to-vehicle communication application according to the third embodiment of the present invention.

FIG. 75 is a diagram schematically showing a configuration of an on-board communication device according to a fourth embodiment of the present invention.

FIG. 76 is a diagram showing service interfaces on a protocol stack according to the fourth embodiment of the present invention.

FIG. 77 is a figure showing a list of differences in primitive between the first embodiment and the fourth embodiment according to the present invention.

FIG. 80 is a figure showing a list of differences in primitive between the first embodiment and the fifth embodiment according to the present invention.

BEST MODES FOR CARRYING OUT THE INVENTION (A. First Embodiment)
(A-1. Protocol Configuration)

A first embodiment of the present invention is described with reference to FIG. 1 to FIG. 70. Note that an on-board communication device and a cooperative road-to-vehicle/car-to-car communication system according to the first embodiment are capable of providing a service as an on-board communication device of a road-to-vehicle communication system and providing a service as an on-board communication device of a car-to-car communication system. In the first embodiment, description is mainly given of a case where a service is provided as an on-board communication device of a car-to-car communication system.

Figure 1:
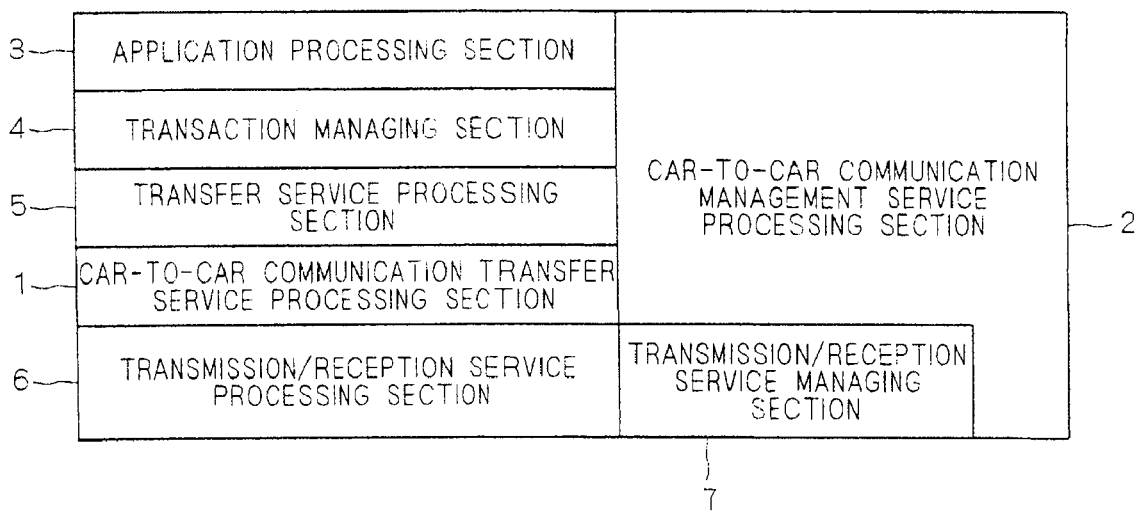
FIG. 1 is a diagram schematically showing a configuration of an on-board communication device and a cooperative road-to-vehicle/car-to-car communication system according to a first embodiment of the present invention.
Figure 2:
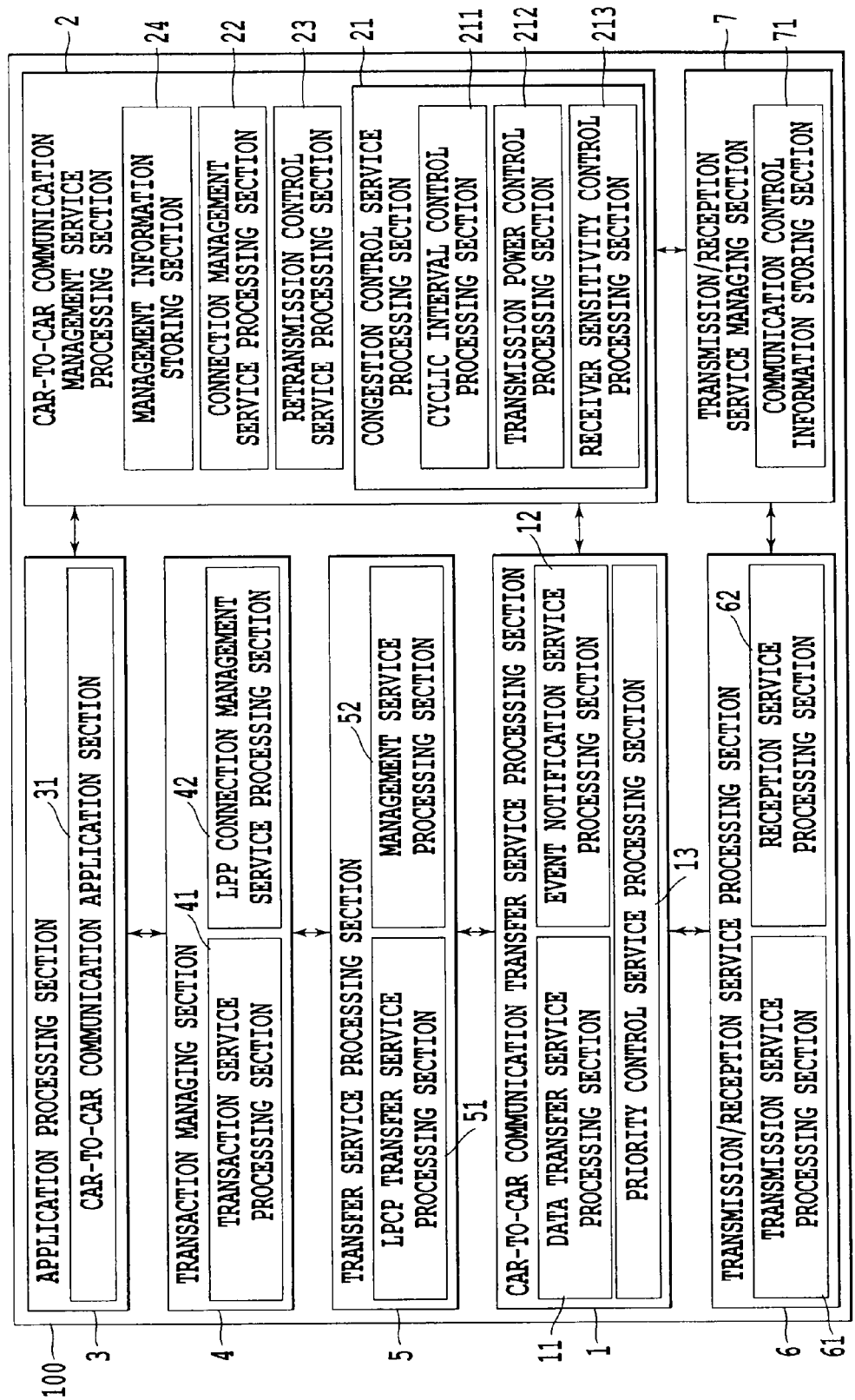
FIG. 2 is a diagram specifically showing the configuration of the on-board communication device and the cooperative road-to-vehicle/car-to-car communication system according to the first embodiment of the present invention.

FIG. 1 is a block diagram schematically showing a protocol configuration of an on-board communication device 100 and a cooperative road-to-vehicle/car-to-car communication system according to the first embodiment of the present invention, and FIG. 2 is a block diagram showing the protocol configuration in detail. Note that similar or corresponding configurations are denoted by like reference numerals in FIG. 1 and FIG. 2, which is true for the entire specification.

The on-board communication device 100 is mounted in each of multiple cars. Wireless communication is performed between cars through the on-board communication device 100. The on-board communication device 100 herein refers to a movable communication terminal mounted in a car or a fixed communication device such as a base station. Wireless communication may be communication using DSRC or a protocol employed in a wireless local area network (LAN) or a cellular phone.

Note that the description of the present invention is given by focusing on one car referred to as "own car" (first car) in which the on-board communication device 100 is mounted. In addition, multiple cars other than "own car", in which the on-board communication device 100 is mounted, are referred to as "surrounding cars" (second cars).

As shown in FIG. 1, the on-board communication device 100 includes a car-to-car communication transfer service processing section 1, a car-to-car communication management service processing section 2, an application processing section 3, a transaction managing section 4, a transfer service processing section 5, a transmission/reception service processing section 6 and a transmission/reception service managing section 7.

In the first embodiment, the car-to-car communication transfer service processing section 1 and the car-to-car communication management service processing section 2 are generically referred to as a car-to-car sub protocol.

The car-to-car communication transfer service processing section 1 (hereinafter, also referred to as a car-to-car communication transport sub layer) is interposed between the transfer service processing section 5 and the transmission/reception service processing section 6, obtains priorities of applications of the application processing section 3 from the car-to-car communication management service processing section 2, and provides a priority control service of controlling a transmission order in accordance with the priorities. In addition, the car-to-car communication transfer service processing section 1 provides a data transfer service of transmitting/receiving messages and an event notification service of notifying the transfer service processing section 5 and the car-to-car communication management service processing section 2 of an error.

Further, the car-to-car communication transfer service processing section 1 provides, to the car-to-car communication transfer service processing sections 1 of the surrounding cars, information for use in congestion control by adding communication control information such as cyclic interval or transmission power to data (protocol data unit (PDU)) to be transmitted/received.

The car-to-car communication management service processing section 2 (hereinafter, also referred to as a car-to-car communication management layer) is arranged so as to be parallel to the application processing section 3, the transaction managing section 4, the transfer service processing section 5, the car-to-car communication transfer service processing section 1 and the transmission/reception service managing section 7, and provides a congestion control service for avoiding congestion of information, using car information such as positional information and speed information of a car that are possessed by the application processing section 3 and occupancy information of a communication channel of the transmission/reception service managing section 7.

Here, the car information includes a speed, an acceleration/deceleration speed, a position, a driving direction, and ON/OFF information of a winker.

In addition, the car-to-car communication management service processing section 2 provides a connection procedure and a disconnection procedure of initial connection for connection with the car-to-car communication management service processing section 2 of the opposite station, and provides a communication connection management service of managing a communication status.

Further, the car-to-car communication management service processing section 2 includes an interface (third interface) between the application processing section 3 and itself for notifying the application processing section 3 of a cyclic interval and a communication status of the communication connection management service that are used in the congestion control service. Moreover, the car-to-car communication management service processing section 2 includes an interface (first interface) between the transmission/reception service managing section 7 and itself for setting information of transmission power, receiver sensitivity and transmission channel used in the congestion control service or for obtaining information of communication channel occupancy.

Further, the car-to-car communication management service processing section 2 includes an interface (second interface) between the car-to-car communication transfer service processing section 1 and itself for obtaining communication control information to be added to data to be transmitted, setting the communication control information added to the received data, and transmitting the control data to the car-to-car communication management service processing section 2 of the opposite station. Moreover, the car-to-car communication management service processing section 2 provides a retransmission control service of the control data to be transmitted to the opposite station.

The application processing section 3 (hereinafter, also referred to as an application) includes a car-to-car communication application that operates on the transaction managing section 4. In this case, the application processing section 3 may include an application of the road-to-vehicle communication system or an application other than the application regarding intelligent transport systems (ITS).

The transaction managing section 4 (hereinafter, also referred to as a local port protocol) is a communication protocol that is interposed between the application processing section 3 and the transfer service processing section 5 and extends a function of the transfer service processing section 5. The transaction managing section 4 provides a transaction service such as retransmission or division/assembly of a message and a connection management service of managing communication statuses such as communication connection and disconnection.

The transfer service processing section 5 (hereinafter, also referred to as a local port control protocol) is a control protocol that is interposed between the transaction managing section 4 and the car-to-car communication transfer service processing section 1 and is provided for achieving multiplexing of applications. In order to achieve a multi-application, the transfer service processing section 5 includes a service primitive (interface) for identifying upper protocols by a local port number and providing a management service such as data transfer and event notification to the upper protocols.

The transmission/reception service processing section 6 (hereinafter, also referred to as a physical layer or data link layer) provides a transmission service and a reception service for performing wireless communication with the on-board communication devices 100 mounted in the surrounding stations.

The transmission/reception service managing section 7 (hereinafter, also referred to as a physical layer management entity or media access control layer management entity) includes a management information base (MIB) that stores the communication control information for managing the transmission/reception service processing section 6 and storing information.

Next, the configuration of the on-board communication device 100 is described further with reference to FIG. 2.

(Car-to-Car Communication Transfer Service Processing Section 1)

The car-to-car communication transfer service processing section 1 includes a data transfer service processing section 11, an event notification service processing section 12 and a priority control service processing section 13.

The data transfer service processing section 11 provides a data transfer service of transmitting a message in response to a request from the upper protocols such as the application processing section 3. In addition, the data transfer service processing section 11 adds the communication control information such as a cyclic interval and transmission power to the data (PDU) to be transmitted/received, to thereby notify the car-to-car communication transfer service processing sections 1 in surrounding cars of information for use in the congestion control. The car-to-car communication transfer service processing section 1 obtains the communication control information from a management information storing section 24 of the car-to-car communication management service processing section 2. Further, the car-to-car communication transfer service processing section 1 includes an interface for performing data transfer to the transfer service processing section 5.

The event notification service processing section 12 notifies the upper protocols of an error and an event occurring in the car-to-car communication transfer service processing section 1 or notifies the upper protocols of an error and an event occurring in the car-to-car communication management service processing section 2 and lower protocols in a transparent manner. Further, the car-to-car communication transfer service processing section 1 includes an interface for making an event notification to the transfer service processing section 5.

The priority control service processing section 13 controls a transmission order in accordance with priorities of messages required to be transmitted by the upper protocols such as the application processing section 3. The car-to-car communication transfer service processing section 1 obtains a priority of an application from the management information storing section 24 of the car-to-car communication management service processing section 2. In addition, the car-to-car communication transfer service processing section 1 includes an interface with respect to the car-to-car communication management service processing section 2 for achieving transmission control in accordance with a priority.

(Car-to-Car Communication Management Service Processing Section 2)

The car-to-car communication management service processing section 2 includes a congestion control service processing section 21, a connection management service processing section 22, a retransmission control service processing section 23 and the management information storing section 24.

In order to improve the reliability of communication, the congestion control service processing section 21 provides the congestion control service of controlling a cyclic interval, transmission power and receiver sensitivity to the application processing section 3. The congestion control service processing section 21 obtains pieces of car information of own station and an opposite station that are used in the congestion control service from the application processing section 3, and obtains the communication control information such as a communication channel occupancy and transmission power of own station from a communication control information storing section 71 of the transmission/reception service managing section 7. In addition, the congestion control service processing section 21 obtains the communication control information such as a communication channel occupancy and transmission power of the surrounding stations from the management information storing section 24. The car-to-car communication management service processing section 2 includes an interface for performing a congestion control service to the application processing section 3 and the transmission/reception service managing section 7.

The congestion control service processing section 21 includes a cyclic interval control processing section 211, a transmission power control processing section 212 and a receiver sensitivity control processing section 213.

The cyclic interval control processing section 211 calculates a cyclic interval for avoiding congestion and notifies the application processing section 3 that periodically transmits messages of the cyclic interval. Upon this, the application processing section 3 of the on-board communication device periodically transmits messages in accordance with the cyclic interval notified by the congestion control service processing section 21, to thereby increase/decrease a transmission traffic.

The transmission power control processing section 212 calculates transmission power for avoiding congestion and notifies the transmission/reception service managing section 7 of the transmission power. As a result, the transmission/reception service managing section 7 of the on-board communication device sets a threshold value of power for receiving messages in accordance with the transmission power notified by the transmission power control processing section 212, to thereby increase or decrease a transmission area for transmission.

The receiver sensitivity control processing section 213 calculates receiver sensitivity for avoiding congestion and notifies the transmission/reception service managing section 7 of the receiver sensitivity. Upon this, the transmission/reception service managing, section 7 of the on-board communication device sets a threshold value of power for receiving messages in accordance with the receiver sensitivity notified by the receiver sensitivity control processing section 213, to thereby increase or decrease an area that can be received.

The connection management service processing section 22 transmits a control message for starting initial connection with the surrounding stations in response to a request from the application processing section 3. In addition, the connection management service processing section 22 manages a communication status with the surrounding station and makes a notification to the application processing section 3. Further, the connection management service processing section 22 uses a different initial connection procedure depending on whether the application processing section 3 that periodically transmits messages is operating, and provides an efficient connection management service.

The retransmission control service processing section 23 retransmits a message that has not reached the opposite station among the control messages for providing a connection management service. As a result, the car-to-car communication management service processing section 2 is capable of performing retransmission control of the control message of the car-to-car communication management service processing section 2 that cannot be supported by the transaction managing section 4.

The management information storing section 24 stores, for example, communication control information such as a cyclic interval and transmission power used in the congestion control service and pieces of car information of own station and surrounding stations used in the connection management service. In addition, the management information storing section 24 stores communication control information such as a cyclic interval and transmission power included in the data (PDU) transmitted/received by the car-to-car communication transfer service processing section 1. Further, the management information storing section 24 stores information of an available application that is registered/deregistered from the application processing section 3.

(Application Processing Section 3)

The application processing section 3 includes a car-to-car communication application section 31.

The car-to-car communication application section 31 includes an application for periodically performing broadcast transmission of car information of own car, an application for performing broadcast transmission of car information of own car when a brake or winker operates, and besides an application for enhancing comfort and convenience of a driver.

(Transaction Managing Section 4)

The transaction managing section 4 includes a transaction service processing section 41 and an LPP connection management service processing section 42.

The transaction service processing section 41 provides a service of retransmission of a message that has not reached the opposite station and division/assembly of a message. As a result, the transaction service processing section 41 provides retransmission control and division/assembly control required by the car-to-car communication system. In addition, the transaction service processing section 41 transmits a message to the opposite station and provides a transaction service of requiring a response to the transmitted message from the opposite station. Further, the transaction service processing section 41 provides a continuous transmission control service of continuously transmitting messages transmitted from the application processing section 3. Accordingly, the on-board communication device is capable of increasing a probability that the message will reach the opposite station.

The LPP connection management service processing section 42 provides, in response to a request from the application processing section 3, a connection management service such as report on a connection status, notification of new connection or disconnection, management of a port number capable of being received that is possessed by the opposite station, and notification to the application processing section 3 that a certain port becomes available for reception.

(Transfer Service Processing Section 5)

The transfer service processing section 5 includes a local port control protocol (LPCP) transfer service processing section 51 and a management service processing section 52.

The LPCP transfer service processing section 51 identifies the application processing sections 3 that are the transmission source and the transmission destination from the upper protocols such as the application processing sections 3, using an identifier referred to as a local port number. In addition, the transfer service processing section 5 includes an interface for transferring data to the application processing section 3 and the transaction managing section 4 that are the upper protocols. Therefore, the on-board communication device is capable of achieving a multi-application.

The management service processing section 52 provides a management service of notifying the upper protocols of the opposite station and own station of an error or event occurring in the transfer service processing section 5. In addition, the management service processing section 52 provides a service of notifying the application processing section 3 of own station of an error or event notified from the lower protocols such as the car-to-car communication transfer service processing section 1 in a transparent manner. Further, the transfer service processing section 5 includes an interface for providing the transaction managing section 4 with an event notification service.

(Transmission/Reception Service Processing Section 6)

The transmission/reception service processing section 6 includes a transmission service processing section 61 and a reception service processing section 62.

The transmission service processing section 61 transmits the data transmitted from the car-to-car communication transfer service processing section 1 to the surrounding cars in a broadcast manner or to a specific car in a unicast manner. In addition, the transmission service processing section 61 is capable of switching transmission power, and obtains the transmission power in transmission from the communication control information storing section 71. Further, the transmission service processing section 61 is capable of switching a communication channel to be transmitted. For example, the transmission service processing section 61 is capable of transmitting information from the car-to-car communication management service processing section 2 to the control channel, to thereby transmit the information from the application processing section 3 to the data channel.

The reception service processing section 62 receives the information transmitted from the surrounding cars, and transmits the received information to the car-to-car communication transfer service processing section 1. In addition, the reception service processing section 62 is capable of switching the receiver sensitivity, and obtains the receiver sensitivity from the communication control information storing section 71. Further, the reception service processing section 62 determines the case where the radio field intensity of a certain value or larger is received on the communication channel as busy, and observes the communication channel for a predetermined period of time. Then, the reception service processing section 62 measures a ratio of busy for the predetermined period of time as the occupancy of the communication channel, and stores the ratio in the communication control information storing section 71.

(Transmission/Reception Service Managing Section 7)

The transmission/reception service managing section 7 includes the communication control information storing section 71.

The communication control information storing section 71 stores information such as the transmission power and receiver sensitivity for performing wireless communication with the on-board communication devices 100 mounted in the surrounding stations. In addition, the communication control information storing section 71 stores information such as the communication channel occupancy measured by the reception service processing section 62. Further, the communication control information storing section 71 sets the transmission power or receiver sensitivity as a value for avoiding congestion by the congestion control service processing section 21 of the car-to-car communication management service processing section 2.

(A-2. Protocol Specifications)

Hereinafter, detailed description is given of specifications of a car-to-car sub protocol composed of the car-to-car communication transfer service processing section 1 and the car-to-car communication management service processing section 2 in the on-board communication device and the cooperative road-to-vehicle/car-to-car communication system according to the present invention.

(1. Outline of Car-to-Car Sub Protocol)

Figure 3:
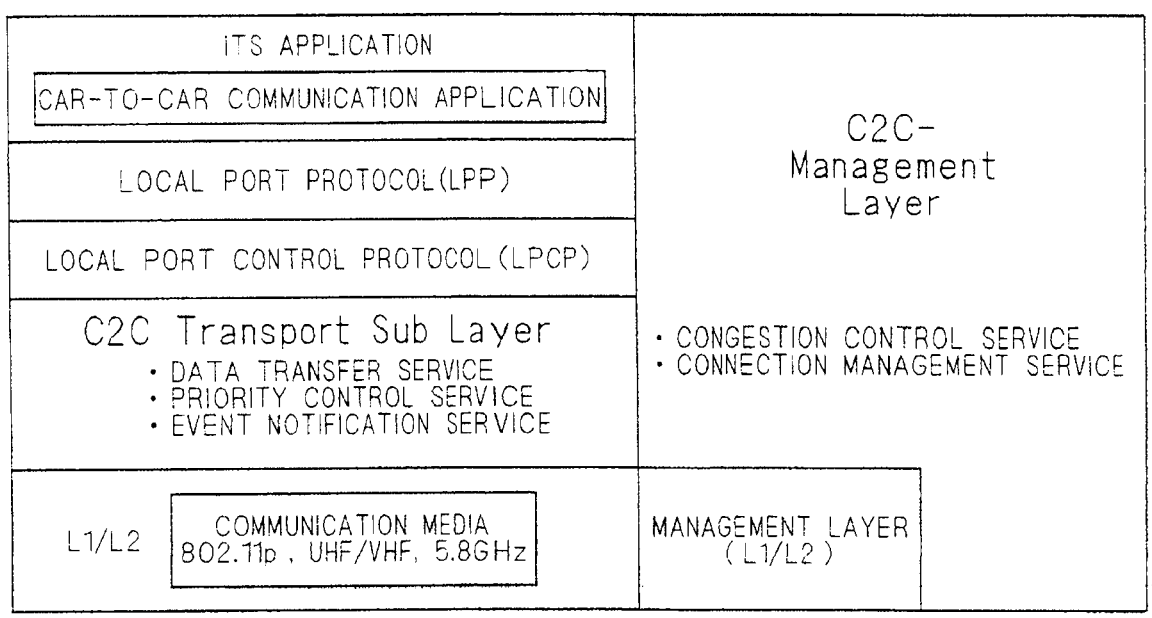
FIG. 3 is a diagram showing a protocol configuration of a car-to-car communication architecture of the on-board communication device and the cooperative road-to-vehicle/car-to-car communication system according to the first embodiment of the present invention.

The car-to-car sub protocol is composed of a C2C transport sub layer (CTL) and a C2C management layer (CML). A protocol configuration of a car-to-car communication architecture is shown in FIG. 3.

The C2C transport sub layer (CTL) is interposed between a local port control protocol (LPCP) and a communication lower protocol, and provides priority control to an application of the car-to-car communication system, to thereby complement a function of the C2C management layer (CML). Further, the C2C transport sub layer (CTL) provides an event transfer service of transferring a message to the upper protocol (hereinafter, also referred to as upper layer) or the CML and an event notification service of notifying the upper protocol of an error and an event occurring in the CTL.

The CC management layer (CML) provides, to the application or the CTL, a congestion control service of controlling a cyclic interval, transmission power, receiver sensitivity and transmission channel for improving the reliability of communication and a connection management service of starting or disconnecting initial connection and managing a communication status. In addition, the CML extends a function of the management layer of the communication lower protocol. Further, the CML provides a data retransmission service to improve the reliability of the control message for performing initial connection.

A local port protocol (LPP) provides a transaction service such as retransmission and division/assembly of data and a connection management service of managing communication statuses such as initial connection and disconnection. Accordingly, the LPP achieves retransmission control and division/assembly control required for the car-to-car communication system.

The LPCP includes an interface for identifying the upper protocols such as the application processing section 3 using a local port number for a management service such as data transfer and event notification to the upper protocols. Accordingly, the LPCP achieves a multi-application in the car-to-car communication system.

The IEEE802.11p protocol and communication protocols of 5.8 GHz band and UHF/VHF band are assumed as communication lower protocols. In addition, the communication lower protocol includes a management layer for storing information of a communication lower protocol.

The communication lower protocol includes a data link layer (layer 2; L2), a physical layer (layer 1; L1) that is lower than the data link layer, a media access control management entity (MLME) that manages the data link layer and a physical layer management entity (PLME) that manages the physical layer. In this case, for example, the IEEE802.11p protocol and the communication protocols of 5.8 GHz band and UHF/VHF band or a communication protocol other than those may be used as the communication lower protocol. The MLME and the PLME includes, though not specifically shown, a management information base (MIB) that stores management information.

The data link layer is the second layer of the open systems interconnection (OSI) reference model, and is defined as to an access method. The physical layer is the first layer of the OSI reference model, and is physically defined as to a transmission method. The media access control management entity (MLME) manages the data link layer and stores information used in the data link layer. The physical layer management entity (PLME) manages the physical layer and stores information used in the physical layer.

The functions of the CTL and the CML are as follows.
(1) Service provided by CTL
(a) Data transfer service
(b) Event notification service
(c) Priority control service
(2) Service provided by CML
(a) Congestion control service
(b) Connection management service
(c) Data retransmission service
(2. Outline of Function)
2.1 Function of C2C: Transport Sub Layer
2.1.1 Data Transfer Service
The CTL provides the data transfer service to applications, the upper protocols such as the LPP and LPCP, and the CML. A detailed procedure of the data transfer service is described in Section 5.1. FIG. 4 shows an example of providing the data transfer service to the upper protocols, and FIG. 5 shows an example of providing the data transfer service to the CML.

2.1.2 Event Notification Service
The CTL provides the event notification service for notifying the upper protocols and the opposite station of an event or error occurring in the CTL and an event (such as notification of communication connection and disconnection) received from the CML. FIG. 6 shows an example of providing the event notification service.

Figure 7:
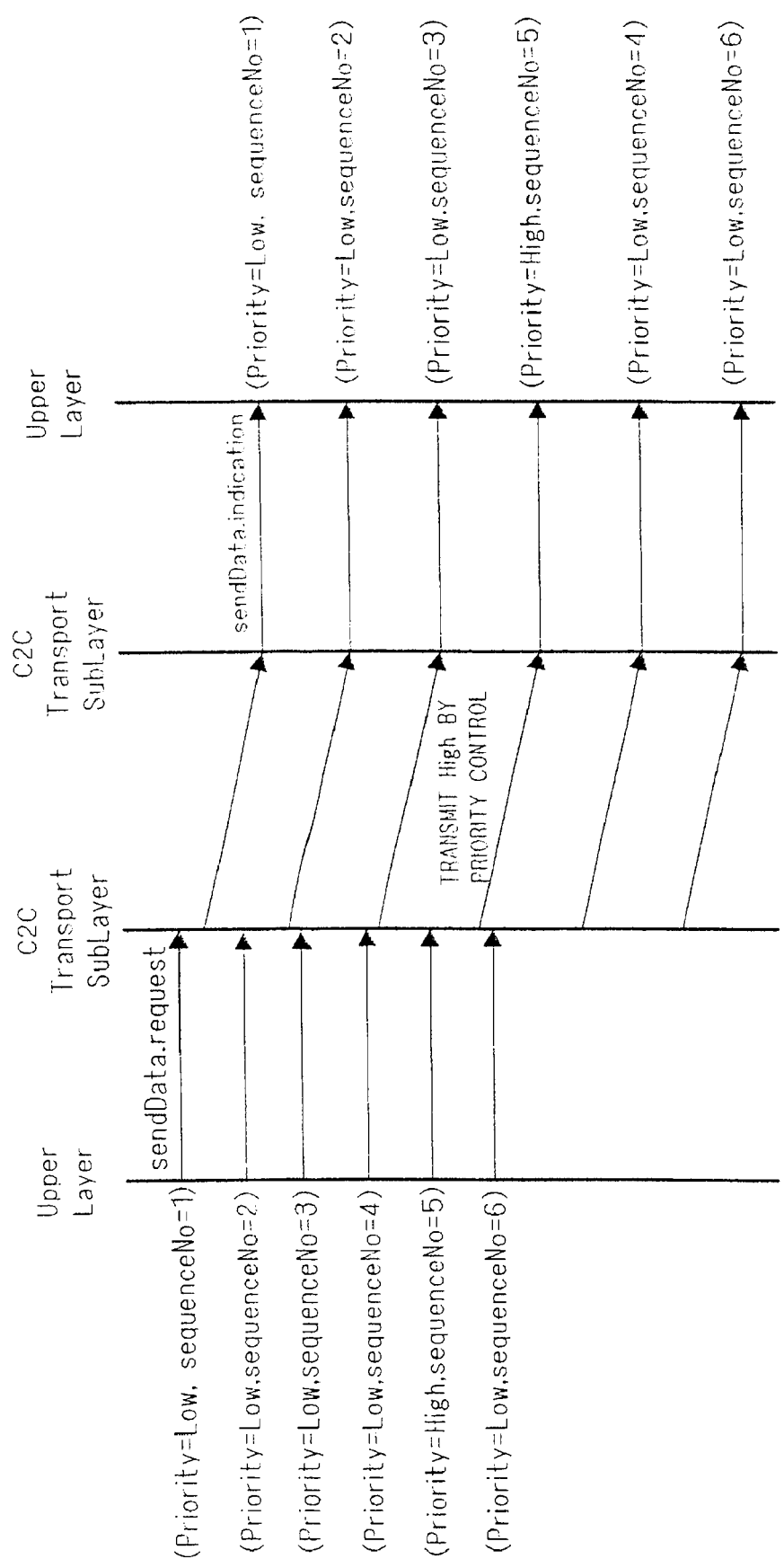
FIG. 7 is a diagram showing an example of a priority control service according to the first embodiment of the present invention.

2.1.3 Priority Control Service
The CTL provides the priority control service of controlling a transmission order in accordance with data priorities of the upper protocols and the CML. As a result, it is possible to preferentially transmit data with a high degree of emergency. A detailed procedure of the priority control service is described in Section 5.2. FIG. 7 shows an example of the priority control service. Note that the priority control service is provided as an option in a case of being provided by the communication lower protocol.

Figure 8:
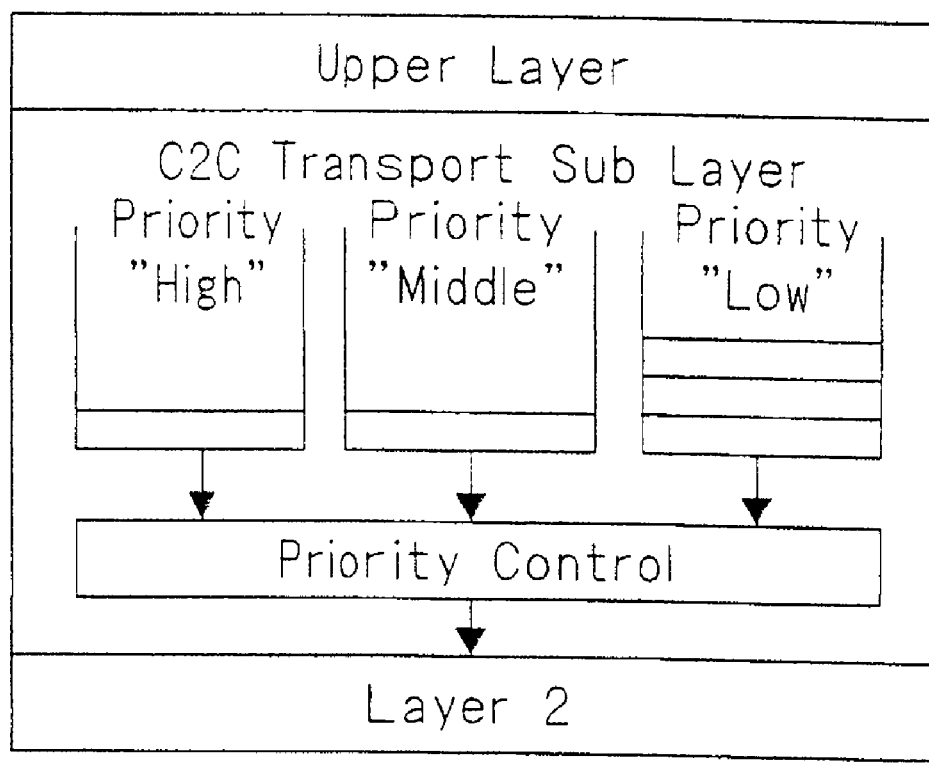
FIG. 8 is a diagram showing an example of a system configuration of the priority control service according to the first embodiment of the present invention.

The CTL prepares a queue for each priority, and preferentially passes data of a high priority queue to the communication lower protocol. FIG. 8 shows an example of a queue configuration for providing the priority control service.

2.2 Function of C2C Management Layer
2.2.1 Congestion Control Service
The CML provides the congestion control service of controlling a cyclic interval, transmission power and receiver sensitivity for improving the reliability of communication to the application. A detailed procedure of the congestion control service is described in Section 5.3. The congestion control service may use any of the following services, or may use some of them in conjunction with each other.

(1) Cyclic Interval Control Service
Service of notifying an application of a cyclic interval of an application that periodically transmits messages such as car information.

(2) Transmission Power Control Service
Service of controlling transmission power for securing a communication area required for an application or narrowing down a communication area to avoid congestion.

(3) Receiver Sensitivity Control Service
Service of controlling receiver sensitivity for limiting a communication area required for an application.

2.2.1.1 Cyclic Interval Control Service
In the cyclic interval control service, the CML notifies an application that periodically transmits messages such as car information of a cyclic interval that is set for avoiding congestion.

In the cyclic interval control service, the CML calculates a cyclic interval using information of own car and information of surrounding cars of the CML, and using channel occupancy information detected by own car and channel occupancy information detected by the surrounding cars. As a result, the on-board communication device is capable of controlling a cyclic interval in accordance with a dangerous situation with surrounding cars and a congestion situation of a communication environment.

Figure 9:
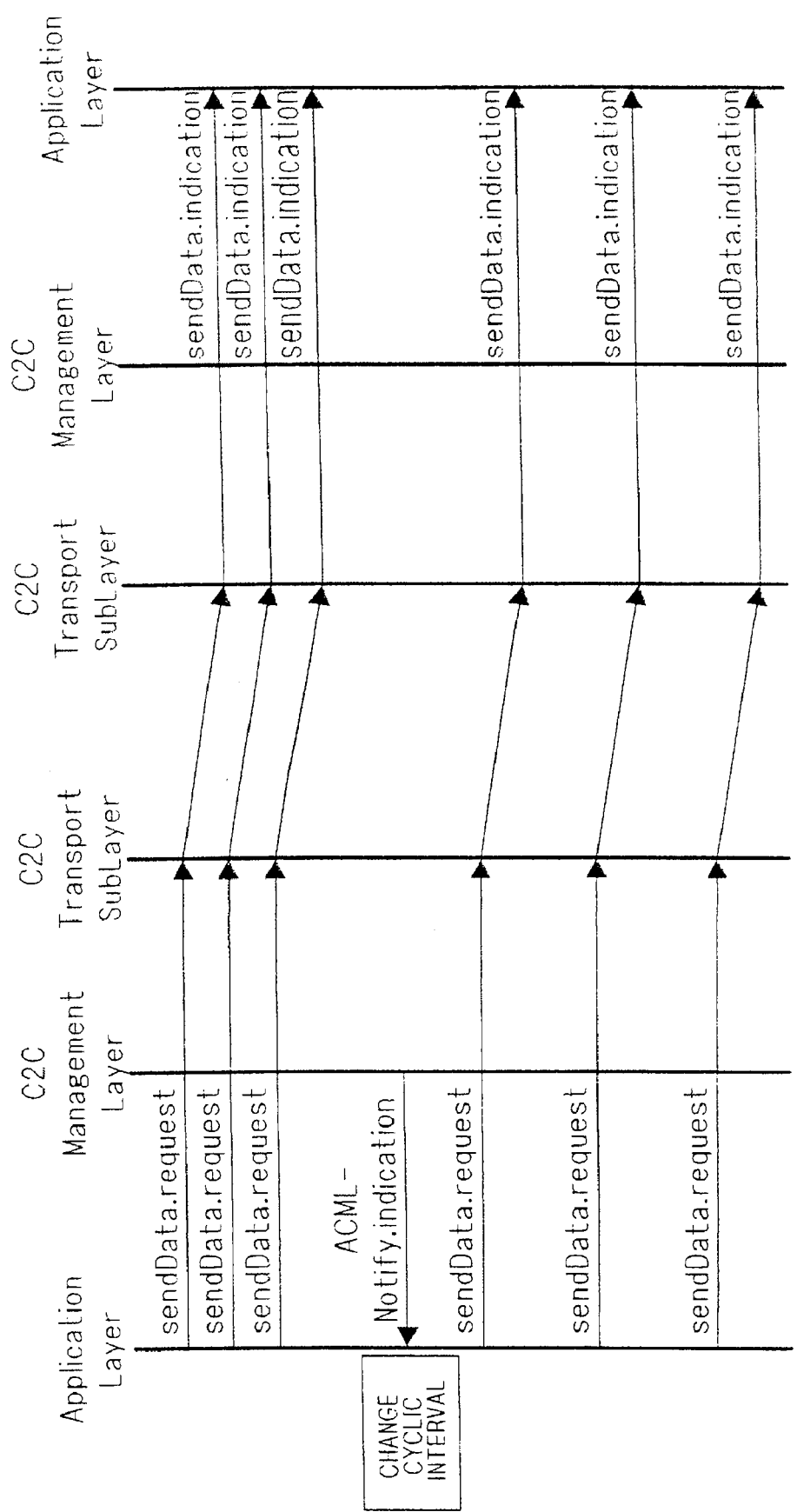
FIG. 9 is a diagram showing an example of cyclic interval control of a congestion control service according to the first embodiment of the present invention.

The CML calculates the cyclic interval, and then notifies the application that periodically transmits information of a change in cyclic interval. The application notified of the cyclic interval starts transmission of a message for each notified cyclic interval after receiving the notification. FIG. 9 shows an example of the cyclic interval control service.

2.2.1.2 Transmission Power Control Service
In the transmission power control service, the CML controls transmission power in transmitting messages to a management layer of the lower protocol for securing a communication area required for an application or limiting a communication area to avoid congestion.

The CML calculates transmission power for securing a communication area with a car that requires communication and avoiding transmitting a radio wave to an unnecessary area, using information of own car and information of surrounding cars that are possessed by the CML, and channel occupancy information detected by own car and channel occupancy information detected by the surrounding cars.

Figure 10:
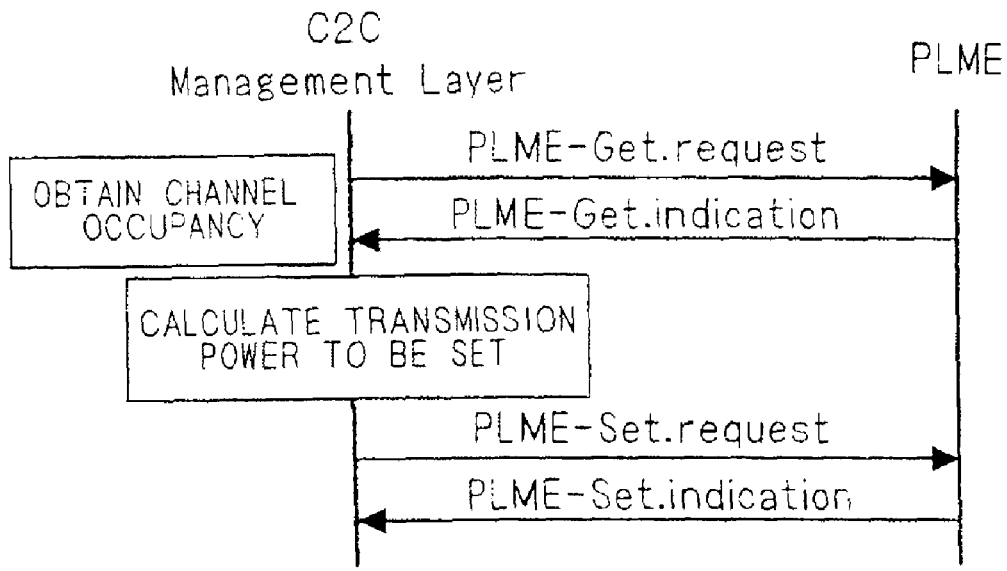
FIG. 10 is a diagram showing an example of transmission power control of the congestion control service according to the first embodiment of the present invention.
Figure 11:
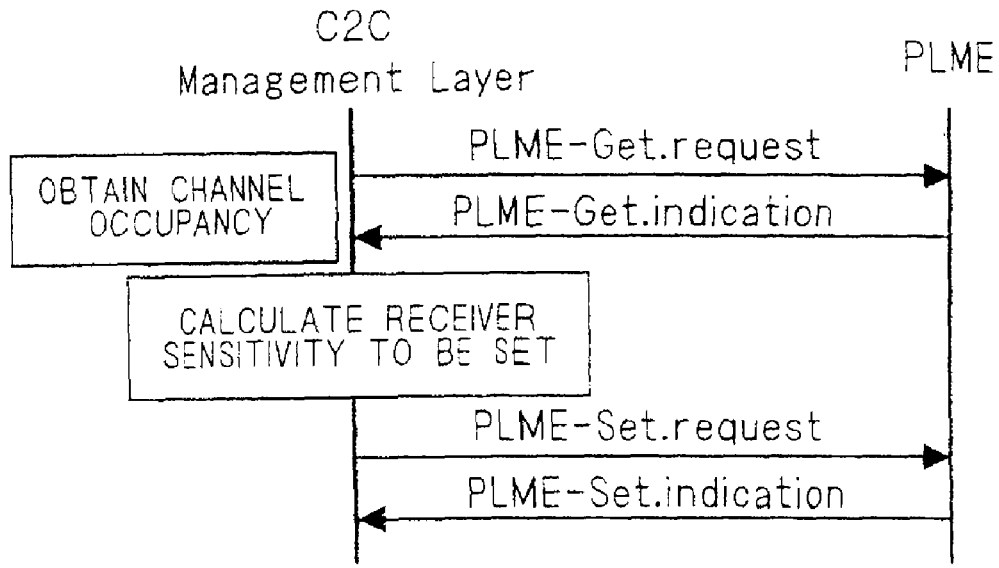
FIG. 11 is a diagram showing an example of receiver sensitivity control of the congestion control service according to the first embodiment of the present invention.

The CML calculates transmission power, and then notifies the PLME of the transmission power, whereby the communication lower protocol transmits a message in accordance with the notified transmission power. FIG. 10 shows an example of a transmission power control service.

2.2.1.3 Receiver Sensitivity Control Service

In the receiver sensitivity control service, the CML provides the management layer of the communication lower protocol with the function of controlling a receiver sensitivity in receiving a message for limiting to the communication area required for the application or the communication area to avoid congestion.

The CML calculates the receiver sensitivity that is limited to the communication area required for the application and the communication area to avoid congestion, using information of own car and information of surrounding cars possessed by the CML, and channel occupancy information detected by own car and channel occupancy information detected by the surrounding cars.

The CML calculates receiver sensitivity, and then notifies the PLME of the receiver sensitivity, whereby the communication lower protocol receives a message in accordance with the notified receiver sensitivity.

2.2.2 Connection Management Service

The CML provides the connection management service of starting initial connection of communication connection required for a car-to-car communication system and managing or notifying a connection status.

In the connection management service, the CML provides the following service to the application, to thereby provide the application with triggers of start and end of communication. In addition, the available applications are notified between connection management services, to thereby provide the functions of managing the applications supported by the opposite mobile station, reporting statuses thereof in response to requests of respective applications, and notifying that communication is enabled.

(1) Connection Query Service

Service of managing and monitoring a connection status with a surrounding mobile station, and notifying a connection status and new connection and disconnection in response to a request from an application.

(2) Connection/Disconnection Notification Service

Service of notifying an upper protocol of a connection status and new connection/disconnection via the CTL.

(3) Time Synchronization Service

Service of synchronizing time for synchronizing a timing to switch a channel in a case where multiple communication channels are available.

In the connection management service, the CML starts initial connection with the opposite mobile station in a case of receiving data of an application that periodically transmits messages and beacon messages to be transmitted periodically for achieving high-speed initial connection.

2.2.2.1 Connection Query Service

Figure 12:
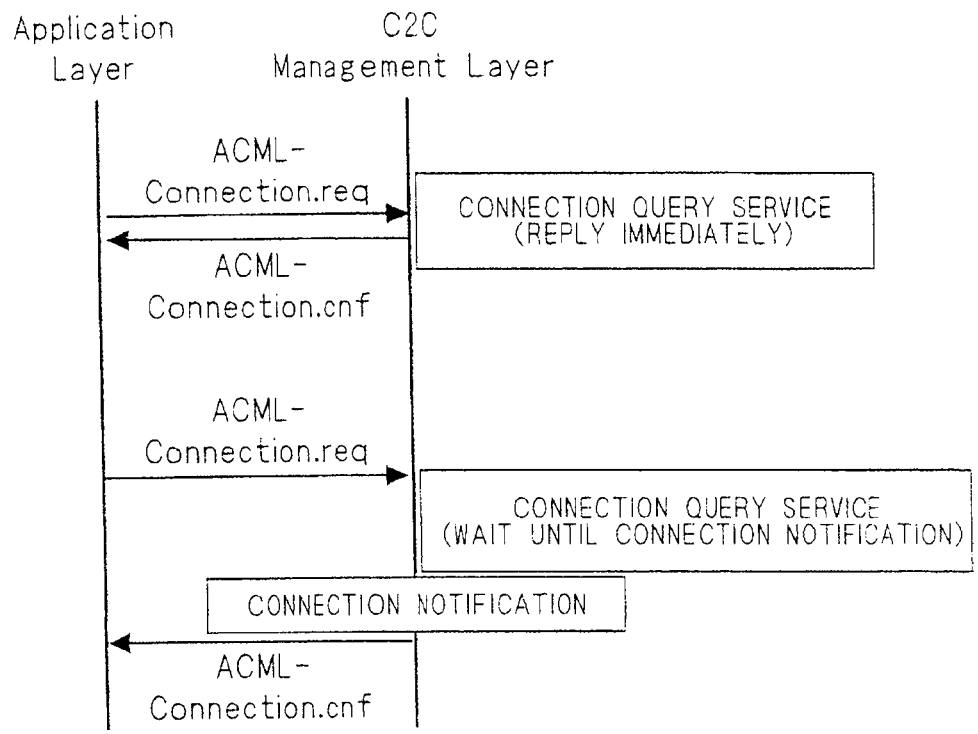
FIG. 12 is a diagram showing an example of a connection query of a connection management service according to the first embodiment of the present invention.

The connection query service is the service in which an application inquires whether or not the connection of car-to-car communication is established. The connection query service defines, at the time of query, two types of services, the reference service of immediately replying a connection status of car-to-car communication and the notification service of waiting until the connection is established in a case where the connection is not established and making, a notification at the time where connection is established. FIG. 12 shows an example of the connection query service.

2.2.2.2 Connection/Disconnection Notification Service

Figure 13:
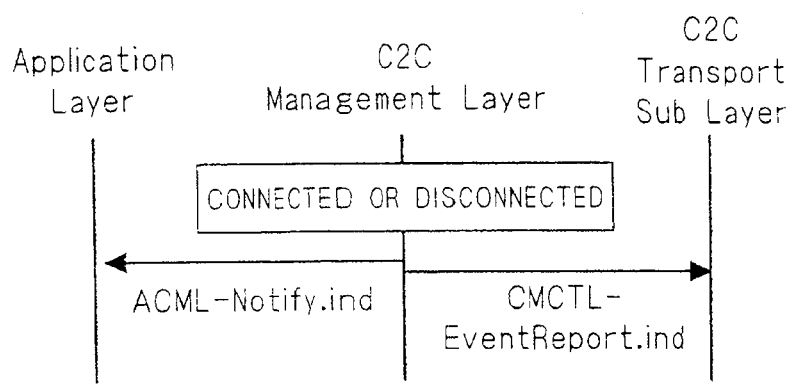
FIG. 13 is a diagram showing an example of disconnection notification of the connection management service according to the first embodiment of the present invention.

The connection/disconnection notification service is a service of notifying the application and the CTL of connection and disconnection of communication connection. FIG. 13 shows an example of the connection/disconnection notification service.

2.2.2.3 Time Synchronization Service

In a case where the car-to-car communication protocol supports multiple communication channels, the CML provides the time synchronization service for unifying timings for switching communication channels.

In the time synchronization service, the CML defines one of multiple channels as a control channel and periodically transmits beacon messages on the control channel. Thanks to the beacon messages, it is possible to obtain time synchronization as well as grasp the application information supported by the opposite station.

2.2.3 Data Retransmission Service

Figure 14:
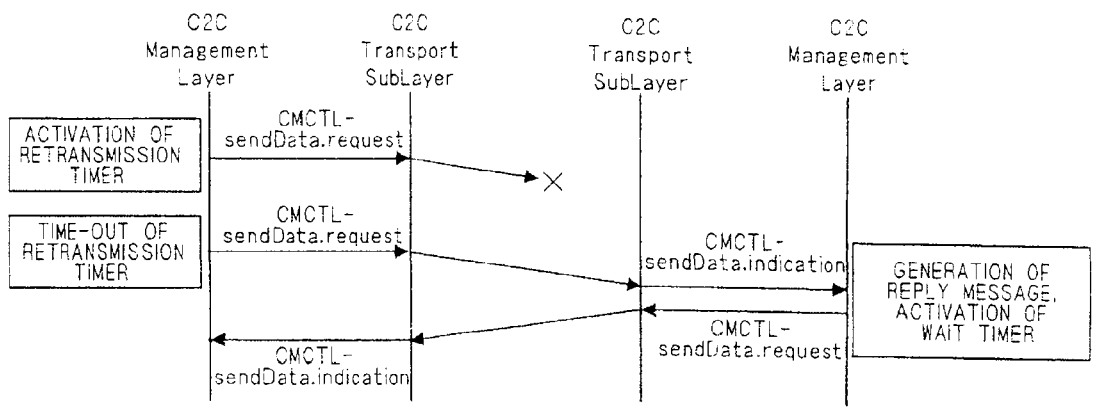
FIG. 14 is a diagram showing an example of data retransmission according to the first embodiment of the present invention.
Figure 15:
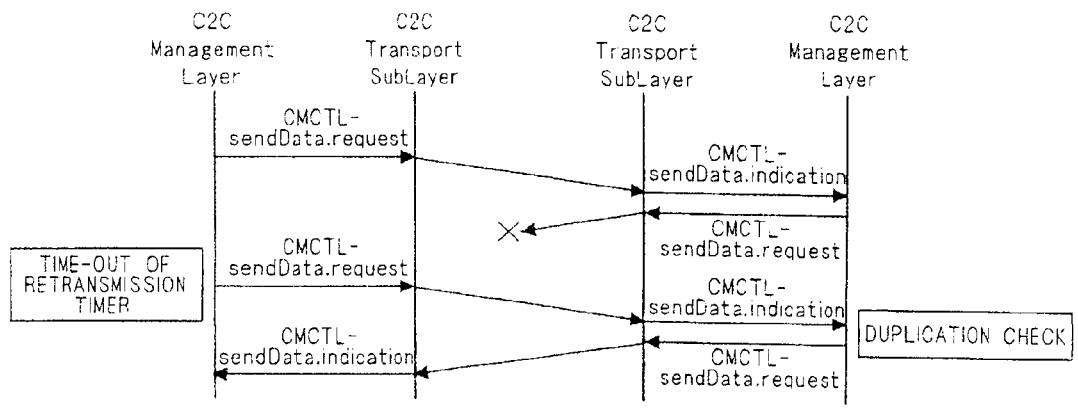
FIG. 15 is a diagram showing an example of a duplicate reception check according to the first embodiment of the present invention.

The CML provides the control message with the data retransmission service for securing the reliability of communication. In the data retransmission service, the CML controls retransmission with a retransmission timer and a retransmission counter, where the retransmission timer performs retransmission at time-out. FIG. 14 shows an example of the data retransmission service, and FIG. 15 shows an example of duplication check of the data retransmission service.

An outline of the retransmission processing procedure of the data retransmission service is as follows.

(1) In transmitting a control message, the retransmission timer is started, and the retransmission counter is set to zero.

(2) In a case where a reply message is not received from the opposite mobile station before time-out of the retransmission timer, the retransmission counter is incremented by one, and the retransmission timer is restarted simultaneously with the retransmission of the message.

(3) In a case where the retransmission counter exceeds a maximum retransmission number, message retransmission is stopped.

(3. Service Interface (Service Access Point: SAP))

Next, interfaces included in the CTL and the CML are described.

3.1 Description of Notation

FIG. 16 shows a list of primitive types defined in the present invention. FIG. 17 shows a list of parameter types used in a definition table of the primitives in the present invention.

3.2 List of Service Interfaces

FIG. 18 shows a list of service interfaces included in the CTL and the CML. FIG. 19 shows positions of SAPs in a car-to-car communication protocol stack.

3.3 SAP of Application and CML (ACML SAP)

As the congestion control service and the connection management service, the CML provides the application with six types of primitives below.

(1) Connection start primitive (ACML-Connection)
(2) Application notification primitive (ACML-Notify)
(3) Application information registration primitive (ACML-Registration)
(4) Application information deregistration primitive (ACML-Deregistration)
(5) CML information get primitive (ACML-Get)
(6) CML information set primitive (ACML-Set)

3.3.1 Connection Start Primitive (ACML-Connection)
(1) Overview of Processing The ACML-Connection primitive is a primitive by which the application requests connection with a surrounding station, inquires a connection status and requests transmission of a beacon message. The application that performs point-to-point communication is started when the ACML-Connection primitive is issued.

(2) Definition

FIG. 20 is a figure showing arguments of the ACML-Connection primitive.

portNo: identifier for identifying a request source application.

serviceType: identifier indicating a type of a connection query service, which indicates a reference service of immediately replying a connection status in a case of "0" and indicates a notification service of making a notification at the time of connection in a case of "1".

connectionFlag: flag indicating whether an application connects with an opposite station, which indicates that connection with the opposite station is not performed in a case of "0" and indicates that connection with the opposite station is performed in a case of "1".

destinationLID: identifier indicating an opposite station for connection request or the like.

connectStatus: identifier indicating a connection status, which indicates a status of not being connected in a case of "0" and indicates a status of being connected in a case of "1".

beaconFlag: flag indicating whether to request transmission of a beacon message, which indicates that transmission of a beacon message is not requested in a case of "0" and indicates that transmission of a beacon message is requested in a case of "1".

3.3.2 Application Notification Primitive (ACML-Notify)
(1) Overview of Processing The ACML-Notify primitive is a primitive by which the CML notifies the application of a change in cyclic interval and the application requests a transmission of congestion control message from the CML. A change in cyclic interval is issued to the application that periodically performs transmission. The ACML-Notify primitive is used in the cases of notifying the application of information and requesting a processing from the CML other than the case above.

(2) Definition

FIG. 21 is a figure showing arguments of the ACML-Notify primitive.

portNo: identifier for identifying a request source application.

notifyCode: identifier indicating the details notified to the application.

notifyParameter: parameter value of the details notified to the application.

3.3.3 Application Information Registration Primitive (ACML-Registration)
(1) Overview of Processing The ACML-Registration primitive is a primitive by which the application registers application information for the CML.

(2) Definition

FIG. 22 is a figure showing arguments of the ACML-Registration primitive.

portNo: identifier for identifying an application that requests registration.

priority: identifier indicating a priority of an application.

applicationType: identifier indicating a type (road-to-vehicle/car-to-car/other) of an application.

resultCode: identifier indicating registration results.

3.3.4 Application Information Deregistration Primitive (ACML-Deregistration)
(1) Overview of Processing The ACML-Deregistration primitive is a primitive by which the application deregisters application information for the CML.

(2) Definition

FIG. 23 is a figure showing arguments of the ACML-Deregistration primitive.

portNo: identifier for identifying an application that requests deregistration.

resultCode: identifier indicating deregistration results.

3.3.5 CML Information Get Primitive (ACML-Get)
(1) Overview of Processing

The ACML-Get primitive is a primitive for the application to obtain variables of the CML.

(2) Definition

FIG. 24 is a figure showing arguments of the ACML-Get primitive.

mibIndex: identifier specifying a variable that requests obtainment.

mibStatus: identifier indicating results of the execution of a request.

mibParameter: details of the obtained variable.

3.3.6 CML information Set Primitive (ACML-Set)
(1) Overview of Processing

The ACML-Set primitive is a primitive by which the application sets a variable of the CML.

(2) Definition

FIG. 25 is a figure showing arguments of the ACML-Set primitive.

mibIndex: identifier specifying a variable that requests setting.

mibStatus: identifier indicating results of the execution of a request.

mibParameter: details of the variable to be set.

3.4 SAP of CTL and Upper Protocol (ACTL SAP)

As the data transfer service and the event notification service, the CTL provides the upper protocols with two types of primitives below.

(1) Application data transfer primitive (sendData)
(2) Event notification primitive (eventReport)

3.4.1 Application Data Transfer Primitive (sendData)
(1) Overview of Processing The sendData primitive is a primitive by which the upper protocol transmits/receives application data to/from the CTL.

(2) Definition

FIG. 26 is a figure showing arguments of the sendData primitive.

linkAddress: link address used in car-to-car communication, which is an identifier used for identifying an opposite station for communication.

parameter: indicating a data body to be exchanged with the upper protocol.

3.4.2 Event Notification Primitive (eventReport)
(1) Overview of Processing

The eventReport primitive is a primitive by which the CTL notifies the upper protocol of an event such as an error occurring in the CTL.

(2) Definition

FIG. 27 is a figure showing arguments of the eventReport primitive.

linkAddress: link address used in car-to-car communication, which is an identifier used for identifying an opposite station for communication.

eventCode: identifier denoting a code of an occurred event or error.

extensionParameter: indicating a parameter for complementing the details of the variable eventCode.

3.5 SAP of CTL and CML (CMCTL SAP)

As the data transfer service and the event notification service, the CTL provides the CML with four types of primitives below.

(1) Control data transfer primitive (CMCTL-SendData)
(2) Event notification primitive (CMCTL-EventReport)
(3) CML information get primitive (CMCTL-Get)
(4) CML information set primitive (CMCTL-Set)

3.5.1 Control Data Transfer Primitive (CMCTL-SendData)

(1) Overview of Processing

The CMCTL-SendData primitive is a primitive by which the CML requests transmission of a control message from the CTL.

(2) Definition

FIG. 28 is a figure showing arguments of the CMCTL-SendData primitive.

linkAddress: link address used in car-to-car communication, which is an identifier used for identifying an opposite station for communication.

pduIdentifier: indicating a type of a PDU to be exchanged with the CML.

parameter: indicating a data body exchanged with the CML.

priority: indicating a priority of data to be transmitted.

3.5.2 Event Notification Primitive (CMCTL-EventReport)

(1) Overview of Processing

The CMCTL-EventReport primitive is a primitive by which the CML notifies the CTL of an event such as an error occurring in the CML or the CTL notifies the CML of an event such as an event occurring in the CTL.

(2) Definition

FIG. 29 is a figure showing arguments of the CMCTL-EventReport primitive.

linkAddress: link address used in car-to-car communication, which is an identifier used for identifying an opposite station for communication.

eventCode: identifier denoting a code indicating an occurred event.

extensionParameter: indicating a parameter for complementing the details of the variable eventCode.

3.5.3 CML Information Get Primitive (CMCTL-Get)

(1) Overview of Processing

The CMCTL-Get primitive is a primitive by which the CTL obtains a variable of the CML.

(2) Definition

FIG. 30 is a figure showing arguments of the CMCTL-Get primitive.

mibIndex: identifier specifying a variable that requires obtainment.

mibStatus: identifier indicating results of the execution of a request.

mibParameter: details of the obtained variable.

3.5.4 CML Information Set Primitive (CMCTL-Set)

(1) Overview of Processing

The CMCTL-Set primitive is a primitive by which the CTL sets a variable of the CML.

(2) Definition

FIG. 31 is a figure showing arguments of the CMCTL-Set primitive.

mibIndex: identifier specifying a variable that requests setting.

mibStatus: identifier indicating the results of the execution of a request.

mibParameter: details of a variable to be set.

3.6 SAP of CML and MLME (MLME-CML SAP)

As the congestion control service, the CML provides the MLME with two types of primitives below.

(1) MLME information get primitive (MLME-Get)
(2) MLME information set primitive (MLME-Set)

3.6.1 MLME Information Get Primitive (MLME-Get)

(1) Overview of Processing

The MLME-Get primitive is a primitive by which the CML obtains a variable of the MLME.

(2) Definition

FIG. 32 is a figure showing arguments of the MLME-Get primitive.

mibIndex: identifier specifying a variable that requests obtainment.

mibStatus: identifier indicating the results of the execution of a request.

mibParameter: details of the obtained variable.

3.6.2 MLME Information Set Primitive (MLME-Set)

(1) Overview of Processing

The MLME-Set primitive is a primitive by which the CML sets a variable of the MLME.

(2) Definition

FIG. 33 is a figure showing arguments of the MLME-Set primitive.

mibIndex: identifier specifying a variable that requests setting.

mibStatus: identifier indicating the results of the execution of a request.

mibParameter: details of a variable to be set.

3.7 SAP of CML and PLME (PLME-CML SAP)

As the congestion control service, the CML provides the PLME with two types of primitives below.

(1) PLME information get primitive (PLME-Get)
(2) PLME information set primitive (PLME-Set)

3.7.1 PLME Information Get Primitive (PLME-Get)

(1) Overview of Processing

The PLME-Get primitive is a primitive by which the CML obtains a variable of the PLME.

(2) Definition

FIG. 34 is a figure showing arguments of the PLME-Get primitive.

mibIndex: identifier specifying a variable that requests obtainment.

mibStatus: identifier indicating results of the execution of a request.

mibParameter: details of the obtained variable.

3.7.2 PLME Information Set Primitive (PLME-Set)

(1) Overview of Processing

The PLME-Set primitive is a primitive by which the CML sets a variable of the PLME.

(2) Definition

FIG. 35 is a figure showing arguments of the PLME-Set primitive.

mibIndex: identifier specifying a variable that requests setting.

mibStatus: identifier indicating results of the execution of a request.

mibParameter: details of a variable to be set.

(4. Protocol Data Unit: PDU)

4.1 Configuration of PDU

Next, description is given of a protocol data unit (PDU) used in the CTL and the CML. FIG. 36 shows a PDU configuration in transmitting application data, and FIG. 37 shows a PDU configuration in transmitting control data. The relationship between the PDU and a service data unit (SDU) is described here, in which a status where a certain layer includes no header is referred to as the SDU and a status where the layer is provided with a header is referred to as the PDU.

In the PDU shown in FIG. 36, application data is provided with an LPP header, an LPCP header and is sent to the CTL, is provided with a C2C header in the CTL and is passed to a communication lower protocol (layer 2). In the PDU shown in FIG. 37, control data generated in the CML is passed to the CTL, is provided with the C2C header in the CTL, and is passed to the communication lower protocol (layer 2).

In the PDU shown in FIG. 36, the application data is treated as an LPP SDU on the LPP and is added with the LPP header to become an LPP PDU, which is passed to the LPCP. The passed data is treated as an LPCP SDU on the LPCP and is added with the LPCP header to become an LPCP PDU, which is passed to the CTL. On the CTL, the passed data is treated as the C2C SDU, is added with the C2C header to become the C2C PDU, and is passed to the layer 2, which is treated as a MAC SDU (MSDU) on the layer 2.

4.2 C2C Header Information

FIG. 38 is a diagram showing information of the C2C header that is the header provided in the CTL.

(1) Data Identifier

This is an identifier for distinguishing data types. "0" indicates application data (data of the upper protocol), whereas "1" indicates management data (data of the CML).

2) PDU Identifier

This is an identifier for identifying PDU types, which shows values of a data identifier and a PDU identifier shown in FIG. 39.

(3) Node Priority (Car Priority)

This is a priority (degree of risk) of a car, which is obtained by a CML variable get primitive of the CML.

(4) Channel Occupancy (Communication Channel Occupancy)

This is a ratio at which the communication band is busy within a predetermined time period. A unit thereof is %, and values of 0 to 100 are set. This is obtained by the CML variable get primitive.

(5) Cyclic Interval (Transmission Cycle)

This is a time interval of transmission at which the application periodically transmits information. A unit thereof is 10 msec, and values of 1 (10 msec) to 255 (2,550 msec) are set. This is obtained by the CML variable get primitive.

(6) Transmission Power

This is a value of transmission power that is set when the C2C header is generated. A unit thereof is 0.1 dBm, and values of −0.5 dBm to 20.0 dBm are set. This is obtained by the CML variable get primitive.

(7) Receiver Sensitivity

A value of the receiver sensitivity that is set when the C2C header is set is stored. A unit thereof is 1 dBm, and values of −127 dBm to 0 dBm are set. This is obtained by the CML variable get primitive.

(8) Reserved

A reserved area is secured.

4.3 Beacon Message (Beacon PDU)

This is a PDU that transmits beacon messages for serving as a trigger to start initial connection or for time synchronization. FIG. 40 shows a format of a beacon message.

(1) TSF Timer

This is a TSF timer for time synchronization. A value is within a range of 0 to $2^{64}$.

(2) Next Beacon Transmission Timing

This is a next timing for transmitting a beacon message. A unit thereof is msec, and a range thereof is from 0 to 1,000.

(3) CML Profile

This is a CML profile that stores a function supported by own station, application information, channel information and communication control information.

4.4 Connect Request Message (Connect Request PDU)

This is a PDU for requesting communication connection. FIG. 41 shows a format of a connection request message.

(1) Required Ack Flag (Retransmission Request Flag))

This is a flag indicating whether a retransmission processing is valid. In a case of "1", the retransmission processing of the PDU is valid, whereby a message is notified to the counterpart and a check response (Ack PDU) is required. In a case of "0", the retransmission processing is invalid.

(2) Retransmit Flag

This is a flag indicating whether a PDU is a retransmitted PDU. A case where "1" is shown indicates the retransmitted PDU.

(3) Sequence Number

This is a sequence number. A duplicate PDU is detected from a link address and a sequence number of an opposite station.

(4) CML Profile

This is a CML profile storing a function supported by own station, application information, channel information and communication information.

4.5 Connect Response Message (Connect Response PDU)

This is a PDU for responding to a connection request. FIG. 42 shows a format of a connection response message.

(1) Result Code

This shows the result as to whether or not initial connection is performed. In a case where an application to be supported is different from that of the opposite station to be connected, "not to be connected" is notified, whereas in a case where there is an application to be supported, "to be connected" is notified. FIG. 43 shows the details of the result code.

(2) Required Ack Flag (Retransmission Request Flag)

This is a flag indicating whether the retransmission processing is valid. In a case of "1", the retransmission processing of the PDU is valid, whereby the message is notified to the counterpart and the check response (Ack PDU) is required. In a case of "0", the retransmission processing is invalid.

(3) Retransmit Flag

This is a flag indicating whether a PDU is the retransmitted PDU. A case of "1" indicates the retransmitted PDU.

(4) Sequence Number

This is a sequence number. A duplicate PDU is detected from a link address and a sequence number of the opposite station.

(5) Profile Flag

This is a flag indicating whether CML profile information is added to the Connect Response PDU. In a case of "0", the CML profile is not stored in the following CML Profile field, whereas in a case of "1", the CML profile is stored in the following CML Profile field.

In a case where the CML profile has been provided by the Bacon PDU, this identifier is set to "0", and the CML profile is not stored. In a case where the Bacon PDU is not used (in a case of a connection procedure led by an application that periodically performs transmission), this identifier is set to "1", and the CML profile is stored.

(6) CML Profile

This is a CML profile storing a function supported by own station, application information, channel information and communication information.

4.6 Check Response Message (Ack PDU)

This is a PDU that returns a check response in a case where the retransmission request is made. FIG. 44 shows a format of the check response message.

(1) Retransmit Flag

This is a flag indicating whether a PDU is the retransmitted PDU. A case where "1" is shown indicates the retransmitted PDU.

(2) Sequence Number

This is a sequence number. A duplicate PDU is detected from a link address and a sequence number of an opposite station.

4.7 Congestion Control Message (Congestion Control PDU)

This is a PDU in a case where communication parameters set in surrounding cars are required for performing congestion control. FIG. 45 shows a format of a congestion control message.

(1) Transmission Power for Others (Required Transmission Power)

This is a value of transmission power required for surrounding cars. A unit thereof is 0.1 dBm, and values of −5.0 dBm to 20.0 dBm are set.

(2) Transmission Interval for Others (Required Transmission Interval)

This is a value of a transmission interval required for surrounding cars. A unit thereof is 10 msec, and values of 1 (10 msec) to 255 (2,550 msec) are set.

(3) Receiver Sensitivity for Others (Required Receiver Sensitivity)

This is a value of receiver sensitivity required for surrounding cars. A unit thereof is 1 dBm, and values of −127 dBm to 0 dBm are set.

4.8 Event Notification Message (Event PDU)

This is a PDU that notifies an opposite station of events such as errors occurring in the CTL and CML. FIG. 46 shows a format of an event notification message.

(1) eventCode

This is a code indicating the details of the event. FIG. 47 shows the details of the eventCode.

(2) extensionParameter (parameter)

This is a parameter that complements the details of the event.

(5. Operation Procedure)

Figure 48:
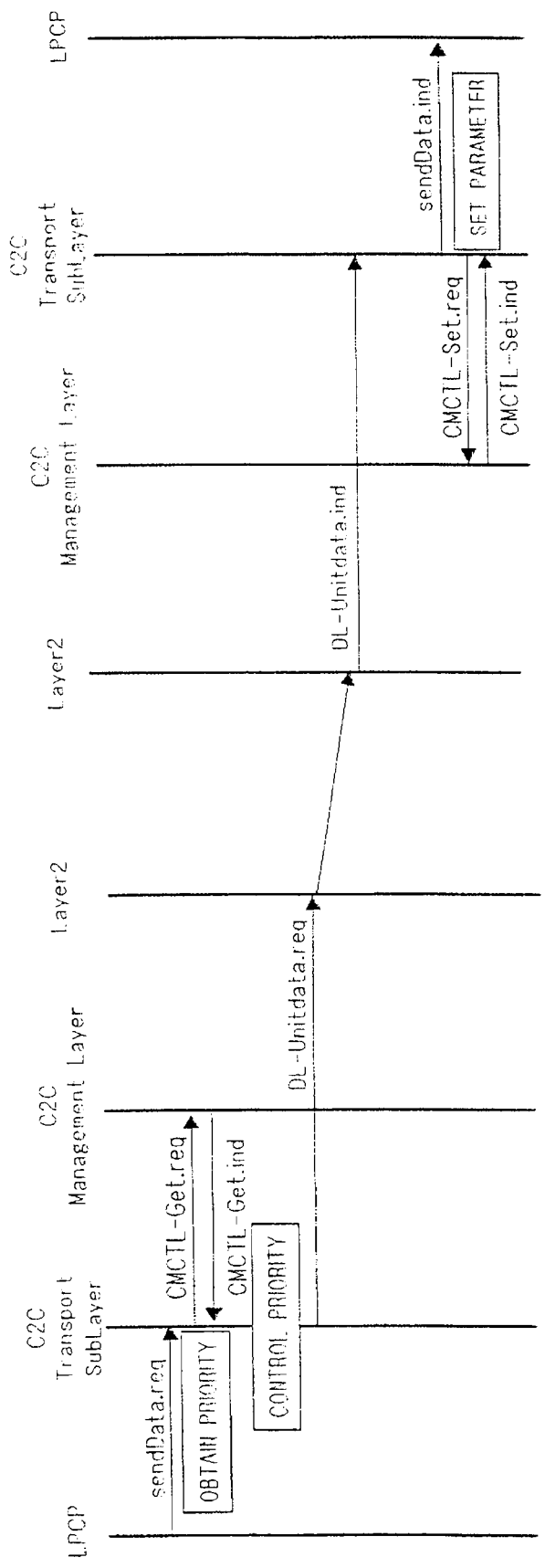
FIG. 48 is a diagram showing an example of an application data transmission/receiving procedure of the data transfer service according to the first embodiment of the present invention.

5.1 Data Transfer Procedure 5.1.1 Application Data Transmission/Receiving Procedure Description is given of a procedure of transmitting/receiving application data in the CTL. FIG. 48 shows an example of a basic processing sequence of message transfer.

(Transmitting Procedure)

(1) The CTL receives a data transmission request primitive (sendData.req) from the LPCP, and then obtains the C2C SDU from the variable parameter.

(2) The CTL refers to the LPCP control information in the C2C SDU and obtains a transmission source port number.

(3) The CTL uses a CML information get primitive (CMCTL-Get) and obtains a priority of the transmission source port number.

(4) The CTL adds a C2C Header to generate the C2C PDU, and then stores it in a queue of the obtained priority, to thereby apply a priority control processing.

(5) The CTL waits transmission through priority control, and then performs transmission by a data transmission primitive (DL-Unitdata.req) of the communication lower protocol, to thereby end a transmission processing.

The C2C SDU in the following case is invalid, and thus is not processed.

In a case where the variable linkAddress is a group broadcast link address and an address value thereof is not "0", a request primitive thereof is discarded, and a status "the designated group broadcast link address is not valid" is notified to the LPCP by an event notification primitive (eventReport).

(Receiving Procedure)

(1) The CTL receives the C2C PDU by a data transmission primitive (DL-Unitdata.ind) from the communication lower protocol, and then, retrieves a data identifier, a PDU identifier, a car priority, a channel occupancy, cyclic interval, transmission power, receiver sensitivity and user data from the PDU.

(2) In a case where the data identifier (Data Identifier) indicates "0" and the PDU identifier indicates "0" or "1", the CTL transfers the reception of data (C2C SDU) from the opposite station by a data transmission notification primitive (sendData.ind) to an upper protocol.

(3) The CTL registers the transmission source link address obtained by the DL-Unitdata.ind and the received car priority, channel occupancy, cyclic interval, transmission power and receiver sensitivity in the CML using the CML information set primitive (CMCTL-Set), and ends the reception processing.

In the following cases, the C2C PDU is invalid, and thus is not processed.

In the case where the data identifier indicates "0" and the PDU identifier does not indicate "0" or "1", its notification primitive is aborted, and a status "the designated PDU identifier is not valid" is notified to the CTL of the opposite station by an event notification message.

In the case where the data identifier is not valid, its notification primitive is aborted, and the status "the designated data identifier is not valid" is notified to the CTL of the opposite station by an event notification message.

5.1.2 Control Data Transmitting/Receiving Procedure

Figure 49:
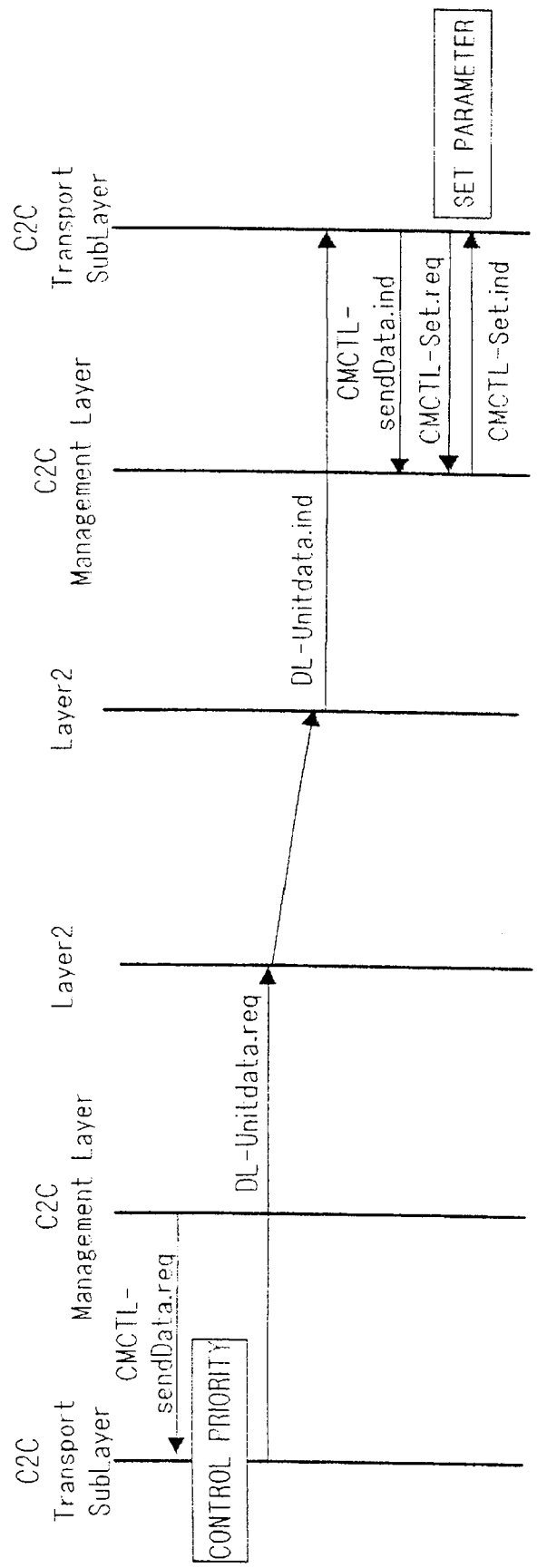
FIG. 49 is a diagram showing an example of a control data transmission/receiving procedure of the data transfer service according to the first embodiment of the present invention.

Description is given of the procedure of transmitting/receiving control data in the CTL. FIG. 49 shows an example of a basic processing sequence of message transfer.

(Transmitting Procedure)

(1) The CTL receives a control data transmission request primitive (CMCTL-SendData.req) from the CML, and obtains the C2C SDU from a variable parameter and a priority from a variable priority.

(2) The CTL adds the C2C Header, generates the C2C PDU, and stores it in a queue of the priority obtained from the variable priority, to thereby apply the priority control processing.

(3) The CTL waits transmission through priority control, and then performs transmission by a data transmission primitive (DL-Unitdata.req) of a communication lower protocol, to thereby end the transmission processing.

In the following case, the C2C PDU is invalid, and thus is not processed.

In the case where the variable linkAddress is a group broadcast link address and an address value thereof is not "0", its request primitive is aborted, and a status "the designated group broadcast link address is not valid" is notified by the event notification primitive (CMCTL-EventReport) to the CML.

(Receiving Procedure)

(1) The CTL receives the C2C PDU by the data transmission primitive (DL-Unitdata.ind) from the communication lower protocol, and retrieves a data identifier, a PDU identifier, a car priority, a channel occupancy, a cyclic interval, a receiver sensitivity and user data from the PDU.

(2) In a case where the data identifier (Data Identifier) indicates "1", the CTL notifies the CML of the reception of data from the opposite station by a control data transmission notification primitive (CMCTL-SendData.ind).

(3) The transmission source link address obtained by the DL-Unitdata.ind, the received car priority, channel occupancy, cyclic interval, transmission power and receiver sensitivity are registered in the CML using the CML information set primitive (CMCTL-Set), and ends the reception processing.

5.2 Priority Control Service Procedure (1) The CTL retrieves the data stored in the queue for each priority in a descending order of priority, and transmits the data using a data transmission primitive (DL-Unitdata.req).

(2) When the queue with high priority becomes empty, the CTL retrieves and transmits the data from a queue with a priority lower by one.

In the priority queue, only data of an information exchange application that periodically transmits information is stored in a queue with a "Middle" priority, and in a case where new data is stored, old data in the queue is aborted and the most recent data is held. Note that emergency information is stored in a queue with a "High" priority, and non-real-time information is stored in a queue with a "Low" priority.

5.3 Congestion Control Service Procedure 5.3.1 Communication Control Procedure

Figure 50:
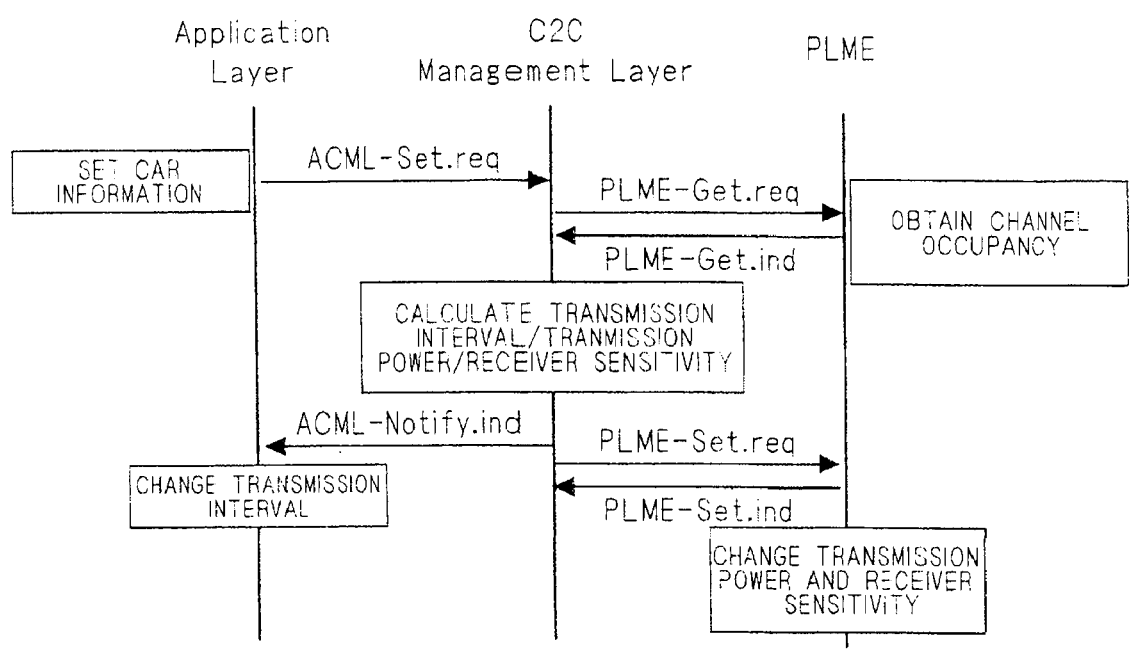
FIG. 50 is a diagram showing an example of a procedure of the congestion control service according to the first embodiment of the present invention.

In the congestion control, the following procedure is periodically performed in a case where car information is changed. FIG. 50 shows a basic sequence of the congestion control in the CML.

(1) The application sets car information of own car and car information received from the surrounding cars to the CML using the application information set primitive (ACML-Set).

(2) The CML periodically obtains occupancy information of a communication channel for the PLME using the PLME information get primitive (PLME-Get).

(3) The CML calculates the cyclic interval, transmission power and receiver sensitivity to be set for avoiding congestion from the collected information. Here, a specific algorithm for calculating each parameter is described in 5.3.1.1.

(4) The CML notifies the application that periodically transmits information of the cyclic interval calculated, using the application notification primitive (ACML-Notify).

(5) The application repeatedly transmits car information at the following timing and thereafter in accordance with the notified cyclic interval.

(6) The CML sets the calculated transmission power and receiver sensitivity to the PLME, using the PLME information set primitive (PLME-Set).

(7) In the communication lower protocol, the following transmission/reception is started in accordance with the set transmission power and receiver sensitivity. In this case, the transmission power and receiver sensitivity to be set may be switched depending on a type of a channel to be transmitted.

5.3.1.1 Congestion Control Algorithm

The congestion control algorithm in the CML is described. First, description is given of collecting and setting of the information required for the congestion control. The positions, speeds, acceleration speeds and driving directions of own car and surrounding cars are set in the CML by an application, and communication control parameters (channel occupancy, cyclic interval, transmission power and receiver sensitivity) of own car and communication control parameters of surrounding cars are stored in the CML as well. Further, the required communication distance used in this case may be calculated in the CML or may be calculated by the application and set by the CML information set primitive.

Next, description is given of the congestion control for controlling the cyclic interval.

(Cyclic Interval Control Algorithm)

In the present invention, a value of the cyclic interval in accordance with specifications required for the application is applied in the case where the communication channels are not crowded, and in the case where the communication channels become crowded, a technique of gradually increasing the cyclic interval is applied.

First, a maximum value Omax(t) is selected from a communication channel occupancy Oi(t) of own car and communication channel occupancies Oj(t) of surrounding cars.

$$Omax(t) = \max\{Oi(t), Oj(t)\} (j=1,\ldots,N)$$

where N represents the number of cars in communication with the own car i.

Next, the cyclic interval is calculated based on the communication channel occupancy Omax(t). Here, a cyclic interval T(t+1) is set so as to converge on a target communication channel occupancy Oth, based on the communication channel occupancy. The feedback control is performed with the use of a difference between a target value and a maximum value using the channel occupancy detected by own car, the channel occupancies of the surrounding cars and the target channel occupancy, and then the cyclic interval is calculated as represented by the following expression.

$$T(t+1) = T(t) + K \times \{Omax(t) - Oth\} + K/I \times \int \{Omax(t) - Oth\} dt + K \times Td \times d/dt \{Omax(t) - Oth\}$$

where T(t+1) represents the cyclic interval to be applied next, T(t) represents the cyclic interval applied last time, the Omax(t) represents the maximum communication channel occupancy, K represents a proportional gain, I represents an integration time, and Ts represents a derivative time. Owing to setting values of those proportional gain, integration time and derivative time, it is possible to change the time required for the communication channel occupancy to converge on the target threshold value. In addition, the reliability of communication to be achieved can be changed by adjustment of the target channel occupancy, and thus it is possible to set a target channel occupancy in accordance with the reliability required for the application.

Next, description is given of the congestion control of controlling the transmission power.

(Transmission Power Control Algorithm)

Similarly to the transmission interval, it is conceivable that congestion may be efficiently avoided by controlling the transmission power, and hence in a case of getting crowded, the communication area is narrowed down.

Also in the case where the transmission power is controlled, there is used a technique of limiting the communication channel occupancy to the target value at which the communication reliability is expected to be secured. When the transmission power of own car is narrowed down, it is possible for surrounding cars to reduce a communication traffic amount. For this reason, by performing control based on the largest value of the communication channel occupancy of the surrounding cars, it is possible to efficiently limit the communication traffic amount detected by the car with the highest channel occupancy.

In calculating the transmission power, the feedback control is applied as in the cyclic interval, and the transmission power is calculated such that the number of cars capable of communicating with own car is equal to or less than a given number. First, a communication channel occupancy O(t) of own car is calculated from a transmission interval Tj(t) (j=1, . . . , N) received from the surrounding cars and the number N (number) of communication cars grasped by own car as follows.

$$O(t) = \sum_{j=1}^{N} \{1/Tj(t)\} \times S/C \quad \text{[Expression 1]}$$

where S represents a data size (bit) to be transmitted, and C represents a transmission speed (bit per sec).

Next, the number of communication cars m (number) where the communication channel occupancy O(t) is smaller than the target channel occupancy Oth is calculated. Setting is made such that j=1, 2, 3, . . . , N, in order from a surrounding car with a small distance Dj from own car, and when the first j satisfying O(t)>Oth is made one, setting is made such that m=1−1. The distance between cars in this case is Dm, which is a target communication distance.

The required communication distance D(t+1) is calculated as expressed by the following expression such that the number of cars capable of communicating with own car converges on m (number).

$$D(t+1) = D(t) + K \times \{n(t) - m\} + K/I \times \int \{n(t) - m\} dt + K \times Td \times d/dt\{n(t) - m\}$$

where D(t+1) represents a communication distance to be transmitted next, D(t) represents a communication distance set last time, n(t) represents the number of cars being currently in communication with own car, K represents a proportional gain, I represents an integration time, and Td represents a derivative time. Note that the same values as those of the cyclic interval control algorithm may be applied to the proportional gain, integration time and derivative time in this case or different values may be applied thereto.

Next, the transmission power P(t+1) for achieving the communication distance D(t+1) is calculated in accordance with communication specifications set in advance, which is applied as new transmission power.

(Receiver Sensitivity Control Algorithm)

An area capable of being received by own car can be limited by controlling the receiver sensitivity. The congestion occurring in the opposite car is avoided by transmission power, whereas the congestion occurring in own car is avoided by receiver sensitivity. Accordingly, when part of a difference between the transmission power P(t+1) calculated in the transmission power control algorithm and the former transmission power P(t) is distributed to the receiver sensitivity, it is possible to select whether to alleviate congestion in the opposite car or to alleviate congestion in own car.

First, in the case of only the transmission power control, the transmission power is set to be smaller by a (a=P(t+1)−P(t)) (dBm). Here, the receiver sensitivity control is employed, and part b (dBm) is distributed to the receiver sensitivity. Then, by setting the transmission power to be smaller by (a−b) (dBm) and setting the receiver sensitivity to be larger by b (dBm), it is possible to alleviate the congestion as in the case of using the transmission power control.

5.3.2 Congestion Control Message Transmitting Procedure

The congestion control message is transmitted in the following procedure.

(Transmitting Procedure)

(1) When a transmission opportunity of the congestion control message comes, the CML determines a communication control parameter value to be specified to the opposite station. For example, in the present invention, the transmission opportunity of the congestion control message is made in a case where the communication channel occupancy exceeds 40% or in a case where a transmission request of the congestion control message is made from the application processing section 3. Further, a value set in own station is applied to the communication control parameter value to be specified to the opposite station.

(2) The CML generates a Congestion Control PDU, and issues a control data transmission request primitive (CM-CTL-SendData.req) to the CTL.

(Receiving Procedure)

(1) When receiving a control data transmission notification primitive (CMCTL-SendData.ind) from the CTL, the CML retrieves a communication control parameter value specified by the variable parameter.

(2) The CML compares the car priority of the opposite station with the car priority of own station, and if the opposite station has a higher car priority and a larger communication channel occupancy, the CML sets those to the parameter designated by the opposite station to perform communication.

5.4 Initial Connection Procedure 5.4.1 Procedure of Starting Initial Connection (1) The application requests connection for performing point-to-point communication from the CML using a connection start primitive (ACML-Connection).

(2) In a case where the variable connectionFlag of the ACML-Connection indicates "1", the CML sets "1" to the connection request flag because the application performs point-to-point communication (in a case where the connection request flag is "1", the initial connection sequence is started when a broadcast message and a beacon message are received from a surrounding station).

(3) The CML refers to the application information table to check whether the broadcast application for periodically transmitting car information is supported.

(a) In a case where the broadcast application is supported, the CML sets "0" to the beacon message (Beacon PDU) transmission flag and starts the initial connection sequence upon receiving the broadcast application message as described in 5.4.3.

(b) In a case where the broadcast application is not supported and in a case where the variable beaconFlag of the connection start primitive indicates "1", the CML sets "1" to the beacon message (Beacon PUD) transmission flag, and starts the transmission sequence of the beacon message as descried in 5.4.2.

5.4.2 Initial Connection Procedure Using Beacon Message

Figure 51:
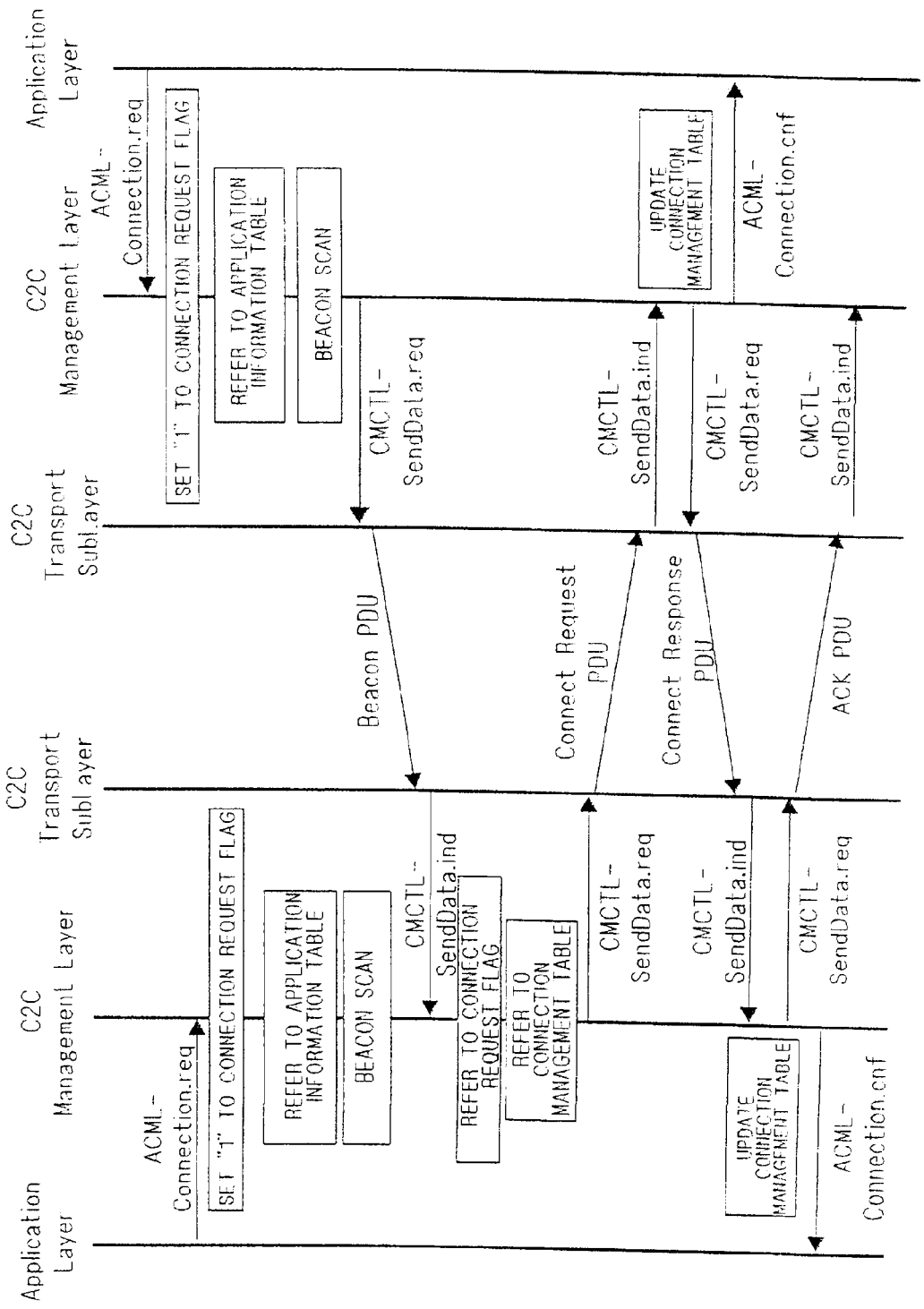
FIG. 51 is a diagram showing an example of an initial connection procedure utilizing the Beacon PDU according to the first embodiment of the present invention.
Figure 52:
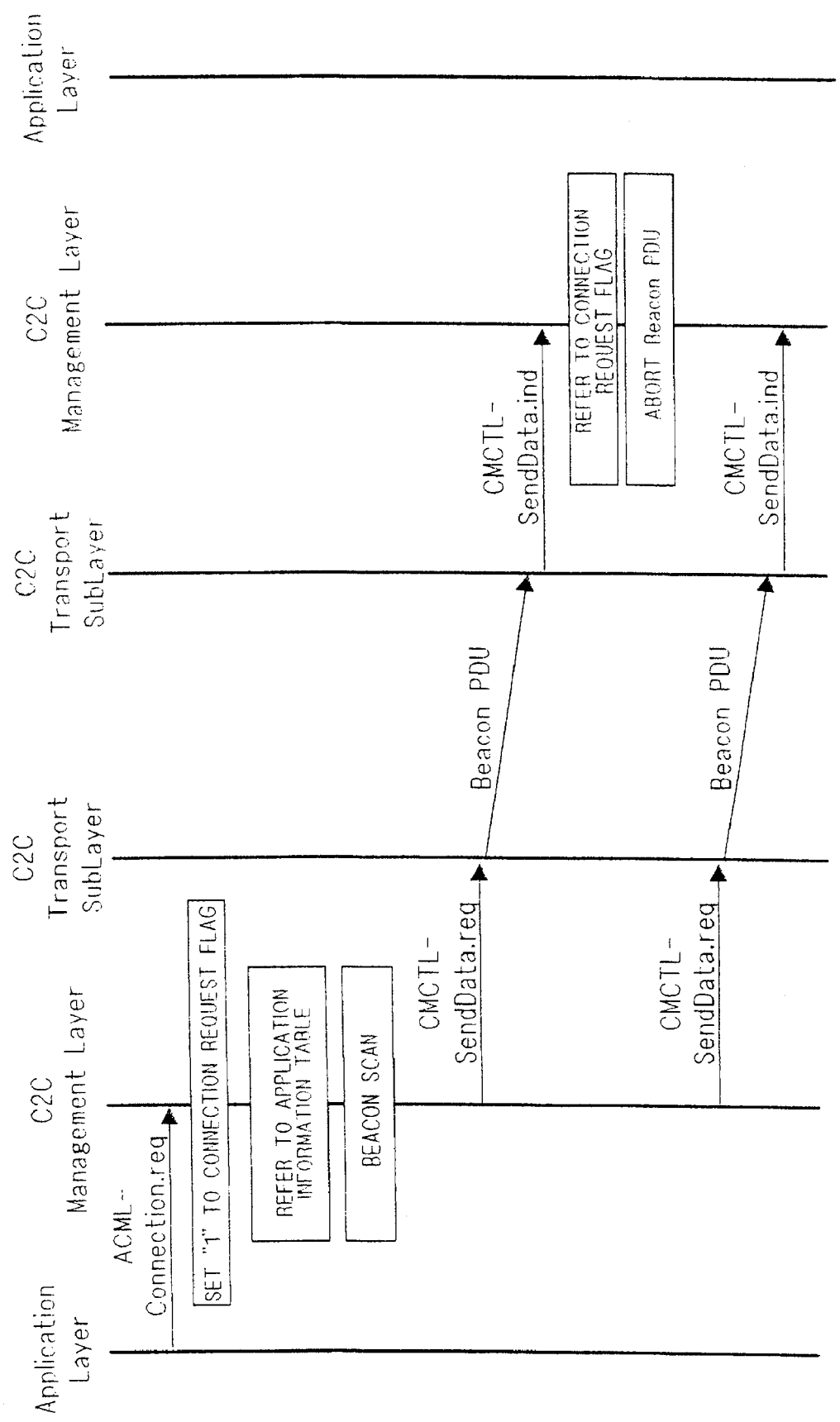
FIG. 52 is a diagram showing an example of Beacon PDU abortion of the initial connection procedure according to the first embodiment of the present invention.

FIG. 51 shows a basic sequence of an initial connection procedure in a case where a beacon message in the CML is used. FIG. 52 shows a sequence in a case where a beacon message in the initial connection procedure using the beacon message in the CML is aborted.

(1) The CML checks whether a surrounding station transmits a beacon message. The CML activates a beacon scan timer for performing beacon scan.

(a) When having received the Beacon PDU from a surrounding station before time-out of the beacon scan timer, the CML starts the initial connection sequence in accordance with the procedure described in (3) and thereafter.

(b) When not having received the Beacon PDU from a surrounding station before time-out of the beacon scan timer, the CML starts the initial connection sequence in accordance with the procedure described in (2) and thereafter.

(2) The CML generates the Beacon PDU and requests transmission from the CTL using the control message transmission primitive (CMCTL-SendData).

(3) When the message indicating the Beacon PDU is notified from the CTL by the control message transmission primitive, the CML refers to a connection management table for checking a connection status.

(a) In a case of "connected", the received Beacon PDU is aborted, and the initial connection sequence is ended.

(b) In a case of "not connected", the connection request flag is referred to. When the connection request flag indicates "1", the CML registers the CML profile in the connection management table from the LinkAddress of the opposite station and the received Beacon PDU, generates a Connect Request PDU, and requests transmission from the CTL using the control message transmission primitive (CMCTL-SendData). When the connection request flag indicates "1", the CML does not start the initial connection sequence.

(4) When the message indicating the Connect Request PDU is notified from the CTL by the control message transmission primitive, the CML refers to the connection management table for checking a connection status.

(a) In a case of "connected", the received Connect Request PDU is aborted, and the CML returns the resultCode "connected" using the Connect Response PDU.

(b) In a case of "not connected", the CML registers the CML Profile in the connection management table from the LinkAddress of the opposite station and the received Connect Request PDU and sets "connected". The CML generates the Connect Response PDU, and requests transmission from the CTL using the control message transmission primitive (CMCTL-SendData).

(5) When the message indicating the Connect Response PDU is notified from the CTL by the control message transmission primitive, the CML refers to the connection management table for checking a connection status. The CML sets "connected" in the connection management table correspondingly to the LinkAddress of the opposite station. The CML generates the Ack PDU, and requests transmission from the CTL using the control message transmission primitive (CMCTL-SendData).

(6) When the message indicating the Ack PDU is notified from the CTL by the control message transmission primitive, the CML returns a connection start response primitive (ACML-Connection.cnf) to the application, and ends the initial connection sequence.

5.4.3 Initial Connection Procedure Using Broadcast Application

Figure 53:
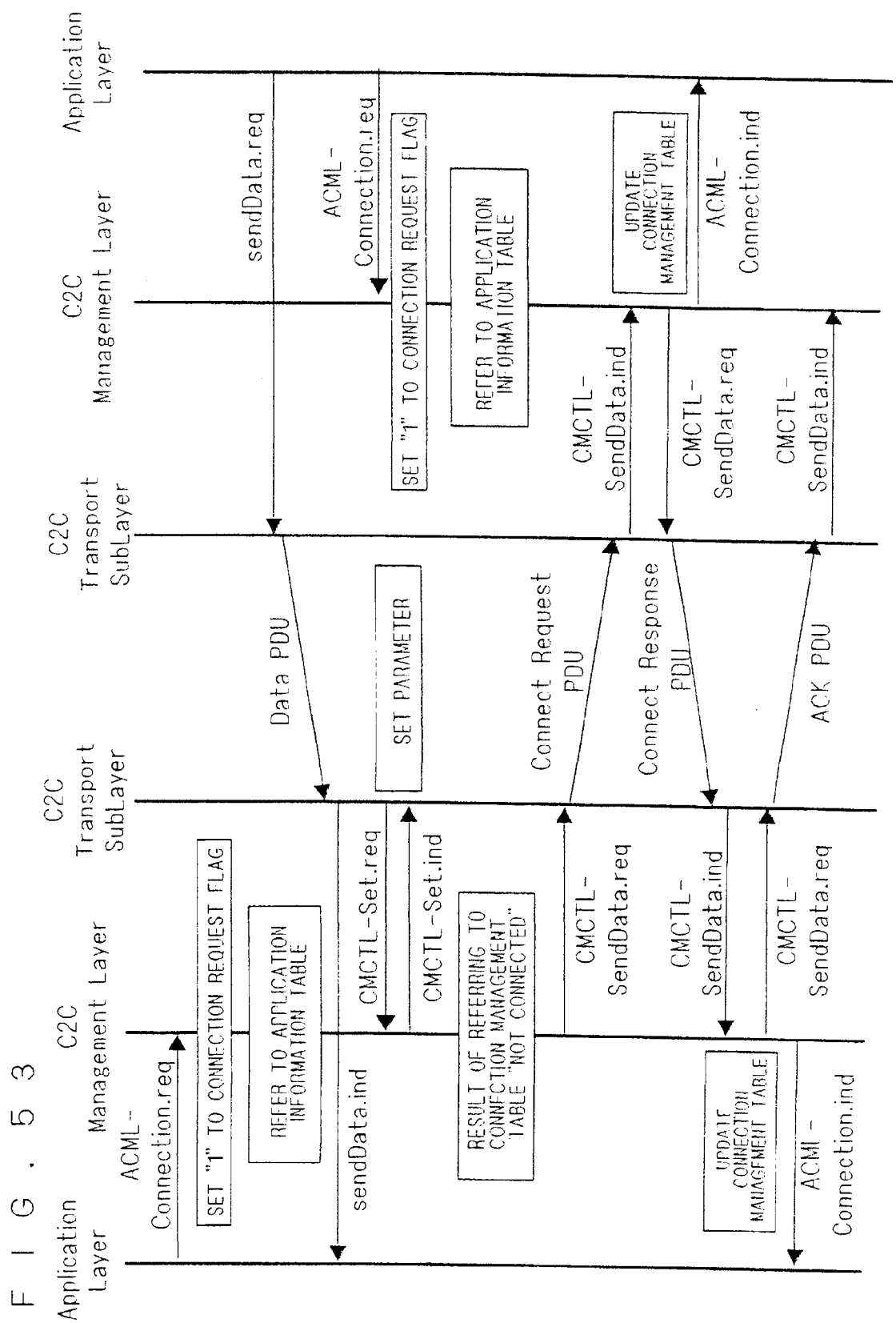
FIG. 53 is a diagram showing an example of an initial connection procedure utilizing a broadcast application according to the first embodiment of the present invention.

FIG. 53 shows a basic sequence of an initial connection procedure in a case where a broadcast application in the CML is used. FIG. 54 shows a sequence in a case where connection of an initial connection procedure using the broadcast application in the CML is not performed. Note that the initial connection procedure using the application that periodically transmits information is supported only when a single channel is used.

(1) After the CTL receives data of the broadcast application from the opposite station, the CML uses the CML information set primitive from the CTL to refer to the connection management table when the registration of information contained in the C2C Header is requested, and then checks the connection status with the opposite station.

(a) In a case of "connected", the initial connection sequence is ended.

(b) In a case of "not connected", the CML refers to the connection request flag. When the connection request flag indicates "1", the CML generates the Connect Request PDU, and requests transmission from the CTL using the control message transmission primitive (CMCTL-SendData). When the connection request flag indicates "0", the CML does not start the initial connection sequence.

(2) When the message indicating the Connect Request PDU is notified from the CTL by the control message transmission primitive, the CML refers to the connection management table for checking a connection status.

(a) In a case of "connected", the CML aborts the received Connect Request PDU, and returns the resultCode "connected" using the Connect Response PDU.

(b) In a case of "not connected", the CML refers to the connection request flag. When the connection request flag indicates "1", the CML registers the CML Profile in the connection management table from the LinkAddress of the opposite station and the received Connect Request PDU and sets "connected". The CML generates the Connect Response PDU, and requests transmission from the CTL using the control message transmission primitive (CMCTL-SendData). When the connection request flag indicates "0", the CML returns "not to be connected" using the Connect Response PDU.

(3) When the message indicating the Connect Response PDU is notified from the CTL by the control message transmission primitive, the CML refers to the variable resultCode. In a case where "not to be connected" is indicated, the CML aborts the Connect Response PDU, whereas in a case where "to be connected" is indicated, the CML refers to the connection management table for checking the connection status. The CML sets "connected" in the connection management table to the LinkAddress of the opposite station. The CML generates the Ack PDU, and requests transmission from the CTL using the control message transmission primitive (CMCTL-SendData).

(4) When the message indicating Ack PDU is notified from the CTL by the control message transmission primitive, the CML returns a connection start response primitive (ACML-Connection.cnf) to the application, and ends the initial connection sequence.

5.4.4 Connection Status Notifying Procedure

When the connection with the opposite station is established, the CML notifies the CTL that the "connection is established", with the use of the event notification primitive. When notified that the connection is established, the CTL notifies the upper layer using the event notification primitive. In addition, in a case of the disconnection with the opposite station due to time-out or the like, the event "disconnected" is notified in a similar procedure. FIG. 55 shows an example of the procedure of notifying the connection status.

(1) The CML receives a Connect Request PDU and a Connect Response PDU, and the communication connection with the opposite station is established.

(2) The CML notifies the CTL of the establishment of connection using the event notification primitive (CMCTL-EventReport).

(3) The CTL notifies the upper layer of the establishment of connection using the event notification primitive (EventReport.ind).

5.5 Application Registering/Deregistering Procedure

FIG. 56 shows the procedures of registering and deregistering application information in the CML.

5.5.1 Registering Procedure (1) Each application of a mobile station is registered in the CML, when becoming available, using the application registration request primitive (ACML-Registration.req).

(2) The CML updates the application information table.

(3) The CML notifies the application of the registration results using the application registration notification primitive (ACML-Registration.ind).

5.5.2 Deregistering Procedure (1) Each application of a mobile station is notified to the CML, when becoming unavailable, using the application deregistration primitive (ACML-Deregistration).

(2) The CML updates the application information table.

(3) The CML notifies the application of the deregistration results using the application deregistration notification primitive (ACML-Deregistration.ind).

5.6 Retransmission Control Procedure

Figure 57:
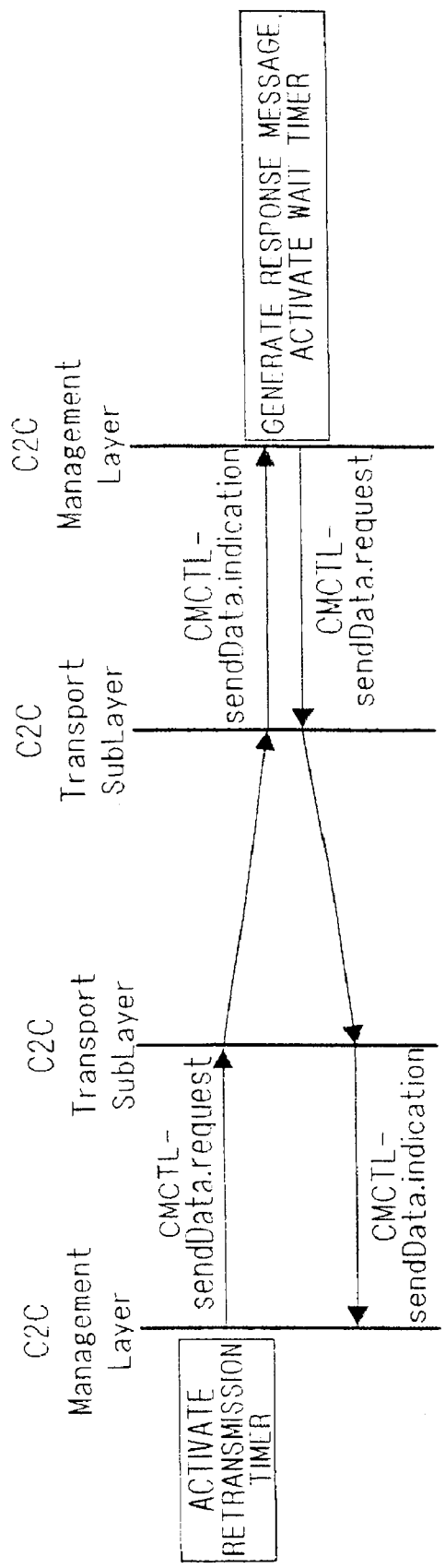
FIG. 57 is a diagram showing a data transfer procedure (basic sequence) in a case where a retransmission processing according to the first embodiment of the present invention is valid.
Figure 58:
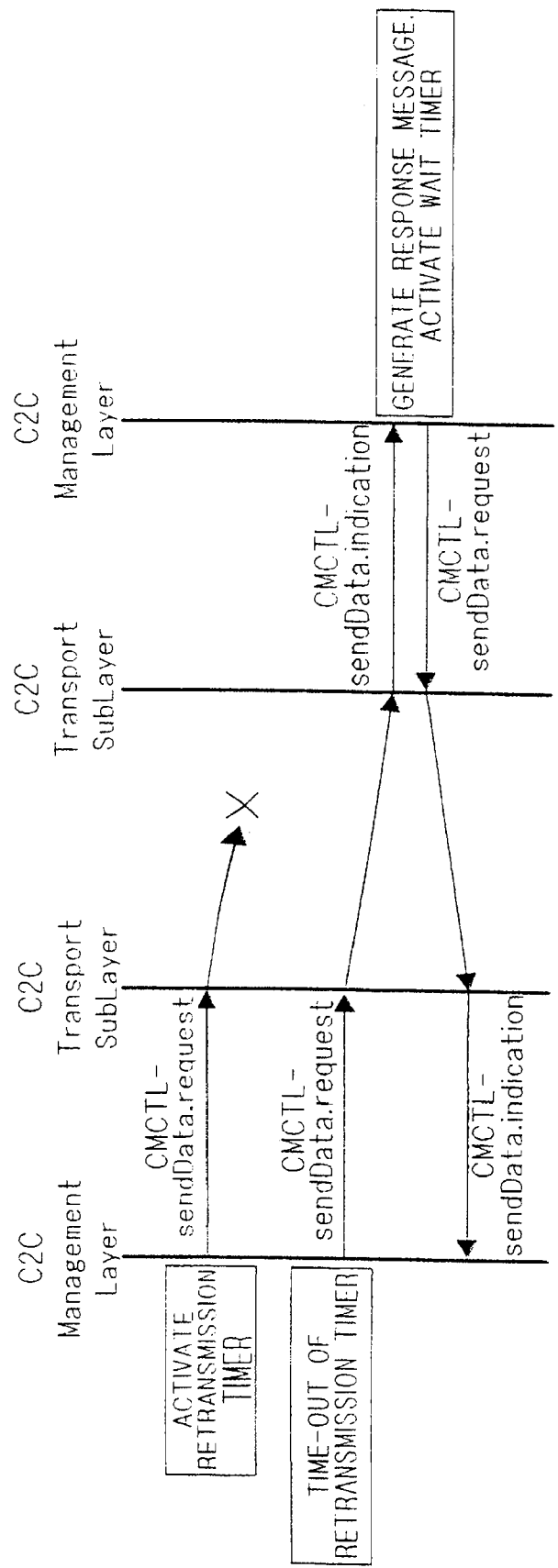
FIG. 58 is a diagram showing an example of a retransmission processing procedure according to the first embodiment of the present invention.
Figure 59:
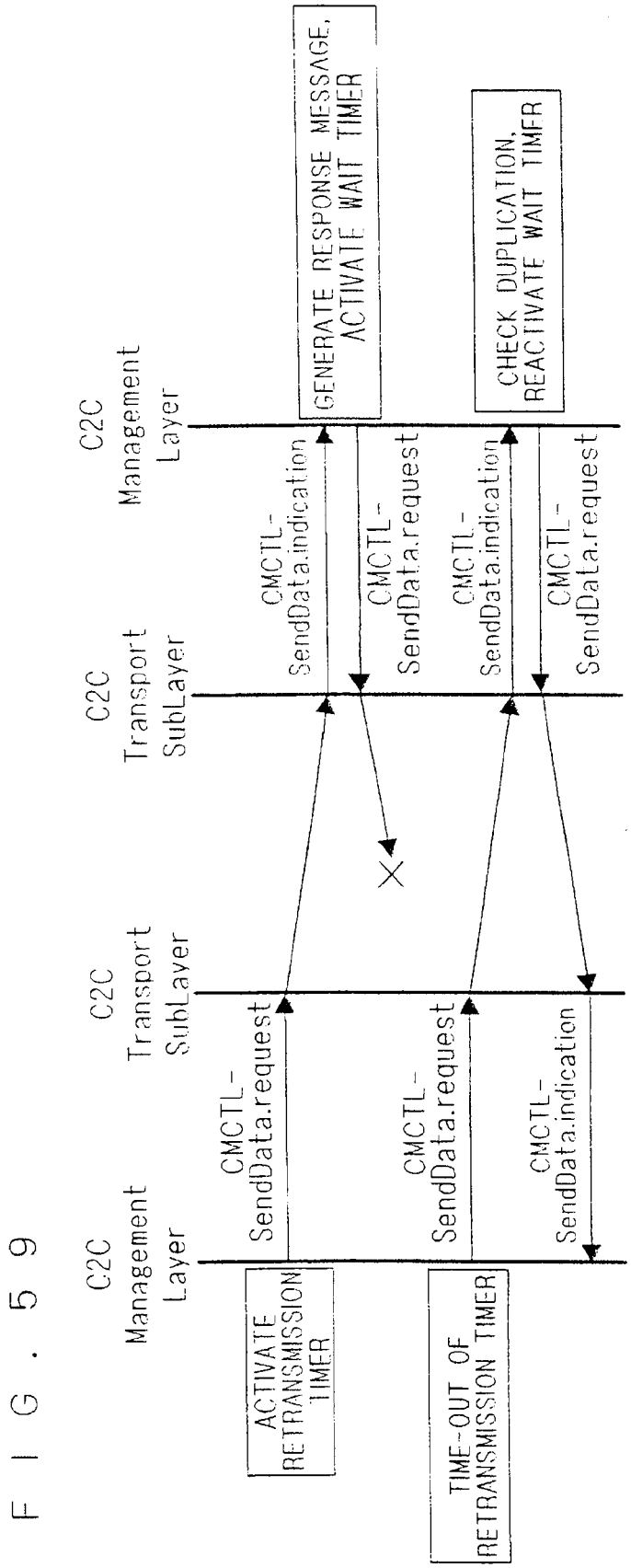
FIG. 59 is a diagram showing an example of a duplication check procedure in the retransmission processing according to the first embodiment of the present invention.

FIG. 57 shows an example of a basic processing sequence in the CML when the retransmission processing is valid, FIG. 58 shows an example of a processing sequence in the CML when retransmission is performed, and FIG. 59 shows an example of a sequence in the CML when duplicate check is performed in the retransmission processing.

(Transmitting Procedure)

(1) In a case where the CML transmits control data (connection request message, connection response message), the connection management service in which the retransmission processing is valid is started.

(2) The CML creates the PDU in which the Required Ack Flag (retransmission request flag) indicates "1", and requests transmission from the CTL using the control message transmission primitive (CMCTL-SendData.req).

(3) The CML requests transmission and activates a retransmission timer at the same time, holds the PDU, and waits the reception of the response message from the opposite station.

(4) When receiving the response message from the opposite station before time-out of the retransmission timer, the CML stops the retransmission timer, aborts the held PDU, and ends this transaction.

(5) In a case of time-out of the retransmission timer before receiving the response message for any reason, for example, for the reason that the PDU transmitted in (3) has not reached the opposite station, the CML sets "1" to the retransmit flag (retransmission flag). Then, the CML requests transmission of the PDU from the CTL and reactivates the retransmission timer at the same time, to thereby increment the retransmission counter by one.

(6) In a case where the response message cannot be received even by repeating transmission several times, and accordingly the retransmission counter exceeds a maximum retransmission number, the CML aborts the held PDU, to thereby end this transaction.

(Receiving Procedure)

(1) In a case of receiving the PDU in which the Required Ack Flag (retransmission request flag) indicates "1" from the CTL by the control message transmission notification primitive (CMCTL-SendData.ind), the CML generates the response message, and requests transmission from the CTL using the control message transmission primitive (CMCTL-SendData.req).

(2) The CML requests transmission, and at the same time, activates a wait timer.

(3) In a case of receiving the same CML-SDU again from any reason, for example, the reason that the response message transmitted in (2) has not reached the opposite station, the CML aborts the received PDU, generates the response message again, and requests transmission from the CTL using the control message transmission primitive (CMCTL-SendData.req), to thereby reactivate the wait timer.

(4) Upon time-out of the wait timer started in (2) or (3), the CML ends this transaction.

The on-board communication device and the cooperative road-to-vehicle/car-to-car communication system according to the first embodiment operate in accordance with the specifications of the car-to-car sub-protocol described above.

A-3. Operation of on-Board Communication Device 100

Hereinafter, the operations of respective parts of the on-board communication device 100 according to the first embodiment are described with reference to FIG. 60 to FIG. 71 while referring to FIG. 2.

(A-3-1. Operation of Data Transfer Service Processing Section 11)

Figure 60:
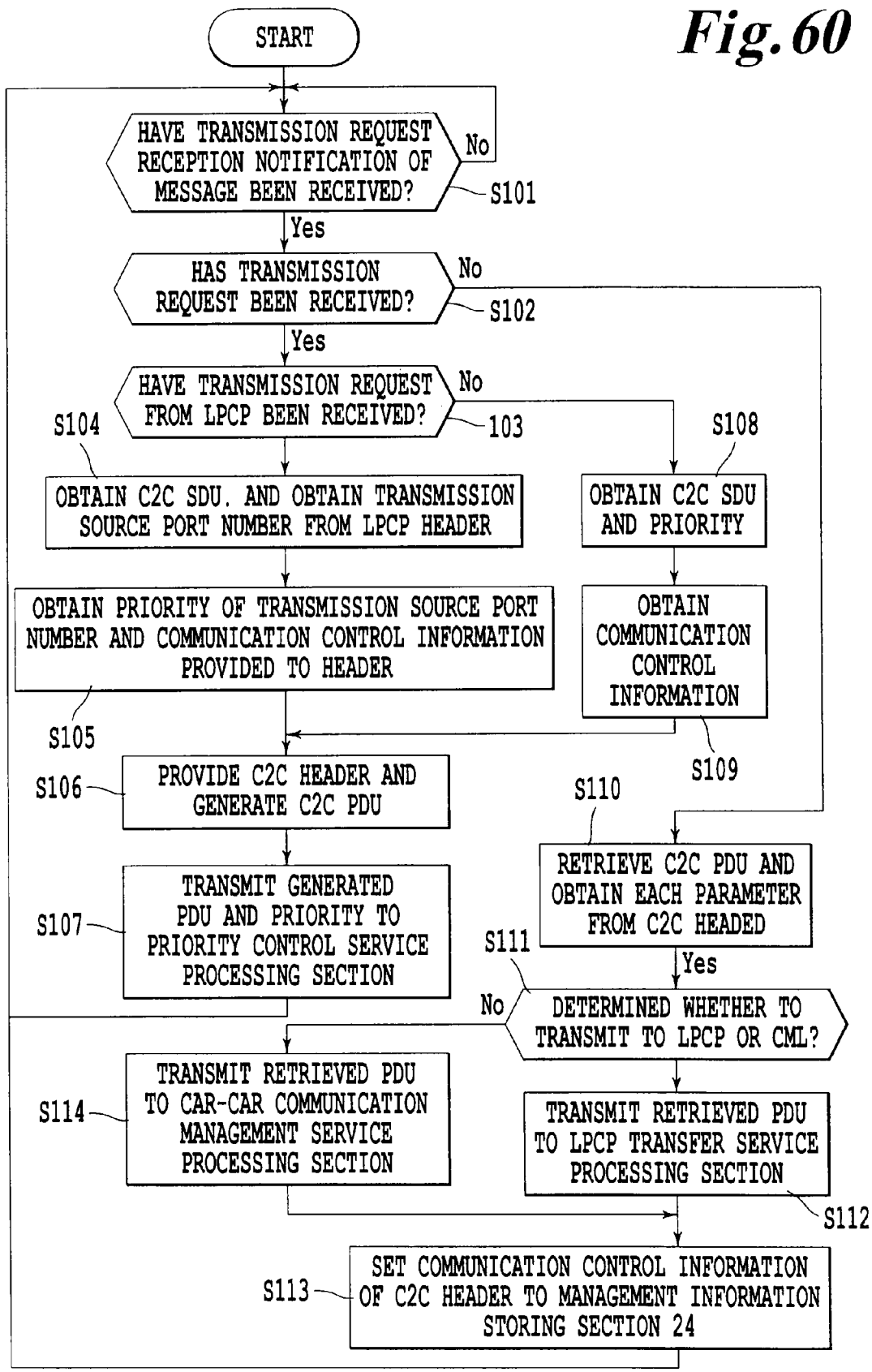
FIG. 60 is a flowchart showing a processing procedure of a data transfer service processing section of a car-to-car communication transfer service processing section according to the first embodiment of the present invention.

FIG. 60 is a flowchart showing the operation of the data transfer service processing section 11 of the car-to-car communication transfer service processing section 1.

The data transfer service processing section 11 waits until the transmission request of a message and the reception of a reception notification are received (Step S101). In a case where the transmission request and the reception notification have not been received (in a case of "No"), the data transfer service processing section 11 keeps waiting for the reception of the transmission request and the reception notification. To the contrary, in a case where the transmission request and the reception notification have been received (in a case of "Yes"), the process proceeds to Step S102.

In Step S102, the data transfer service processing section 11 identifies the transmission request and the reception notification of the data received in Step S101, and the process proceeds to Step S103 in a case of the transmission request (in a case of "Yes"). To the contrary, the process proceeds to Step S110 in a case of the reception notification (in a case of "No).

In Step S103, the data transfer service processing section 11 identifies whether the transmission request received in Step S102 is a request from the transfer service processing section 5 or a request from the car-to-car communication management service processing section 2, and in a case of the request from the transfer service processing section 5 (in a case of "Yes"), the process proceeds to Step S104. To the contrary, in a case of the request from the car-to-car communication management service processing section 2 (in a case of "No"), the process proceeds to Step S108.

Next, in Step S104, the data transfer service processing section 11 retrieves data (C2C SDU) to be transmitted from the primitive issued by the LPCP transfer service processing section 51, and obtains the transmission source port number from the LPCP header.

In Step S105, the data transfer service processing section 11 obtains, from the management information storing section 24 of the car-to-car communication management service processing section 2, the priority of the application indicating the transmission source port number and the parameter of communication control information provided to the message.

Then, in Step S106, the data transfer service processing section 11 creates the C2C header from the obtained communication control information and generates the C2C PDU.

Next, in Step S107, the data transfer service processing section 11 transmits the C2C PDU generated in Step S106 and the priority obtained in S105 to the priority control service processing section 13, and the data transmission processing from the transfer service processing section 5 is ended.

When the received data is identified as the transmission request from the car-to-car communication management service processing section 2 in Step S103, first, in Step S108, the data transfer service processing section 11 obtains the data (C2C SDU) to be transmitted and the priority from the primitive issued from the car-to-car communication management service processing section 2.

Next, in Step S109, the data transfer service processing section 11 obtains a parameter of communication control information provided to the C2C header from the management information storing section 24 of the car-to-car communication management service processing section 2.

Then, the data transfer service processing section 11 performs the processings of Steps S106 and S107, and ends the data transmitting procedure of the car-to-car communication management service processing section 2.

Further, when it is identified in Step S102 that the reception notification of data has been received, in Step S110, the data transfer service processing section 11 obtains the received data (C2C PDU) from the primitive issued from the transmission/reception service processing section 6. Moreover, the data transfer service processing section 11 obtains each parameter from the C2C header.

Next, in Step S111, the data transfer service processing section 11 refers to a data identifier (Data Identifier) for selecting a delivery destination of the received data, and determines whether to transmit the received data to the transfer service processing section 5 (LPCP) or the car-to-car communication management service processing section 2 (CML).

In a case where the data identifier indicates "0" (in a case of "Yes") in Step S111, the process proceeds to Step S112. To the contrary, in a case where the data identifier indicates "1" (in a case of "No"), the process proceeds to Step S114.

Then, in Step S112, the data transfer service processing section 11 transmits the received C2C SDU to the LPCP transfer service processing section 51 of the transfer service processing section 5.

Next, in Step S113, the data transfer service processing section 11 sets the communication control information of the received C2C header to the management information storing section 24 of the car-to-car communication management service processing section 2, whereby the data receiving procedure is ended.

On the other hand, when it is determined in Step S111 that the received data is transmitted to the car-to-car communication management service processing section 2, in Step S114, the data transfer service processing section 11 transmits the obtained C2C SDU data to the car-to-car communication management service processing section 2. Next, the processing of Step S113 is performed, whereby the data receiving procedure is ended.

Note that after the processings of Steps S107 and S113 are ended, the process returns to Step S101, and the data transfer service processing section 11 waits until a transmission request and a reception notification of the next message are received.

(A-3-2. Operation of Event Notification Service Processing Section 12)

Figure 61:
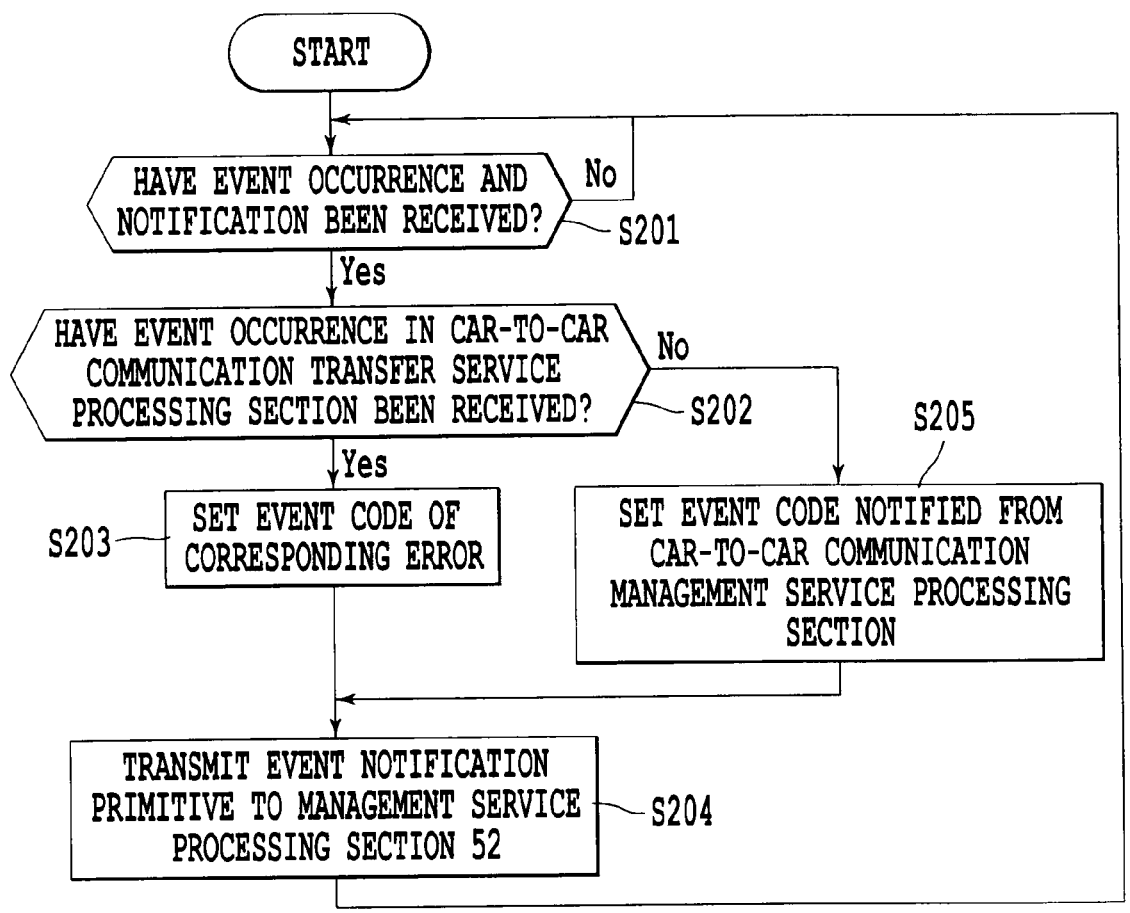
FIG. 61 is a flowchart showing a processing procedure of an event notification service processing section of the car-to-car communication transfer service processing section according to the first embodiment of the present invention.

FIG. 61 is a flowchart showing an operation of the event notification service processing section 12 of the car-to-car communication transfer service processing section 1.

The event notification service processing section 12 waits until receiving the event notification for notifying the occurrence of an error or event (Step S201). In a case of not having received the event notification (in a case of "No"), the event notification service processing section 12 keeps a standby state. To the contrary, in a case of having received the event notification (in a case of "Yes"), the process proceeds to Step S202.

In Step S202, the event notification service processing section 12 identifies whether the event notification received in Step S201 is an event in the car-to-car communication transfer service processing section 1 or the event notified from the car-to-car communication management service processing section 2, and in the case of the event of the car-to-car communication transfer service processing section 1 (in a case of "Yes"), the process proceeds to Step S203. To the contrary, in the case of the event of the car-to-car communication management service processing section 2 (in a case of "No"), the process proceeds to Step S205.

Next, in Step S203, the event notification service processing section 12 sets an event code corresponding to the occurred error or event.

Then, in Step S204, the event notification service processing section 12 transmits the event notification primitive to the management service processing section 52 and ends the event notification processing.

On the other hand, when it is identified in Step S202 that the received event notification is the event notification from the car-to-car communication management service processing section 2, the event notification service processing section 12 sets the event code notified from the car-to-car communication management service processing section 2 to the event code of the event notification service processing section 12 (Step S205).

Next, the event notification service processing section 12 performs the processing of Step S204 and ends the event notification processing. Note that the process returns to Step S201 after the processing of Step S204 is ended, and the following processing is executed.

(A-3-3. Operation of Priority Control Service Processing Section 13)

Figure 62:
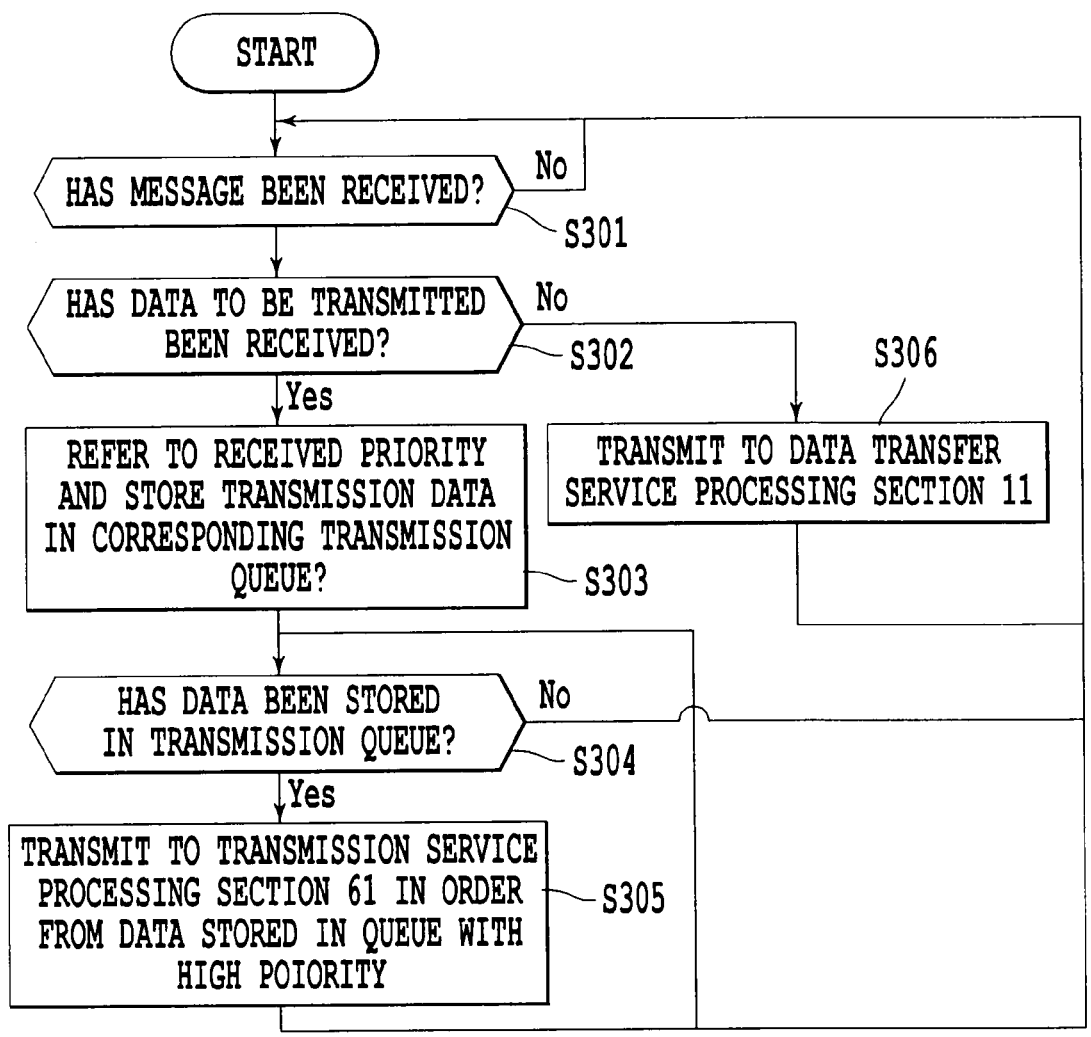
FIG. 62 is a flowchart showing a processing procedure of a priority control service processing section of the car-to-car communication transfer service processing section according to the first embodiment of the present invention.

FIG. 62 is a flowchart showing an operation of the priority control service processing section 13 of the car-to-car communication transfer service processing section 1.

The priority control service processing section 13 waits until receiving the data (message) to be transmitted/received (Step S301). In a case where the message has not been received (in a case of "No"), the priority control service processing section 13 keeps the standby state of the data reception. To the contrary, in a case where the message has been received (in a case of "Yes"), the process proceeds to Step S302.

In Step S302, it is identified whether the data received in Step S301 is the data to be transmitted or the received data, and in a case of the data to be transmitted (in a case of "Yes"), the process proceeds to Step S303. To the contrary, in a case of the received data (in a case of "No"), the process proceeds to Step S306.

Next, in Step S303, the priority control service processing section 13 refers to the priority received at the same time with the data to be transmitted, and stores the transmission data in a transmission queue of the priority.

Then, in Step S304, the priority control service processing section 13 checks whether the transmission data has been stored in each transmission queue, and in a case where the data resides (in a case of "Yes"), the process proceeds to Step S305.

To the contrary, in a case where it is checked that the data does not reside in the transmission queue in Step S304 (in a case of "No"), the process returns to Step S301, and the priority control service processing section 13 waits until the reception of the message.

On the other hand, when the process proceeds to Step S305, the priority control service processing section 13 transmits data to the transmission service processing section 61 in order from the data stored in the transmission queue with high priority, and ends the transmitting procedure of the priority control processing. Then, the process returns to Step S301, and the priority control service processing section 13 waits until the reception of the next message.

Note that after the processing of Step S305 is ended, the process returns to Step S304, and the priority control service processing section 13 repeats the transmission in a case where the data remaining in the queue resides. On the other hand, in a case where the data does not reside, the process returns to Step S301, and the priority control service processing section 13 waits until the reception of the message.

When it is identified in Step S302 that the priority control service processing section 13 has received the data from the reception service processing section 62, in Step S306, the received data is transmitted to the data transfer service processing section 11, whereby the receiving procedure of the priority control processing is ended. Note that after the processing of Step S306 is ended, the processes returns to Step S301, and the priority control service processing section 13 waits until the reception of the next message.

(A-3-4. Operation of Congestion Control Service Processing Section 21)

Figure 63:
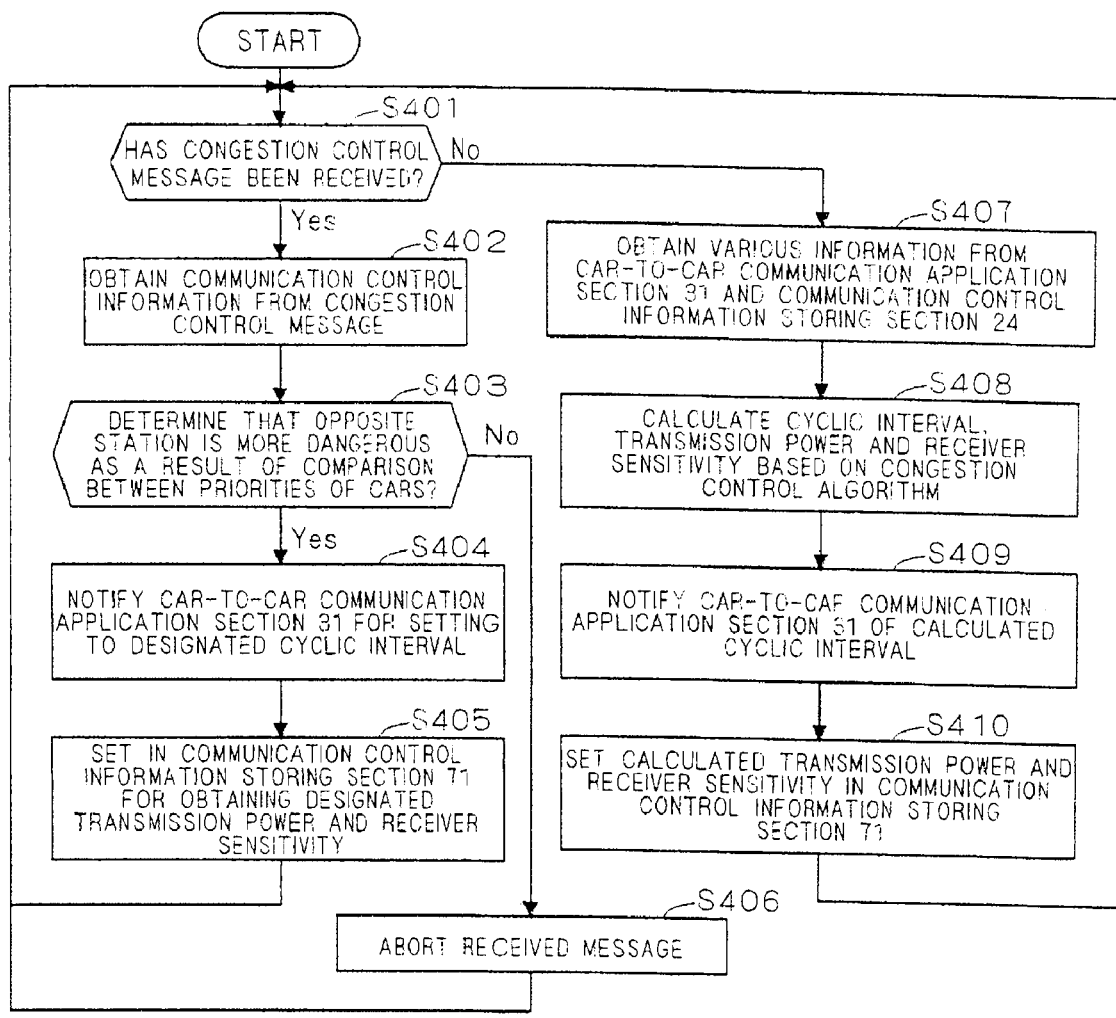
FIG. 63 is a flowchart showing a processing procedure of a congestion control service processing section of a car-to-car communication management service processing section according to the first embodiment of the present invention.

FIG. 63 is a flowchart showing an operation of the congestion control service processing section 21 of the car-to-car communication management service processing section 2.

The congestion control service processing section 21 waits until the reception of a congestion control message (Step S401). In a case where the message has not been received (in a case of "No"), the process proceeds to Step S407. To the contrary, in a case where the message has been received (in a case of "Yes"), the process proceeds to Step S402.

In Step S402, the congestion control service processing section 21 obtains from the congestion control message received in Step S401, a degree of risk of an opposite station, and communication control information such as a cyclic interval, transmission power and receiver sensitivity required for own station by the opposite station.

Next, in Step S403, the congestion control service processing section 21 compares the degree of risk of the opposite station that is obtained in Step S402 with a degree of risk of own station, and in a case of determining that the opposite station is more dangerous than own station (in a case of "Yes"), the process proceeds to Step S404. To the contrary, in a case where the congestion control service processing section 21 determines that own station is more dangerous than the opposite station (in a case of "No"), the process proceeds to Step S406.

In Step S404, the congestion control service processing section 21 notifies the car-to-car communication application section 31 of the cyclic interval obtained in Step S402 for setting to the application of own station.

In Step S405, the congestion control service processing section 21 sets the transmission power and receiver sensitivity obtained in Step S402 to the communication control information storing section 71 of own station, and ends the processing procedure in the case of receiving the congestion control message.

On the other hand, when determining that own station is more dangerous than the opposite station in Step S403, in Step S406, the congestion control service processing section 21 aborts the congestion control message received in Step S401 and ends the processing procedure in the case of receiving the congestion control message.

When not having received the congestion control message in Step S401, in Step S407, in order to calculate a communication control parameter for controlling congestion, the congestion control service processing section 21 obtains, for example, car information and communication channel information from the car-to-car communication application section 31 and the communication control information storing section 71.

Next, in Step S408, based on a congestion control algorithm, the congestion control service processing section 21 calculates the cyclic interval, transmission power and receiver sensitivity for avoiding congestion based on the information obtained in Step S407.

Then, in Step S409, the congestion control service processing section 21 notifies the car-to-car communication application section 31 of the cyclic interval calculated in Step S408.

Further, in Step S410, the transmission power and receiver sensitivity calculated in Step S408 are set in the communication control information storing section 71, and ends the communication control parameter setting procedure for congestion control. Note that after the processings of Steps S405, S406 and S410 are ended, the process returns to Step S401, and the congestion control service processing section 21 waits until the reception of the next message.

(A-3-5. Operations of Connection Management Service Processing Section 22 and Retransmission Control Service Processing Section 23)

Figure 64:
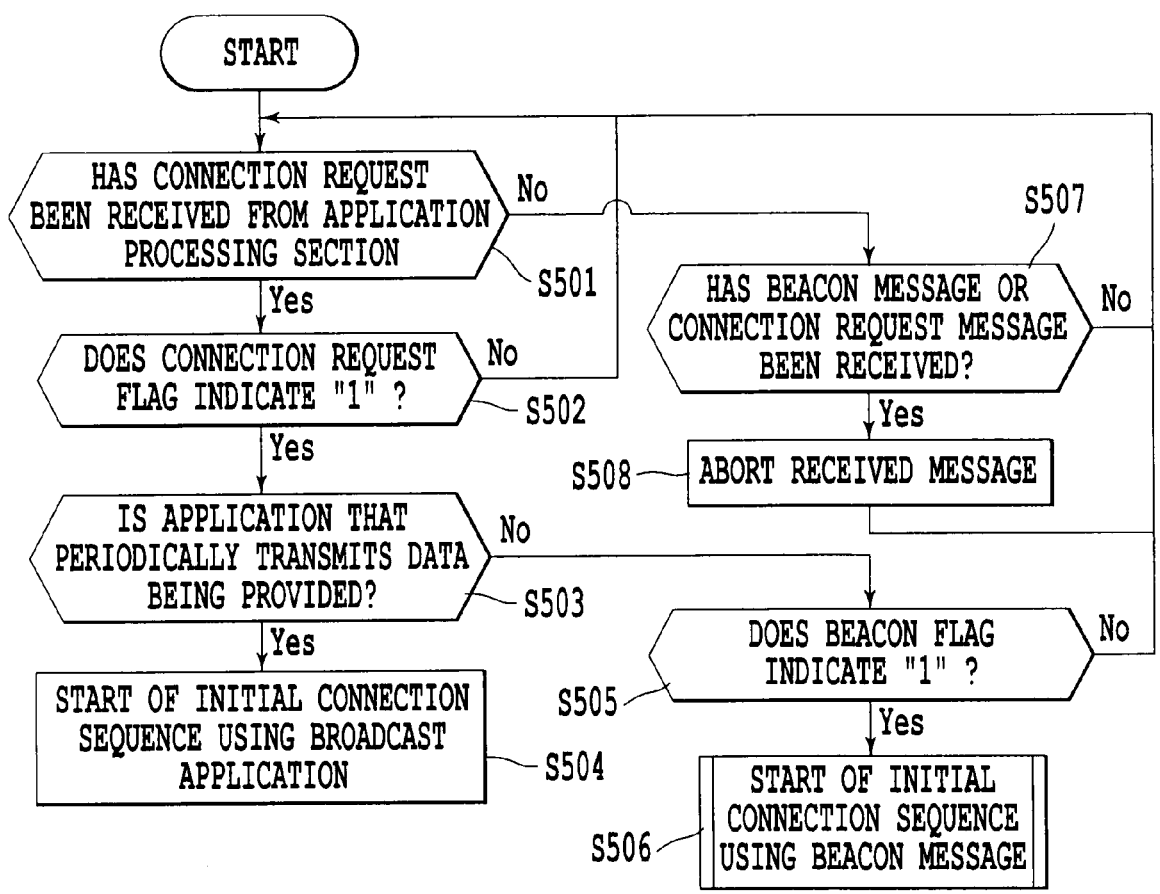
FIG. 64 is a flowchart showing a procedure of determining an initial connection procedure of a connection management service processing section of the car-to-car communication management service processing section according to the first embodiment of the present invention.
Figure 65A:
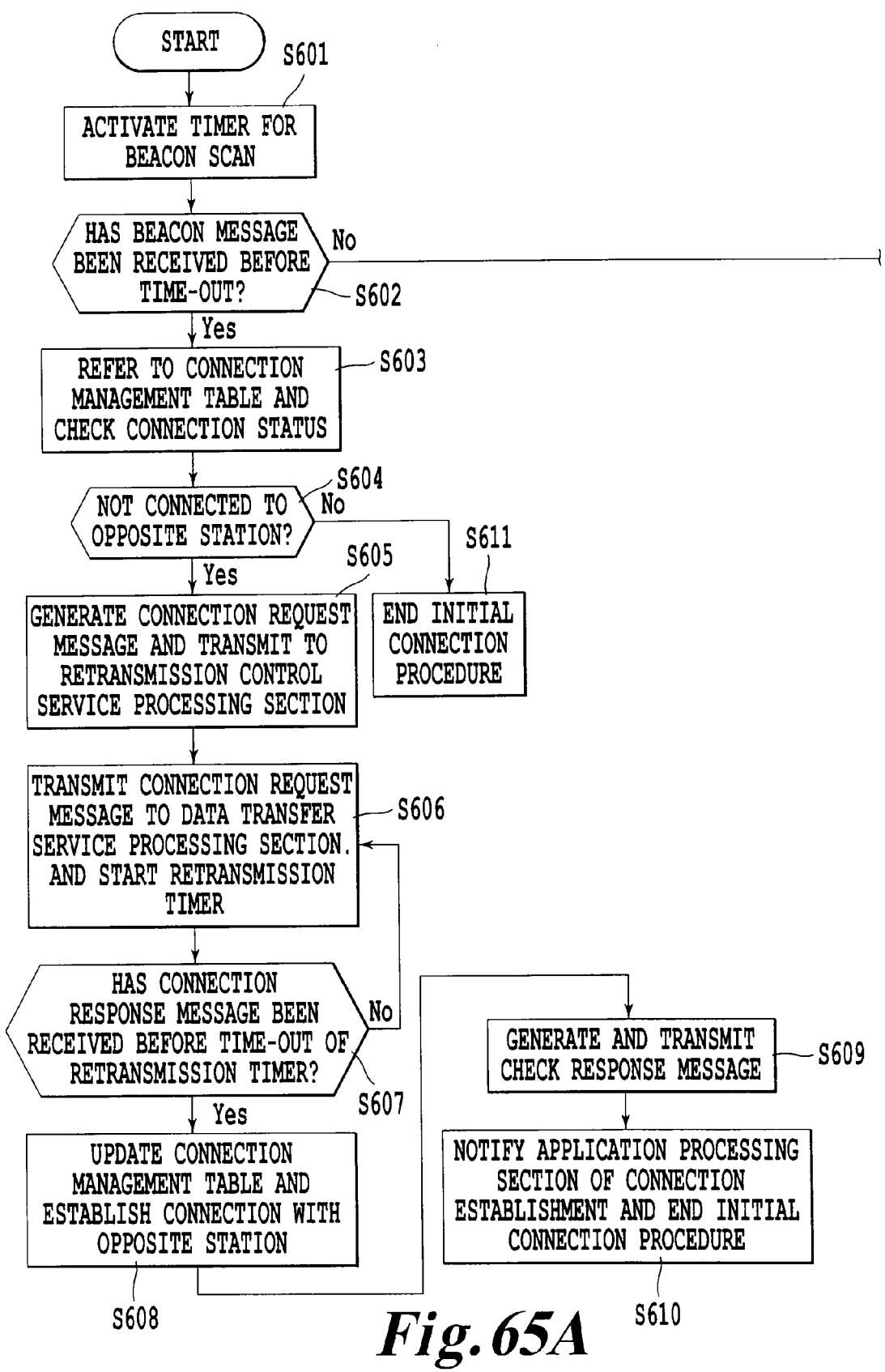
FIG. 65 is a flowchart showing an initial connection procedure using a beacon of the connection management service processing section of the car-to-car communication management service processing section according to the first embodiment of the present invention.
Figure 65B:
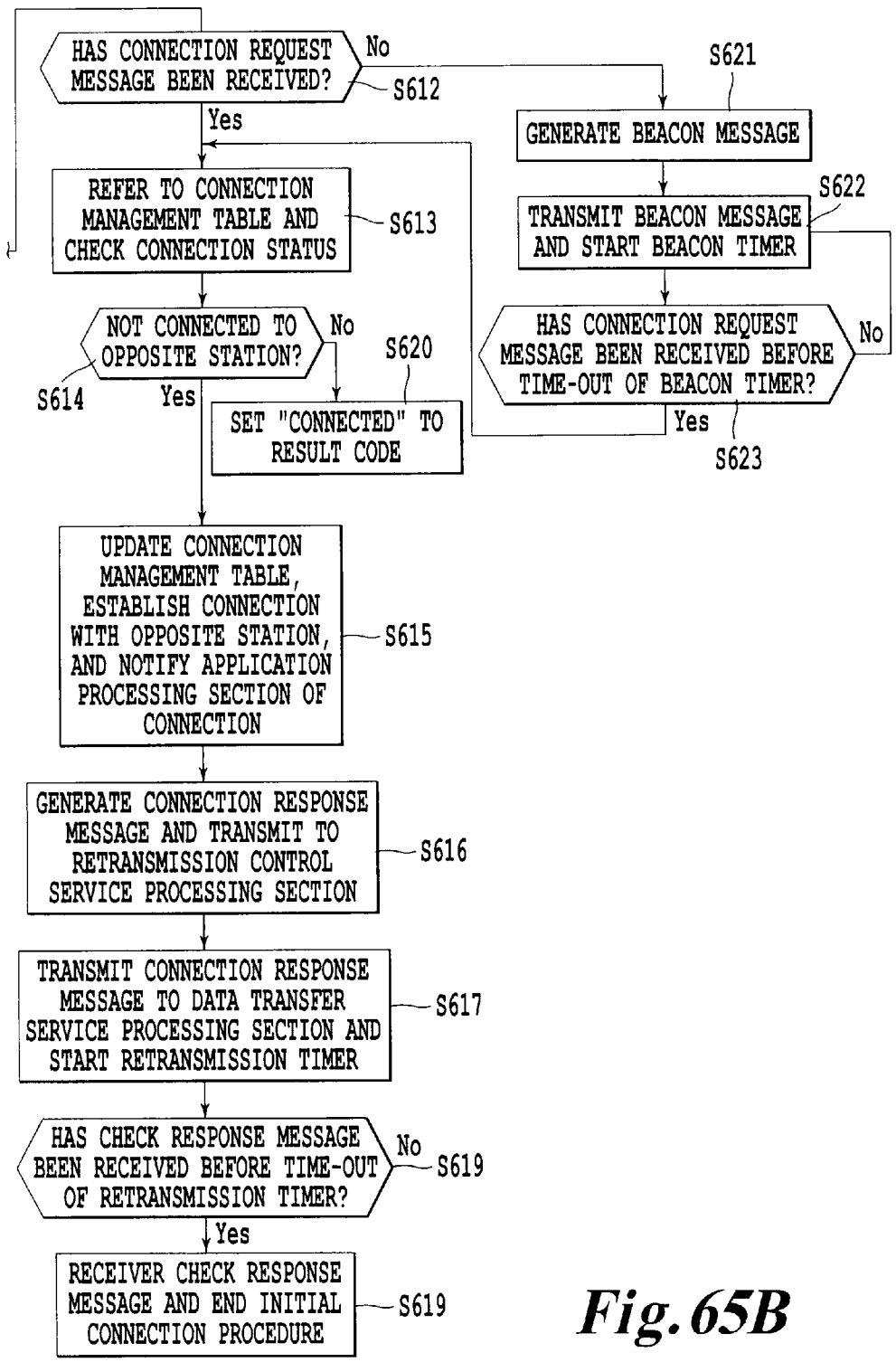
Figure 66A:
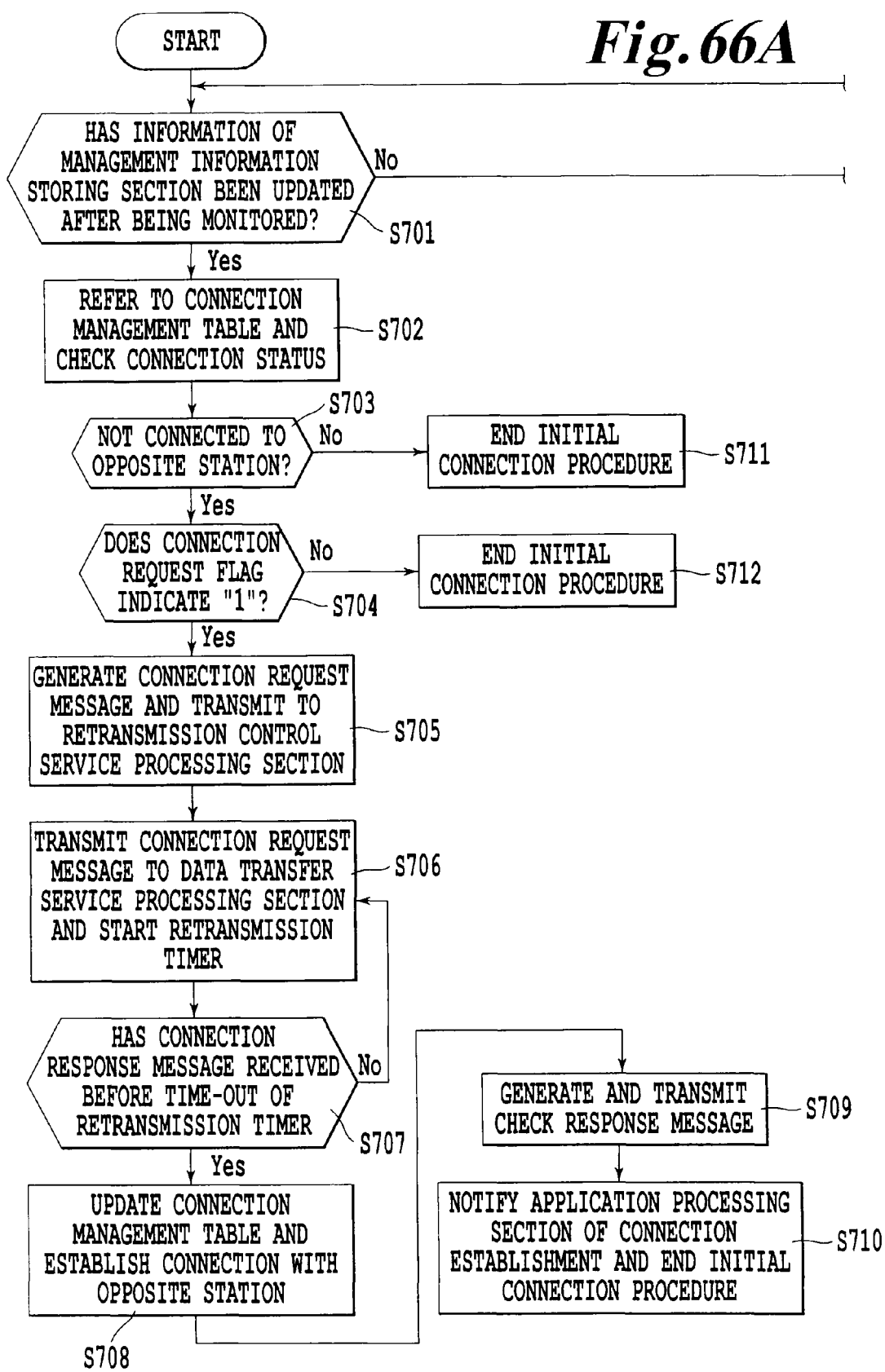
FIG. 66 is a flowchart showing an initial connection procedure using a broadcast application of the connection management service processing section of the car-to-car communication management service processing section according to the first embodiment of the present invention.
Figure 66B:
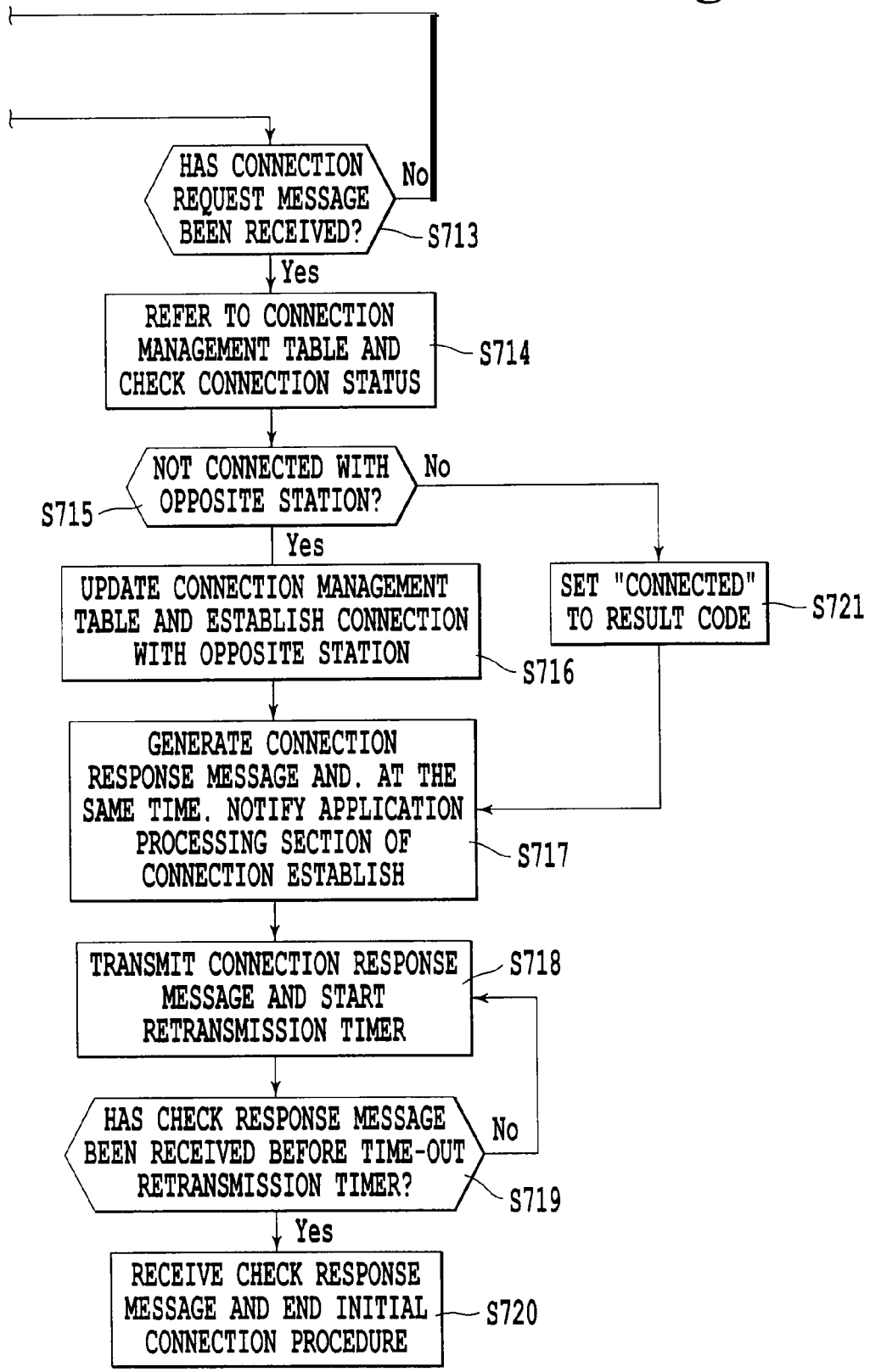

Description is given of operations of the connection management service processing section 22 and the retransmission control service processing section 23 of the car-to-car communication management service processing section 2 with reference to FIG. 64 to FIG. 66.

FIG. 64 is a flowchart determining a method for an initial connection procedure of the connection management service processing section 22, FIG. 65 is a flowchart showing an initial connection procedure in a case of using a beacon message, and FIG. 66 is a flowchart showing an initial connection procedure in a case of using a broadcast application.

First, the method of the initial connection procedure is described with reference to FIG. 64.

The connection management service processing section 22 waits until the reception a connection request from the car-to-car communication application section 31 (Step S501). In a case where the connection request has not been received (in a case of "No"), the process proceeds to Step S507. To the contrary, in a case where the connection request has been received (in a case of "Yes"), the process proceeds to Step S502.

In Step S502, the connection management service processing section 22 determines whether or not a connection request flag that is a variable of the connection request received in Step S501 indicates "1". In a case where the connection request flag does not indicate "1" (in a case of "No"), the process returns to Step S501. To the contrary, in a case where the connection request flag indicates "1" (in a case of "Yes"), the process proceeds to Step S503.

Next, in Step S503, the connection management service processing section 22 determines whether or not the application that periodically transmits information is running. In a case where the application is not running (in a case of "No"), the process proceeds to Step S505. To the contrary, in a case where the application is running (in a case of "Yes"), the process proceeds to Step S504.

In Step S504, the connection management service processing section 22 applies an initial connection procedure (sequence) using a broadcast application and starts the initial connection in the procedure shown in FIG. 66. In this case, the broadcast application refers to the application that periodically transmits information.

When it is determined in Step S503 that the application that periodically transmits information is not running, in Step S505, the connection management service processing section 22 determines whether or not the variable beacon flag received in Step S501 indicates "1". In a case where the beacon flag does not indicate "1" (in a case of "No"), the process returns to Step S501. To the contrary, in a case where the beacon flap indicates "1" (in a case of "1"), the process proceeds to Step S506, and the connection management service processing section 22 applies the initial connection procedure (sequence) using the beacon message and starts the initial connection in the procedure shown in FIG. 65.

On the other hand, when the connection request has not been received from the car-to-car communication application section 31 in Step S501, in Step S507, the connection management service processing section 22 waits until the reception of the beacon message and connection request message from surrounding stations. Then, in a case where the message has not been received (in a case of "No"), the process returns to Step S501. To the contrary, in a case where the message has been received (in a case of "Yes"), the process proceeds to Step S508.

Next, in Step S508, the message received in Step S507 is aborted, and the process returns to Step S501.

Next, with reference to FIG. 65, description is given of the initial connection procedure in a case of using the beacon message.

The connection management service processing section 22 activates a scan timer for performing beacon scan to check whether the beacon message has been transmitted (Step S601).

In Step S602, the connection management service processing section 22 determines whether or not the beacon message has been received before time-out of the scan timer in Step S601. In a case where the beacon message has not been received (in a case of "No"), the process proceeds to Step S612. To the contrary, in a case where the beacon message has been received (in a case of "Yes"), the process proceeds to Step S603.

Next, in Step S603, the connection management service processing section 22 refers to a connection management table and checks a connection status with a transmission source car of the beacon. In a case where it is determined in Step S604 that the connection with the opposing station has been achieved (in a case of "No"), the process proceeds to Step S611, and the connection management service processing section 22 ends the initial connection procedure. To the contrary, in a case where it is determined that the connection with the opposite station has not been achieved (in a case of "Yes"), the process proceeds to Step S605.

In Step S605, the connection management service processing section 22 generates a connection request message for making a connection request to a transmission source car of a beacon, and transmits the connection request message to the retransmission control service processing section 23. In Step S606, then, the retransmission control service processing section 23 transmits the connection request message to the data transfer service processing section 11, and at the same time, activates the retransmission timer.

In Step S607, the retransmission control service processing section 23 determines whether or not the connection response message has been received before time-out of the retransmission timer, and in a case of not having received the connection response message (in a case of "No"), the process returns to Step S606, and the retransmission control service processing section 23 retransmits the connection request message. To the contrary, in a case of having received the connection response message (in a case of "Yes"), the process proceeds to Step S608.

In Step S608, the retransmission control service processing section 23 passes the received message to the connection management service processing section 22, and the connection management service processing section 22 updates the connection management table to "connected", to thereby establish the initial connection with the opposite station. Next, in Step S609, the connection management service processing section 22 generates a check response message and passes it to the data transfer service processing section 11 for transmission to the opposite station. In Step S610, then, the connection management service processing section 22 notifies the application processing section that the connection has been established, and ends the initial connection procedure.

On the other hand, when the beacon message has not been received and time-out of the scan timer occurs in Step S602, in Step S612, the connection management service processing section 22 determines whether or not the connection request message has been received. Then, in a case where the connection request message has not been received (in a case of "No"), the process proceeds to Step S621. To the contrary, in a case where the connection request message has been received (in a case of "Yes"), the process proceeds to Step S613.

In Step S613, the connection management service processing section 22 refers to the connection management table and checks the connection status with the opposite station. Then, in a case where it is determined in Step S614 that the connection with the opposite station has been achieved (in a case of "No"), the process proceeds to Step S620. To the contrary, in a case where it is determined that the connection with the opposite station has not been achieved (in a case of "Yes"), the process proceeds to Step S615.

Then, in Step S615, the connection management service processing section 22 updates the connection management table to "connected", establishes the initial connection with the opposite station, and notifies the car-to-car communication application section 31 that the connection has been established.

In Step S616, next, the connection management service processing section 22 transmits the connection response message to the retransmission control service processing section 23 for making a response to the connection request from the opposite station.

In Step S617, the retransmission control service processing section 23 transmits the connection response message to the data transfer service processing section 11 and, at the same time, activates the retransmission timer.

In Step S618, then, the retransmission control service processing section 23 determines whether or not the check response message has been received before time-out of the retransmission timer. In a case where the check response message has not been received (in a case of "No"), the process returns to Step S617, and the retransmission control service processing section 23 retransmits the connection response message. To the contrary, in a case where the check response message has bee received (in a case of "Yes"), the process proceeds to Step S619.

In Step S619, the retransmission control service processing section 23 transmits the received message to the connection management service processing section 22, and the connection management service processing section 22 ends the initial connection procedure.

Note that when the connection with the opposite station has been made in Step S614, the connection management service processing section 22 sets "connected" to the variable result code of the connection response message in Step S620 and generates the connection response message in Step S616. Thereafter, the connection management service processing section 22 executes the initial connection procedure in accordance with the procedure of Steps S617 to S619.

On the other hand, when the connection request message has not been received in Step S612, the connection management service processing section 22 generates a beacon message in Step S621. Then, the connection management service processing section 22 transmits the beacon message and, at the same time, activates the beacon timer (Step S622).

After that, in Step S623, the connection management service processing section 22 determines whether or not the connection request message can be received before time-out of the beacon timer activated in Step S622. In a case where the message has not been received (in a case of "No"), the process returns to Step S622, and the connection management service processing section 22 transmits the beacon message again. To the contrary, in a case where the connection request message has been received before the time-out (in a case of "Yes"), the process proceeds to Step S613, and the connection management service processing section 22 executes the initial connection in accordance with the procedure of Steps S613 to S619.

Next, with reference to FIG. 66, description is given of the initial connection procedure in a case of using the broadcast application.

The connection management service processing section 22 determines whether or not the information of the management information storing section 24 has been updated from the fact that the car-to-car communication transfer service processing section 1 has received the broadcast application (Step S701). In a case where the information has not been updated (in a case of "No"), the process proceeds to Step S713. To the contrary, in a case where the information has been updated (in a case of "Yes"), the process proceeds to Step S702.

In Step S702, next, the connection management service processing section 22 refers to the connection management table and checks the connection status with the car whose information has been updated. Then, in a case where the connection with the opposite station has been made in Step S703 (in a case of "No"), the process proceeds to Step S711 and the connection management service processing section 22 ends the initial connection procedure. To the contrary, in a case where the connection has not been made (in a case of "Yes"), the process proceeds to Step S704.

In Step S704, then, the connection management service processing section 22 refers to the connection request flag to determine whether or not the connection request flag indicates "1", and in a case where the connection request flag does not indicate "1" (in a case of "No"), the process proceeds to Step S712, and the connection management service processing section 22 ends the initial connection procedure. To the contrary, in a case where the connection request flag indicates "1" (in a case of "Yes"), the process proceeds to Step S705.

In Step S705, then, in order to make a connection request to the opposite car, the connection management service processing section 22 generates a connection request message for making a connection request to the opposite car and transmits the connection request message to the retransmission control service processing section 23.

After that, in Step S706, the retransmission control service processing section 23 transmits the connection request message to the data transfer service processing section 11 and, at the same time, activates the retransmission timer.

In Step S707, the retransmission control service processing section 23 determines whether or not the connection response message has been received before time-out of the retransmission timer. Then, in a case where the connection response message has not been received (in a case of "No"), the process returns to Step S706, and the retransmission control service processing section 23 retransmits the connection request message. To the contrary, in a case where the connection response message has been received (in a case of "Yes"), the process proceeds to Step S708.

In Step S708, the retransmission control service processing section 23 passes the received message to the connection management service processing section 22. The connection management service processing section 22 updates the connection management table to "connected", and establishes the initial connection with the opposite station as well as notifies the car-to-car communication application section 31 of the connection at the same time.

In Step S709, next, the connection management service processing section 22 generates a check response message and passes it to the data transfer service processing section 11 for transmission to the opposite station. In Step S710, then, the connection management service processing section 22 notifies the application processing section that the connection has been established and ends the initial connection procedure.

On the other hand, when the information of the management information storing section 24 has not been updated in Step S701, in Step S713, the connection management service processing section 22 determines whether or not the connection request message has been received, and the process returns to Step S701 in a case where the connection request message has not been received (in a case of "No"). To the contrary, in a case where the connection request message has been received (in a case of "Yes"), the process proceeds to Step S714.

In Step S714, next, the connection management service processing section 22 refers to the connection management table and checks the connection status with the opposite station. Then, in a case where it is determined in Step S715 that the connection with the opposite station has been made (in a case of "No"), the process proceeds to Step S721. To the contrary, in a case where the connection has not been made (in a case of "Yes"), the process proceeds to Step S716.

In Step S716, then, the connection management service processing section 22 updates the connection management table to "connected", establishes the initial connection with the opposite station, and notifies the car-to-car communication application section 31 that the connection has been established.

In Step S717, next, the connection management service processing section 22 transmits the connection response message to the retransmission control service processing section 23 for responding to the connection request from the opposite station.

After that, in Step S718, the retransmission control service processing section 23 transmits the connection response message to the data transfer service processing section 11 and, at the same time, activates the retransmission timer.

In Step S719, the retransmission control service processing section 23 determines whether or not the check response message has been received before time-out of the retransmission timer, and in a case where the check response message has not been received (in a case of "No"), the process returns to Step S718, and the retransmission control service processing section 23 retransmits the connection response message. To the contrary, in a case where the check response message has been received (in a case of "Yes"), the process proceeds to Step S720, and the retransmission control service processing section 23 ends the initial connection procedure.

Note that when it is determined in Step S715 that the connection with the opposite station has been made, in Step S721, the retransmission control service processing section 23 sets "connected" to the variable result code of the connection response message, and generates the connection response message in Step S717. Note that the initial connection procedure is executed thereafter in accordance with the procedure of Steps S718 to S720.

(A-3-6. Operation of Car-to-Car Communication Application Section 31)

Figure 67:
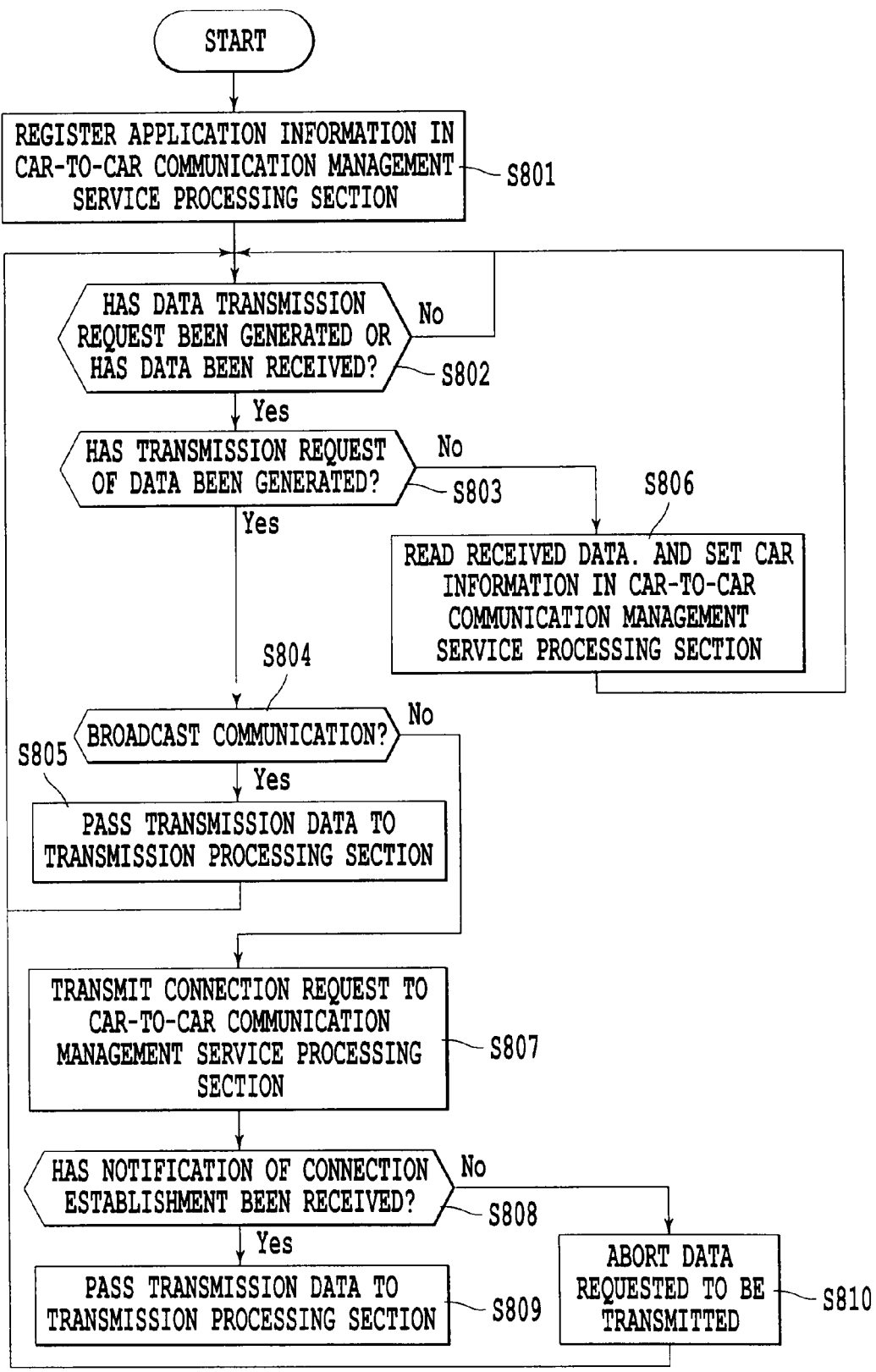
FIG. 67 is a flowchart showing a processing procedure of an application processing section according to the first embodiment of the present invention.

FIG. 67 is a flowchart showing an operation of the car-to-car communication application section 31 of the application processing section 3.

The car-to-car communication application section 31 registers, after being activated, application information in the management information storing section 24 of the car-to-car communication management service processing section 2 (Step S801).

Next, the car-to-car communication application section 31 waits until a transmission request of data or a reception notification of data is made (Step S802). In a case where the request and the notification have not been received (in a case of "No"), the car-to-car communication application section 31 keeps waiting until the reception of the request and the notification. To the contrary, in a case where the request and the notification have been received (in a case of "Yes"), the process proceeds to Step S803.

In Step S803, it is determined whether or not the details received in Step S802 are a transmission request, and in a case of the transmission request (in a case of "Yes"), the process proceeds to Step S804. To the contrary, in a case of the reception notification (in a case of "No"), the process proceeds to Step S806.

In Step S804, next, it is determined whether or not to perform broadcast communication on the data requested to be transmission and, in a case of the broadcast communication (in a case of "Yes"), the process proceeds to Step S805. To the contrary, in a case of point-to-point communication (in a case of "No") not the broadcast communication, the process proceeds to Step S807.

In Step S805, then, the car-to-car communication application section 31 transmits data to be transmitted to the transaction service processing section 41 of the transaction managing section 4, and ends the broadcast communication processing procedure of the application processing section.

On the other hand, when it is determined in Step S803 that the reception notification of data has been received, in Step S806, the car-to-car communication application section 31 reads the received data, sets car information in the management information storing section 24 of the car-to-car communication management service processing section 2, and ends the data reception processing procedure of the application processing section.

When point-to-point communication of data is performed in Step S804, in Step S807, the car-to-car communication application section 31 transmits a connection request to the connection management service processing section 22 of the car-to-car communication management service processing section 2.

In Step S808, next, it is determined whether or not a notification of connection establishment has been received from the connection management service processing section 22 and, in a case where the connection establishment has been notified (in a case of "Yes"), the process proceeds to Step S809. To the contrary, in a case where the notification of connection establishment has not been received (in a case of "No"), the process proceeds to Step S810.

In Step S809, the car-to-car communication application section 31 transmits data to be transmitted to the transaction service processing section 41 and ends the transmission processing procedure of point-to-point communication.

In Step S810, the car-to-car communication application section 31 aborts the data requested to be transmitted and ends the transmission processing procedure.

Note that after the processings of Steps S805, S806, S809 and S810 are ended, the processings of Step S802 and thereafter are executed repeatedly.

(A-3-7. Operation of Transaction Service Processing Section 41)

Figure 68:
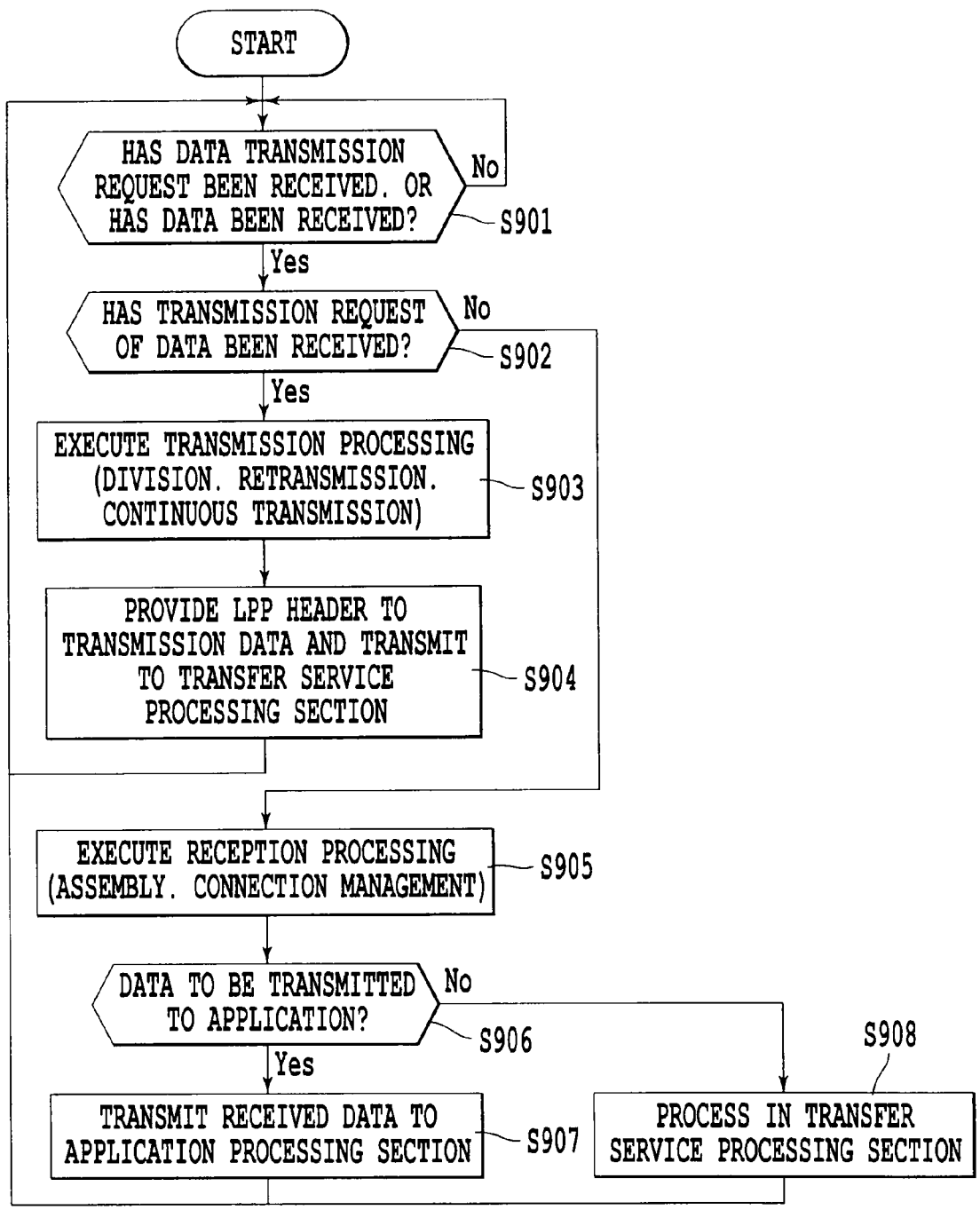
FIG. 68 is a flowchart showing a processing procedure of a transaction managing section according to the first embodiment of the present invention.

FIG. 68 is a flowchart showing an operation of the transaction service processing section 41 of the transaction managing section 4.

The transaction service processing section 41 waits until a transmission request of data or a reception notification of data is made (Step S901). In a case where the request and the notification have not been received (in a case of "No"), the transaction service processing section 41 keeps waiting until the request and the notification are received. To the contrary, tin a case where the request and the notification have been received (in a case of "Yes"), the process proceeds to Step S902.

In Step S902, it is determined whether or not the details received in Step S901 are a transmission request and, in a case of the transmission request (in a case of "Yes"), the process proceeds to Step S903. To the contrary, in a case of the reception notification (in a case of "No"), the process proceeds to Step S905.

In Step S903, the transaction service processing section 41 performs a transmission processing such as division, retransmission and continuous transmission as required, provides an LPP header to the transmission data in Step S904, and transmits it to the LPCP transfer service processing section 51 of the transfer service processing section 5.

On the other hand, when it is determined in Step S902 that the reception notification of data has been received, in Step S905, the transaction service processing section 41 executes the reception processing such as assembly and connection management.

In Step S906, then, it is determined whether or not the received data is the data to be passed to the application and, in a case of the data to be transmitted to the application (in a case of "Yes"), the process proceeds to Step S907. To the contrary, in a case where the control data transmitted from the LPP connection management service processing section 42 has been received (in a case of "No"), the process proceeds to Step S908.

In Step S907, the transaction service processing section 41 passes the transmission data to the car-to-car communication application section 31 of the application processing section 3, and ends the application data reception processing procedure of the transaction managing section 4.

In Step S908, the transaction service processing section 41 passes the control data to the LPP connection management service processing section 42, and ends the control data reception processing procedure of the transaction managing section 3.

Note that after the processings of Steps S904, S907 and S908 are ended, the processings of Step S901 and thereafter are executed repeatedly.

(A-3-8. Operation of LPCP Transfer Service Processing Section 51)

Figure 69:
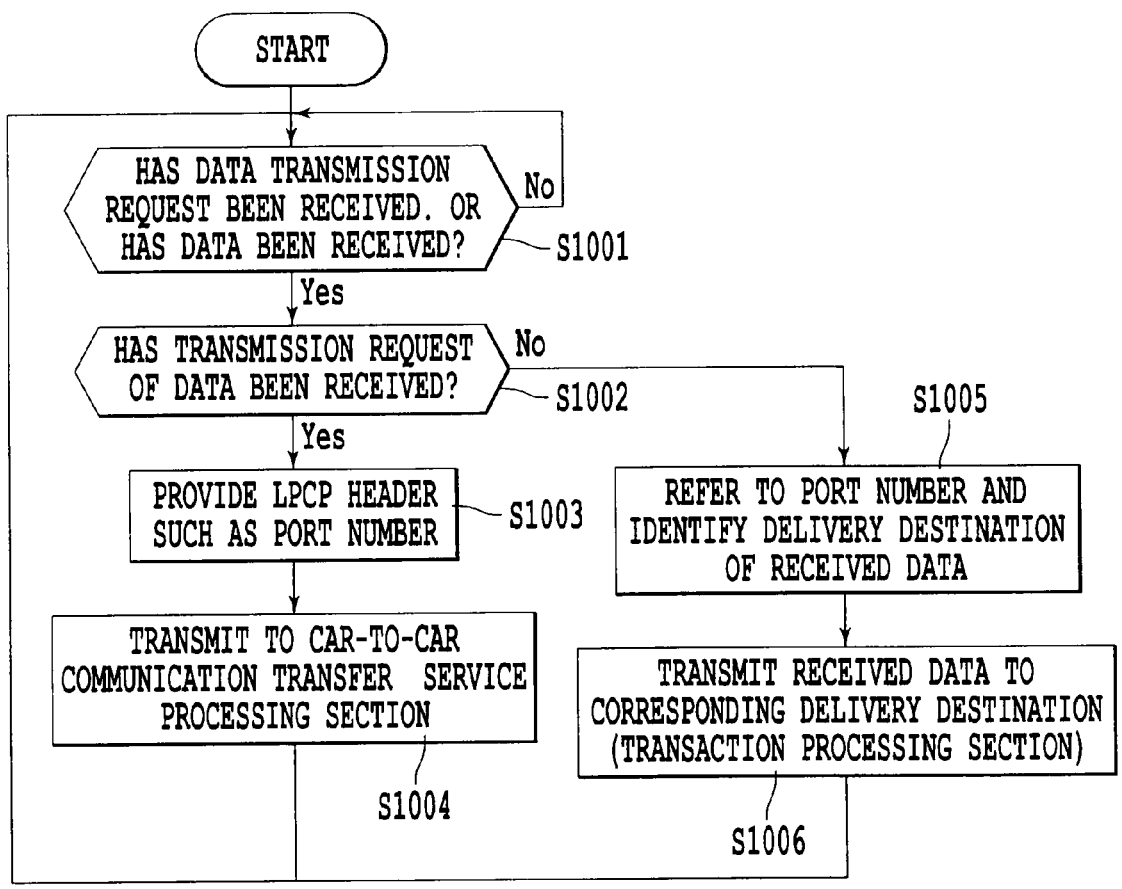
FIG. 69 is a flowchart showing a processing procedure of a transfer service processing section according to the first embodiment of the present invention.

FIG. 69 is a flowchart showing an operation of the LPCP transfer service processing section 51 of the transfer service processing section 5.

The LPCP transfer service processing section 51 waits until a transmission request of data or a reception notification of data is made (Step S1001). In a case where the request and the notification have not been received (in a case of "No"), the LPCP transfer service processing section 51 keeps waiting until the request and the notification are received. To the contrary, in a case where the request and the notification have been received (in a case of "Yes"), the process proceeds to Step S1002.

In Step S1002, it is determined whether or not the details received in Step S1001 are a transmission request and, in a case of the transmission request (in a case of "Yes"), the process proceeds to Step S1003. To the contrary, in a case of the reception notification (in a case of "No"), the process proceeds to Step S1005.

In Step S1003, next, the LPCP transfer service processing section 51 provides an LPCP header such as a local port number, passes the transmission data to the data transfer service processing section 11 of the car-to-car communication transfer service processing section 1, and ends the data transmission processing procedure of the transfer service processing section 5. 5.

On the other hand, when the reception notification of data has been received in Step S1002, in Step S1005, the LPCP transfer service processing section 51 refers to a local port number and identifies a delivery destination of the received data. Then, in Step S1006, the LPCP transfer service processing section 51 transmits the received data to the delivery destination and ends the data reception processing procedure of the transfer service processing section 5.

Note that after the processings of Steps S1004 and S1006 are ended, the processings of Step S1001 and thereafter are executed repeatedly.

(A-3-9. Operation of Transmission/Reception Service Processing Section 6)

Figure 70:
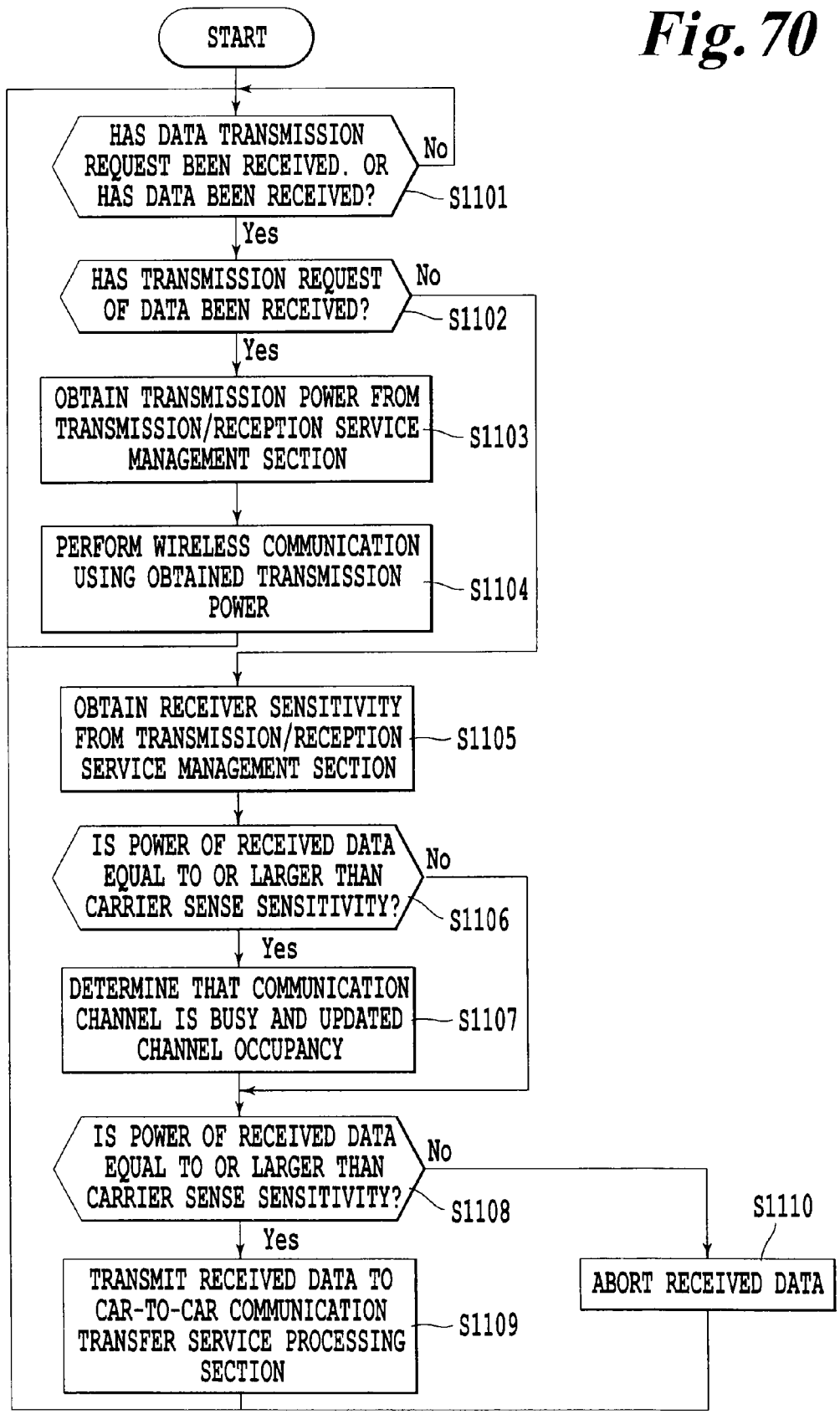
FIG. 70 is a flowchart showing a processing procedure of a transmission reception service processing section according to the first embodiment of the present invention.

FIG. 70 is a flowchart showing an operation of the transmission/reception service processing section 6.

The transmission service processing section 61 and the reception service processing section 62 wait until a transmission request of data or a reception notification of data is made (Step S1101). In a case where the request and the notification have not been received (in a case of "No"), the transmission service processing section 61 and the reception service processing section 62 keep waiting until the request and the notification are received. To the contrary, in a case where the request and the notification have been received (in a case of "Yes"), the process proceeds to Step S1102.

In Step S1102, it is determined whether or not the details received in Step S1101 are a transmission request and, in a case of the transmission request (in a case of "Yes"), the process proceeds to Step S1103. To the contrary, in a case of the reception notification (in a case of "No"), the process proceeds to Step S1105.

In Step S1103, next, the transmission service processing section 61 obtains transmission power from the communication control information storing section 71 of the transmission/reception service managing section 7, and performs wireless communication with the obtained transmission power in Step S1104, and ends the transmission processing procedure of the transmission/reception service processing section 6.

On the other hand, when it is determined in Step S1102 that the reception notification of data has been made, in Step S1105, the reception service processing section 62 obtains receiver sensitivity from the communication control information storing section 71 of the transmission/reception service managing section 7.

In Step S1106, then, it is determined whether or not power of the received data is equal to or larger than a carrier sense sensitivity and, in a case where the power equal to or larger than the carrier sense sensitivity has been received (in a case of "Yes"), the process proceeds to Step S1107. In a case where the power less than the carrier sense sensitivity has been received (in a case of "No"), the process proceeds to Step S1108.

In Step S1107, the reception service processing section 62 determines that the communication channel is busy and updates a communication channel occupancy of the communication control information storing section 71.

In Step S1108, the reception service processing section 62 determines whether or not the power of the received data is equal to or larger than the receiver sensitivity and, in a case of receiving the power equal to or larger than the receiver sensitivity (in a case of "Yes"), the process proceeds to Step S1109. To the contrary, in a case of receiving the power less than the receiver sensitivity (in a case of "No"), the process proceeds to Step S1110.

In Step S1109, the reception service processing section 62 transmits the received data to the priority control service processing section 13 of the car-to-car communication management service processing unit 1 and ends the reception processing procedure.

On the other hand, in Step S1110, the reception service processing section 62 aborts the received data and ends the reception processing procedure.

Note that after the processings of Steps S1104, S1109 and S1110 are ended, the processings of Step S1101 and thereafter are executed repeatedly.

(A-4. Effects)

In the above-mentioned on-board communication device and the cooperative road-to-vehicle/car-to-car communication system according to the first embodiment of the present invention, the car-to-car communication transfer service processing section 1 and the car-to-car communication management service processing section 2 include interfaces corresponding to the transfer processing section (LPCP) that is an existing road-to-vehicle communication protocol. Accordingly, it is possible to obtain an on-board communication device capable of sharing an on-board device that provides a road-to-vehicle communication system and an on-board device that provides a car-to-car communication system, which makes it possible to obtain an on-board communication device capable of providing services to both of the road-to-vehicle communication system and the car-to-car communication system.

Further, the car-to-car communication transfer service processing section 1 is interposed between the application processing section and the transmission/reception service processing section, and thus communication can be controlled in accordance with priorities of multiple applications. This enables to preferentially transmit information of an application with high priority.

Further, the car-to-car communication management service processing section 2 is arranged so as to be parallel to the application processing section 3, the car-to-car communication transfer service processing section 1 and the transmission/reception service managing section 7, which makes it possible to control communication for avoiding congestion of own car and surrounding cars, based on car information and degrees of risk of respective cars received from the application processing section 3 and the channel occupancy obtained from the transmission/reception service managing section. As a result, it is possible to improve a communication error rate even when the number of cars increases.

Further, the car-to-car communication transfer service processing section 1 is capable of obtaining a priority via the car-to-car communication management service processing section 2. Accordingly, it is possible to provide priority control even in a case where the priority cannot be obtained from the transaction managing section (local port protocol) 4 and the transfer service processing section (local port control protocol) 5 that are existing protocols.

Further, the car-to-car communication transfer service processing section 1 is capable of efficiently collecting the information required for communication control by adding communication control information such as transmission power, receiver sensitivity and channel occupancy to a message to be transmitted. As a result, the car-to-car communication management service processing section 2 is capable of setting communication parameters such as cyclic interval and transmission power based on the information detected by the surrounding cars when the congestion control is made, which enables efficient congestion control.

Further, the car-to-car communication management service processing section 2 is arranged from the application processing section 3 to the transmission/reception service managing section 6 so as to be parallel to thereto. Accordingly, it is possible to obtain information of the application processing section 3 and the transmission/reception service managing section 7 and make the setting in the application processing section 3 and the transmission/reception service managing section 7.

Further, in order to provide a communication connection management service, the car-to-car communication management service processing section 2 defines a connection procedure for performing initial connection and manages a connection status, which enables the application processing section 3 to start communication individually with a mobile station. Moreover, in a case where the transmission/reception service processing section 6 does not have an initial connection procedure, the car-to-car communication management service processing section 2 is capable of starting the initial connection and managing the communication connection.

Further, the car-to-car communication management service processing section 2 is capable of notifying the application processing section 3 and the transaction managing section 4 of the establishment of communication connection via the car-to-car communication transfer service processing section 1.

Further, in a case where the application that periodically transmits messages is operating, the car-to-car communication management service processing section 2 is capable of efficiently performing initial connection at high speed by transmitting a connection request of initial connection to the opposite mobile station upon reception of a message of the application.

Further, in a case where the application that periodically transmits messages is not operating, the car-to-car communication management service processing section 2 is capable of starting initial connection by periodically transmitting messages and transmitting a connection request of initial connection to the opposite mobile station upon reception of the message by the surrounding mobile station.

Further, in performing initial connection, the car-to-car communication management service processing section 2 is capable of avoiding transmission of an unnecessary message to effectively use a communication band by monitoring whether the message required for initial connection is transmitted to the communication channel.

Further, the car-to-car communication management service processing section 2 is capable of instantly suppressing a communication band occupancy and preferentially performing transmission of own station by transmitting, to surrounding mobile stations, the control message capable of instructing the transmission power, receiver sensitivity and transmission channel.

(A-5. Modification)

In the first embodiment described above, while the description is given of the hierarchical structure composed of the transaction managing section 4 (local port protocol), the transfer service processing section 5 (local port control protocol), the car-to-car communication transfer service processing section 1 (C2C transport sub layer) and the car-to-car communication management service processing section 2 (car-to-car communication management layer), other protocol capable of bi-directionally communicating may be used in place of the local port protocol and the local port control protocol.

For example, there may be used the protocol IEEE1609.3 under consideration in the US and the protocol FAST and Geo-Routing under consideration by the communications architecture for land mobile environment (CALM) in Europe.

Further, the description is given of the structure in which the car-to-car communication management service processing section 2 is arranged in parallel to the application processing section 3, the transaction managing section 4, the transfer service processing section 5, the car-to-car communication transfer service processing section 1 and the transmission/reception service managing section 7. However, the WAVE management entity (WME) under consideration in the IEEE1609.3 and the CALM management entity (CME) under consideration in the CALM are also arranged in the same manner as the car-to-car communication management service processing section 2, and thus there may be used the configuration in which the car-to-car communication management service section 2 is included in the WME and CME and the configuration including the WME and CME. Here, the WAVE is an abbreviation for wireless access in vehicular environments.

Further, in a case where the car-to-car communication management service section 2 is included in the WME, the interfaces with the application processing section 3 and the transmission/reception service managing section 7 may be replaced with an interface between the WME and the application and an interface between the WME and the MLME/PLME, or may be added thereto. Moreover, the interface between the car-to-car communication transfer service section 1 and the car-to-car communication management service processing section 2 may be integrated with the interface between the CME and the FAST.

Further, the application processing section 3 is not limited to the application of the car-to-car communication system, and there may be used an application other than an application of a road-to-vehicle communication system and an application related to the ITS.

Further, the car-to-car communication management service section 2 may use, as communication parameters set for avoiding congestion, directivities of a transmission channel and a transmission/reception antenna, a frequency band to be transmitted and the like, not limited to the cyclic interval, transmission power and receiver sensitivity.

(B. Second Embodiment)

(B-1. Protocol Configuration)

A second embodiment of the present invention is described with reference to FIG. 71 and FIG. 72.

Figure 71:
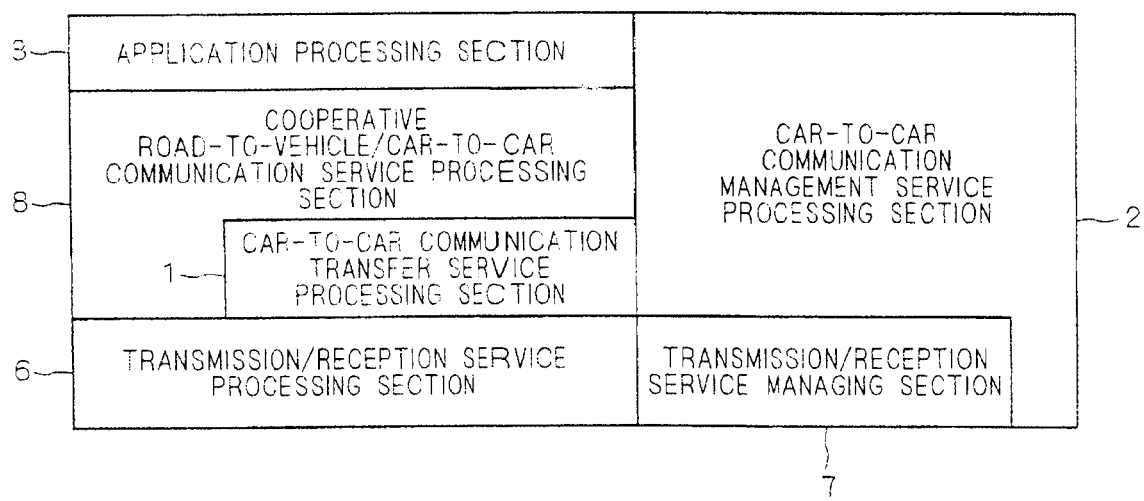
FIG. 71 is a diagram schematically showing a configuration of an on-board communication device according to a second embodiment of the present invention.
Figure 72:
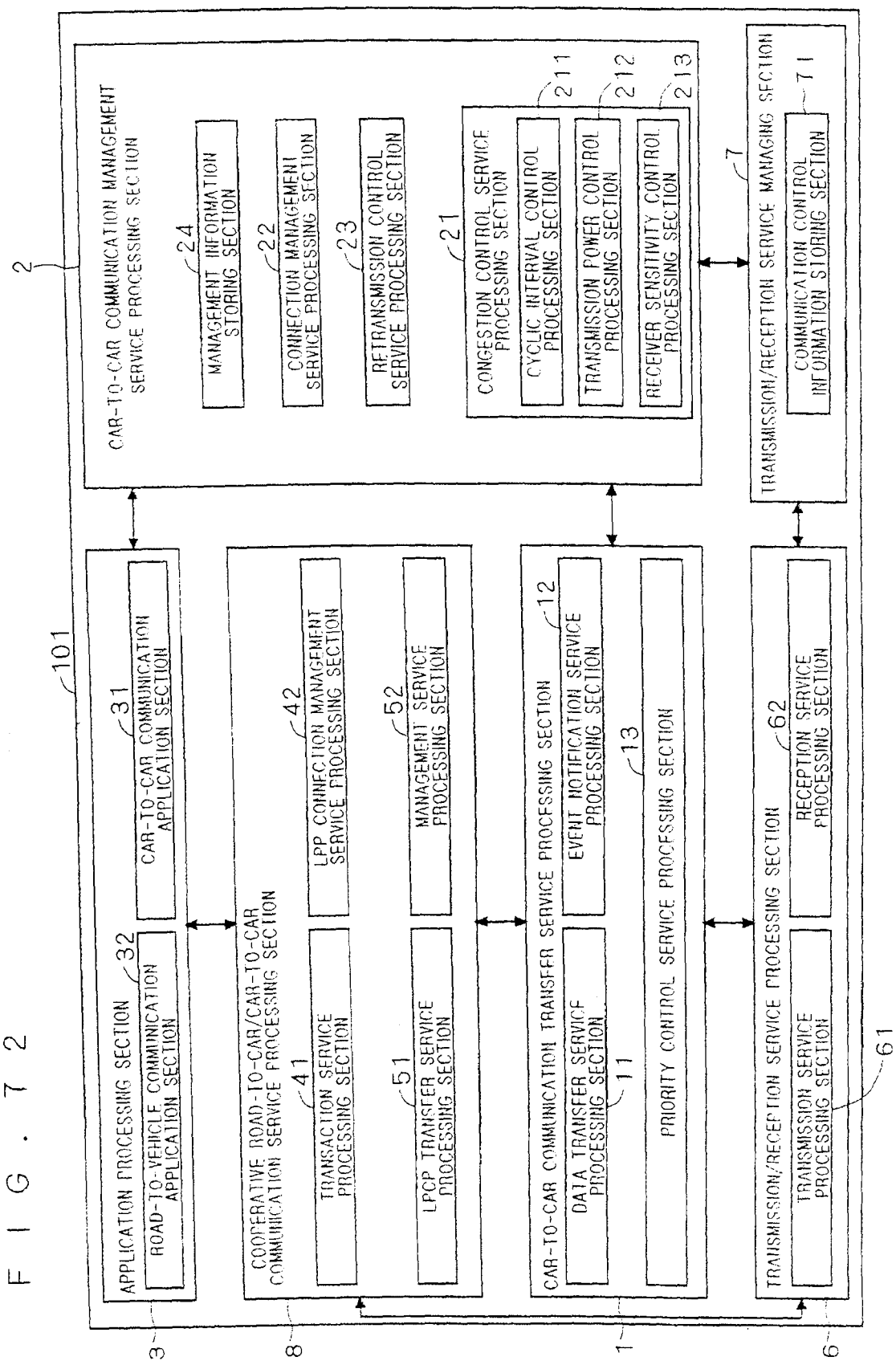
FIG. 72 is a diagram specifically showing the configuration of the on-board communication device according to the second embodiment of the present invention.

FIG. 71 is a block diagram showing a protocol configuration of an on-board communication device 101 and a cooperative road-to-vehicle/car-to-car communication system according to the second embodiment of the present invention, and FIG. 72 is a block diagram specifically showing the protocol configuration of the on-board communication device 101 and the cooperative road-to-vehicle/car-to-car communication system. Note that the same elements as those of the first embodiment are denoted by the same reference numerals, and redundant detailed description is omitted.

As shown in FIG. 71 and FIG. 72, the on-board communication device 101 according to the second embodiment includes the car-to-car communication transfer service processing section 1, the car-to-car communication management service processing section 2, the application processing section 3, the transmission/reception service processing section 6 and the transmission/reception service managing section 7.

Accordingly, the on-board communication device 101 and the cooperative road-to-vehicle/car-to-car communication system according to the second embodiment are different from the on-board communication device 100 and the cooperative road-to-vehicle/car-to-car communication system described in the first embodiment in that a cooperative road-to-vehicle/car-to-car communication service processing section 8 is provided in place of the transaction managing section 4 and the transfer service processing section 5 that are existing road-to-vehicle communication protocols in the on-board communication device 100 shown in FIG. 1, and that the application processing section 3 includes a road-to-vehicle communication application section 32.

Further, in the on-board communication device 101 according to the second embodiment, the application processing section 3 includes the car-to-car communication application section 31 as in the first embodiment, and thus is capable of providing an application of car-to-car communication.

Moreover, the on-board communication device 101 includes the road-to-vehicle communication application section 32 and the cooperative road-to-vehicle/car-to-car communication service processing section 8, and thus is capable of providing an application of road-to-vehicle communication as well.

As shown in FIG. 72, the cooperative road-to-vehicle/car-to-car communication service processing section 8 has functions equal to those of the transaction managing section 4 and the transfer service processing section 5 described in the first embodiment, and includes the transaction service processing section 41, the LPP connection management service processing section 42, the LPCP transfer service processing section 51 and the management service processing section 52.

(B-2. Operation of on-Board Communication Device 101)

In the on-board communication device 101, the data transmitted from the road-to-vehicle communication application section 32 is transmitted to the opposite station from the transmission/reception service processing section 6 via the transaction service processing section 41 and the LPCP transfer service processing section 51 of the cooperative road-to-vehicle/car-to-car communication service processing section 8, and differently from the data transmitted by the car-to-car communication application section 31, is not transmitted via the data transfer service processing section 11 of the car-to-car communication transfer service processing section 1.

In a case of receiving data from a surrounding station, the transmission/reception service processing section 61 refers to the header information provided by the transmission service processing section 6, and distinguishes whether to transmit it to the cooperative road-to-vehicle/car-to-car communication service processing section 8 or the car-to-car communication transfer service processing section 1. As a result, the application of road-to-vehicle communication is transmitted to the road-to-vehicle communication application section 32 via the cooperative road-to-vehicle/car-to-car communication service processing section 8, and the application of car-to-car communication is transmitted to the car-to-car communication application section 31 via the car-to-car communication transfer service processing section 1 and the cooperative road-to-vehicle/car-to-car communication service processing section 8.

(B-3. Effects)

As described above, thanks to the provision of the cooperative road-to-vehicle/car-to-car communication service processing section 8, the on-board communication device 101 according to the second embodiment is capable of transmitting the data of road-to-vehicle communication to the opposite station not via the car-to-car communication transfer service processing section 1 and transmitting the data of car-to-car communication to the surrounding station via the car-to-car communication transfer service processing section 1 after the required control is performed. Accordingly, an on-board device of road-to-vehicle communication and an on-board device of car-to-car communication are shared.

(B-4. Modification)

Note that while in the second embodiment, while the description is given of the hierarchical structure composed of the cooperative road-to-vehicle/car-to-car communication service processing section 8, the car-to-car communication transfer service processing section 1 and the car-to-car communication management service processing section 2, as in the first embodiment, an existing protocol such as a local port protocol and a local port control protocol may be used for the cooperative road-to-vehicle/car-to-car communication service processing section 8.

(C. Third Embodiment)

(C-1. Protocol Configuration)

A third embodiment of the present invention is described with reference to FIG. 73 and FIG. 74.

Figure 73:
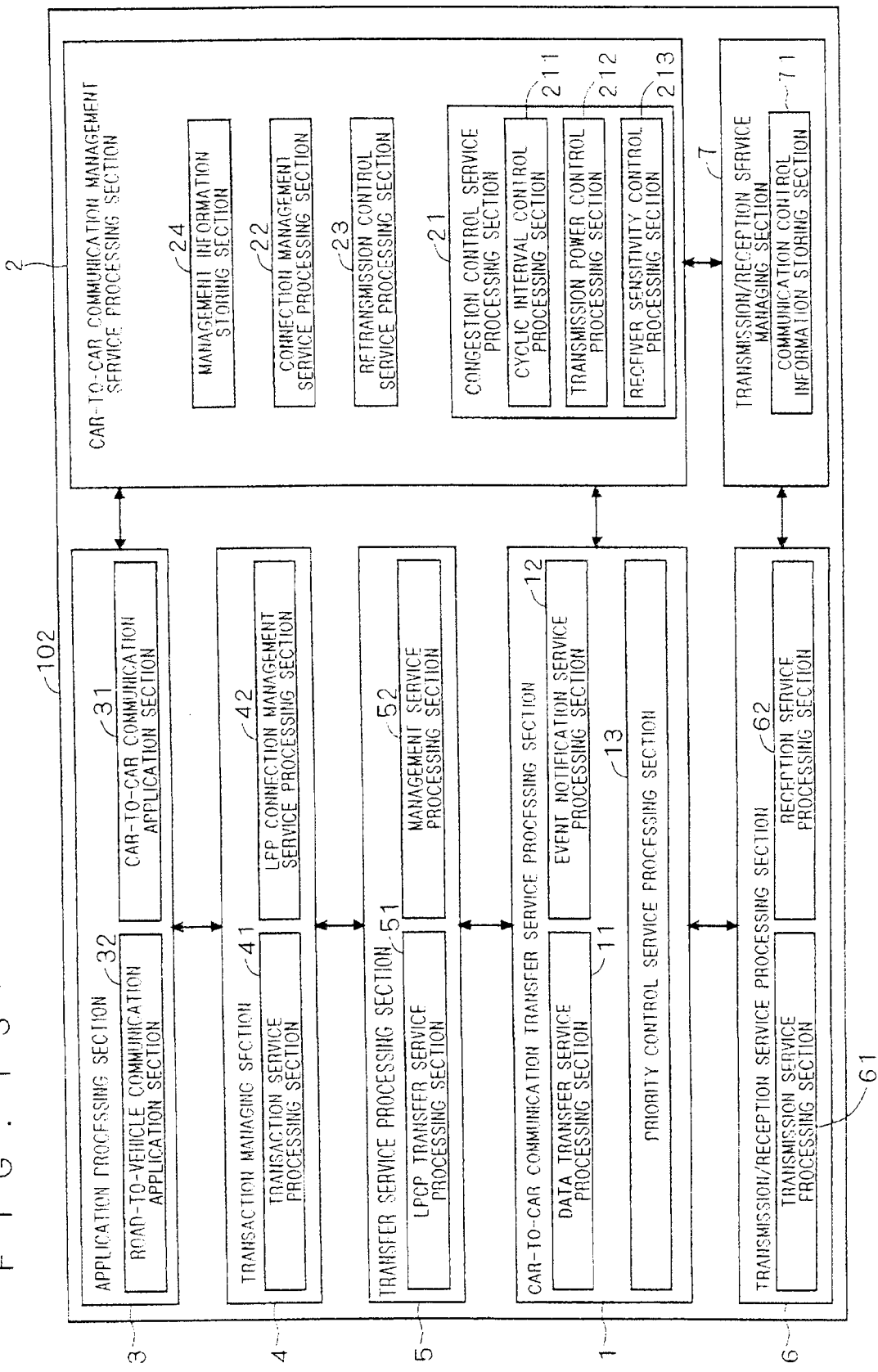
FIG. 73 is a diagram specifically showing a configuration of an on-board communication device according to a third embodiment of the present invention.

FIG. 73 is a block diagram specifically showing a protocol configuration of an on-board communication device 102 and a cooperative road-to-vehicle/car-to-car communication system according to the third embodiment of the present invention. Note that the same elements as those of the first embodiment and the second embodiment are denoted by the same reference numerals, and redundant detailed description is omitted.

As shown in FIG. 73, the on-board communication device 102 has approximately the same configuration as the on-board communication device 100 according to the first embodiment that is described with reference to FIG. 1, but is different from the on-board communication device 101 according to the first embodiment in that the application processing section 3 includes the road-to-vehicle communication application section 32.

(C-2. Operation of on-Board Communication Device 102)

The data transmitted by the road-to-vehicle communication application section 32 is passed to the car-to-car communication transfer service processing section 1 via the transaction processing section 4 and the transfer service processing section 5, as in the on-board communication device 100 according to the first embodiment.

The car-to-car communication transfer service processing section 1 refers to a port number of an LPCP header from the C2C SDU received from the transfer service processing section 5, obtains a type of the application at the same time in obtaining the priority in Step S105 of FIG. 60, and identifies whether it is a road-to-vehicle communication application or a car-to-car communication application.

A message is transmitted/received by applying the transmission/receiving procedure described in the first embodiment in a case where a type of the obtained application is a car-to-car communication application, while in a case of a road-to-vehicle communication application, a message is transmitted by adding the C2C header shown in FIG. 74 in place of the C2C header shown in FIG. 38 and passing it to the transmission/reception service processing section 6 not via the priority control service processing section 13. In this case, a value for road-to-vehicle communication may be defined in the transmission power transmitted by the transmission service processing section 61, and the value may be applied. Alternatively, the car-to-car communication management service processing section 2 may calculate the transmission power suitable for the road-to-vehicle communication. Further, in a case of transmitting information of the road-to-vehicle communication application section 32, the congestion control service and the connection management service may not be provided.

The car-to-car communication management service processing section 2 is capable of increasing the cyclic interval of the car-to-car communication application section 31 of the surrounding station or reducing the transmission power thereof by transmitting a congestion control message by an application notification primitive or an application register primitive from the road-to-vehicle communication application section 32 before transmitting information of the road-to-vehicle communication application section 32.

The car-to-car communication transfer service processing section 1 refers to the C2C header in a case of receiving the transmission data from the reception service processing section 62, and identifies a transfer destination and a reception processing from a data identifier and a PDU identifier. The processing is performed in a similar manner to that of the first embodiment in a case where the data identifier indicates "0" and the PDU identifier indicates "0", while in a case where the data identifier indicates "0" and the PDU identifier indicates "1", the car-to-car communication transfer service processing section 1 extracts the data body and passes it to the transfer service processing section 5, to thereby end the reception processing. In this case, a value for road-to-vehicle communication may be defined as the receiver sensitivity set by the reception service processing section 62 and the value may be applied. Alternatively, the car-to-car communication management service processing section 2 may calculate the receiver sensitivity suitable for road-to-vehicle communication.

In a case of receiving data of the road-to-vehicle communication application section 32, the car-to-car communication transfer service processing section 1 issues an event notification primitive to the car-to-car communication management service processing section 2, and notifies that a roadside device is present in the vicinity of own station. As a result, the car-to-car communication management service processing section 2 sets the transmission power in transmitting the data of the car-to-car communication application section 31 to be smaller than a value set by congestion control service, or sets the cyclic interval to be longer.

(C-3. Effects)

As described above, the on-board communication device 102 according to the third embodiment includes the car-to-car communication application section 31 in the application processing section 3 as in the on-board communication device 100 according to the first embodiment, and thus is capable of providing an application for car-to-car communication. Further, the on-board communication device 102 includes the road-to-vehicle communication application section 32, and thus is capable of providing an application for road-to-vehicle communication.

Further, the car-to-car communication transfer service processing section 1 uses different transmission/receiving procedures depending on whether it is the road-to-vehicle communication application or the car-to-car communication application. Accordingly, in the case of the road-to-vehicle communication application data, the minimum required header information can be added so as to be caused to pass through the data body. As a result the on-board communication device 102 is capable of providing various control services only to the car-to-car communication system without affecting the operation of the existing road-to-vehicle communication system.

Further, the car-to-car communication management service processing section 2 preferentially performs transmission of a road-to-vehicle communication application, whereby it is possible to control the transmission power and cyclic interval of a car-to-car communication application of a surrounding station by a congestion control message. Accordingly, the communication reliability of the road-to-vehicle communication application can be improved.

Further, the car-to-car communication transfer service processing section 1 preferentially transmits/receives a road-to-vehicle communication application by notifying the car-to-car communication management service processing section 2 of the presence or absence of a road-to-vehicle communication application, whereby it is possible to suppress the transmission power of the car-to-car communication application or increase the cyclic interval. Accordingly, the communication reliability of the road-to-vehicle communication application can be improved.

(D. Fourth Embodiment)

(D-1. Protocol Configuration)

A fourth embodiment of the present invention is described with reference to FIG. 75 to FIG. 77. Note that the same elements as those of the first embodiment are denoted by the same reference numerals, and redundant detailed description is omitted.

FIG. 75 is a block diagram showing a configuration of an on-board communication device 103 according to the fourth embodiment of the present invention. As shown in FIG. 75, the on-board communication device 103 has approximately the same configuration as the on-board communication device 100 according to the first embodiment that is descried with reference to FIG. 1. However, the on-board communication device 103 is different from the on-board communication device 100 according to the first embodiment in that the transaction managing section 4 and the transfer service processing section 5 are replaced with a wireless access in vehicular environments (WAVE) transfer section 9 and that the car-to-car communication management service processing section 2 is included in a WAVE managing section 10.

The WAVE transfer section 9 is a protocol referred to as a WAVE short message protocol (WSMP) in IEEE1609.3, and provides the service of transmitting data in accordance with a request from the application processing section 3 and provides the service of notifying the application processing section 3 of the received data.

The WAVE managing section 10 has a management function referred to as WME in IEEE 1609.3, and provides the connection management service in accordance with a request from the application processing section 3 and provides the information access service of setting/obtaining data that is managed by the WME to the application.

While the configuration of FIG. 3 according to the first embodiment shows the hierarchical structure composed of the transaction managing section 4 (LPP) and the transfer service processing section 5 (LPCP) that are the standards of road-to-vehicle communication in Japan, as sown in FIG. 75, the configuration according to the fourth embodiment is the configuration using the WSMP of the protocol IEEE1609.3 that is the standard for road-to-vehicle communication and car-to-car communication in the US.

Further, the car-to-car communication management service processing section 2 with the configuration of FIG. 3 according to the first embodiment is arranged in a similar manner to the managing section WME of IEEE1609.3, and thus the car-to-car communication management service processing section 2 with the configuration of FIG. 75 according to the fourth embodiment is configured to be included in the WME.

Assuming IEEE802.11p and IEEE1609.4, the transmission/reception service processing section 6 according to the fourth embodiment performs wireless communication with the on-board communication devices 103 mounted in the surrounding stations or switches a frequency channel for performing wireless communication.

The car-to-car communication transfer service processing section 1 according to the fourth embodiment is provided between the WAVE transfer section 9 and the transmission/reception service processing section 6, and provides a data transfer service and a priority control service to the WAVE transfer section 9 and the WAVE managing section 10. In addition, the car-to-car communication transfer service processing section 1 provides an event notification service to the WAVE management service processing section 10.

The car-to-car communication management service processing section 2 according to the fourth embodiment is provided, within the WAVE managing section 10, as one of functions of the WAVE managing section 10, and provides a congestion control service, a connection management service and a data retransmission service to the application processing section 3 and the car-to-car communication transfer service processing section 1. In addition, the WAVE managing section 10 extends the function of the transmission/reception service managing section 7.

(D-2. Service Interface (SAP))

FIG. 76 is a diagram showing positions of the SAPs in the protocol configuration of the car-to-car communication architecture according to the fourth embodiment of the present invention. FIG. 77 shows a list of the SAPs among the service interfaces of FIG. 76, which are different from those of the first embodiment. The same SAPs as those of the first embodiment have functions equal to those of the SAPs shown in FIG. 18, and thus redundant description is omitted. Further, the description of the parameters of the SAPs shown in FIG. 77 is disclosed in the standard of the IEEE, and those skilled in the art are capable of understanding the parameters by referring to the standard, and thus the description is omitted.

The CMCTL SAP, MLME SAP and PLME SAP of FIG. 18 that are described in the first embodiment are the same SAPs as those of the fourth embodiment, and thus are capable of being used as such. On the other hand, the ACML SAP and ACTL SAP of FIG. 18 are different from the SAPs of the fourth embodiment, and thus the first embodiment cannot be applied as such. Therefore, in the case of the configuration shown in FIG. 76, in order to adapt to the interfaces provided by the WSMP and WME, the ACML SAP is replaced with the WME SAP and the ACTL SAP is replaced with the LSAP in the fourth embodiment.

(D-2-1. SAP of Application and WME (WME SAP))

The WME provides the following six types of primitives to the application, as shown in FIG. 77.

(1) Connection Request Primitive (WME-Application)

There are provided functions and parameters equal to the ACML-Connect primitives according to the first embodiment. The WME-Application primitive is a primitive by which an application requests connection with a surrounding station or becomes disconnected therefrom.

(2) Application Notification Primitive (WME-Notification)

There are provided a function and a parameter equal to the ACML-Notify primitive according to the first embodiment. The WME-Notification is a primitive by which the WAVE managing section 10 makes a notification to the application processing section 3 in a case where a change occurs in the connection status with the surrounding station.

(3) Application Information Registration Primitive (WME-ApplicationRegistration)

There are provided functions and parameters equal to the ACML-Registration primitives and the ACML-Deregistration primitives according to the first embodiment. The WME-ApplicationRegistration primitive is a primitive by which the application information is registered or deregistered.

(4) WME Information Get Primitive (WME-Get)

There are provided functions and parameters equal to the ACML-Get primitive according to the first embodiment. The WME-Get primitives are primitives by which the application obtains information managed by the WME.

(5) WME Information Set Primitive (WME-Set)

There are provided functions and parameters equal to the ACML-Set primitives according to the first embodiment. The WME-Set primitives are primitives by which the application sets the information managed by the WME.

(6) Reception Power Request Primitive (WME-RCPIREQUEST)

They are primitives that are not supported in the first embodiment. The WME-RCPIREQUEST primitives are primitives by which the application requests data transmission for measuring the reception power from a specific car.

(D-2-2. SAP of CTL and WSMP (LSAP))

The CTL provides the WSMP with one type of primitive as shown in FIG. 77. The LSAP is also a primitive provided to the ACTL by the data link layer, and thus even if the CTL is inserted thereinto, there is no effect on communication of IEEE1609.3.

(1) Data Transfer Primitive (UL-UNITDATA)

There are provided functions and parameters equal to the SendData primitive according to the first embodiment. The UL-UNITDATA primitives are primitives by which the WSMP performs data transmission/reception with the CTL.

While names of the SAPs are different from those of the first embodiment as described above, it is possible to provide the data transfer service, event notification service, priority control service, congestion control service, connection management service and data retransmission service that are provided by the CTL and CML of the present invention by replacing the SAPs with the SAPs shown in FIG. 77 even in the case of using IEEE1609.3.

(D-3. Operation Of On-Board Communication Device 103)

In a case where the application processing section 3 transmits data, the data to be transmitted is passed to the WAVE transfer section 9.

The WAVE transfer section 9 provides, to the data passed from the application processing section 3, a WSM header including types of applications, a list of available applications, and available frequency channel information, and passes the data to the car-to-car communication transfer service processing section 1.

The car-to-car communication transfer service processing section 1 obtains the types of applications from the WSM header, and obtains priorities of the corresponding applications from the car-to-car communication management service processing section 2 and the WAVE managing section 10. The car-to-car communication transfer service processing section 1 provides a C2C header, and then passes it to the priority control service processing section 13 to perform priority control. Then, the car-to-car communication transfer service processing section 1 transmits data to the surrounding station via the transmission/reception service processing section 6.

In a case where an error or an event occurs in the car-to-car communication transfer service processing section 1, the event information is notified to the application processing section 3 via the car-to-car communication management service processing section 2, using the CMCTL-EventReport primitive.

In a case where the application processing section 3 requires initial connection, the connection management service is performed using the WME-Application primitive provided by the WAVE managing section 10.

Alternatively, in a case where a parameter for selecting a type of initial connection is added to the WME-Application primitive, it is possible to perform initial connection using the function of the WAVE managing section 10 or perform initial connection using the function of the car-to-car communication management service processing section 2.

The application processing section 3 registers the information of the application that is ready to be provided in the WAVE managing section 10 using the WME-Application-Registration primitive, and deregisters it from the WAVE managing section 10 using the same primitive in a case where the application is unable to be provided.

(D-4. Effects)

As described above, the on-board communication device 103 having the protocol configuration according to the fourth embodiment includes the WAVE transfer section 9 and the WAVE managing section 10, and thus also in an on-board communication device using the protocol of the IEEE, it is possible to obtain an on-board communication device capable of providing services to the road-to-vehicle communication system and the car-to-car communication system, as in the on-board communication device 100 having the protocol configuration according to the first embodiment.

Further, it is possible to achieve the congestion control service that is unable to be provided in the IEEE protocol by providing the car-to-car communication transfer service processing section 1 and the car-to-car communication management service processing section 2 to the on-board device using the IEEE protocol.

(E. Fifth Embodiment)

(E-1. Protocol Configuration)

A fifth embodiment of the present invention is described with reference to FIG. 78 to FIG. 80. Note that the same elements as those of the first embodiment are denoted by the same reference numerals, and redundant detailed description is omitted.

Figure 78:
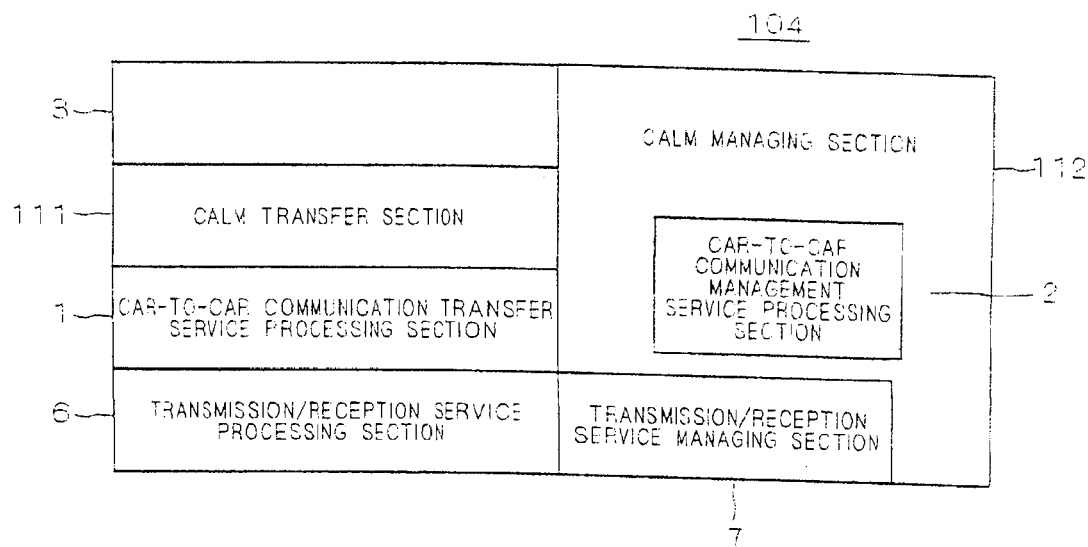
FIG. 78 is a diagram schematically showing a configuration of an on-board communication device according to a fifth embodiment of the present invention.

FIG. 78 is a block diagram showing a configuration of an on-board communication device 104 according to the fifth embodiment of the present invention. As shown in FIG. 78, the on-board communication device 104 has approximately the same configuration of the on-board communication device 100 according to the first embodiment that is described with reference to FIG. 1, but is different from the on-board communication device 100 according to the first embodiment in that the transaction managing section 4 and the transfer service processing section 5 are replaced with a communication access for land mobiles (CALM) transfer section 111 and that the car-to-car communication management service processing section 2 is included in a CALM managing section 112.

The CALM transfer section 111 is composed of protocols referred to as FAST of the CALM, Geo-Routing and local port transport protocol (LPTP), and provides the service of transmitting data in accordance with a request from the application processing section 3 and provides the route search service of sending data to a destination car.

The CALM managing section 112 is a management layer referred to as a CALM management entity (CME) of the CALM, and provides the connection management service in accordance with a request from the application processing section 3 and provides the information access service of setting/obtaining data managed by the CME to the application.

The configuration shown in FIG. 3 according to the first embodiment shows the hierarchical structure composed of the transaction managing section 4 (LPP) and the transfer service processing section 5 (LPCP) that are road-to-vehicle communication standards in Japan. On the other hand, as shown in FIG. 78, the configuration according to the fifth embodiment is made by using a network layer, a transport layer and a management layer of the protocol of the CALM that is the standard of road-to-vehicle communication and car-to-car communication under consideration in Europe.

Further, the car-to-car communication management service processing section 2 with the configuration of FIG. 3 according to the first embodiment is arranged in a similar manner to the management entity CME of the CALM, and thus in the configuration of FIG. 78 according to the fifth embodiment, the car-to-car communication management service processing section 2 is included in the CME.

The transmission/reception service processing section 6 according to the fifth embodiment assumes IEEE802.11p and wireless LAN, and performs wireless communication with the on-board communication devices 104 mounted in surrounding stations.

Further, the transmission/reception service managing section 7 according to the fifth embodiment uses a management layer referred to as an interface management entity (IME) of the CALM.

Further, the car-to-car communication transfer service processing section 1 according to the fifth embodiment is provided between the CALM transfer section 111 and the transmission/reception service processing section 6, and provides the data transfer service and the priority control service to the CALM transfer section 111 and the CALM managing section 112. Further, the car-to-car communication transfer service processing section 1 provides the event notification service to the CALM managing section 112.

Further, the car-to-car communication management service processing section 2 according to the fifth embodiment is provided within the CALM managing section 112, and provides the congestion control service, the connection management service and the data retransmission service to the application processing section 3 and the car-to-car communication transfer service processing section 1. In addition, the CALM managing section 112 extends the function of the transmission/reception service managing section 7.

(E-2. Service Interface (SAP))

Figure 79:
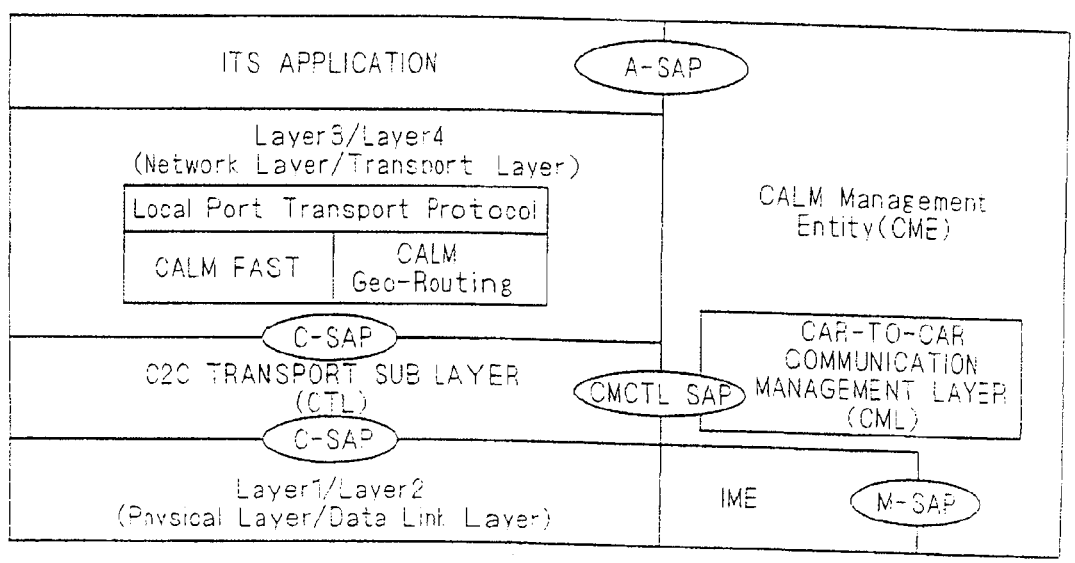
FIG. 79 is a diagram showing service interfaces on a protocol stack according to the fifth embodiment of the present invention.

FIG. 79 is a diagram showing positions of SAPs in the protocol configuration of the car-to-car communication architecture according to the fifth embodiment of the present invention. FIG. 80 shows a list of the SAPs of the service interfaces in FIG. 79, which are different from the first embodiment. The same SAPs as those of the first embodiment have similar functions to those of the SAPs shown in FIG. 18, and thus redundant description is omitted.

Further, while the standard of parameters of the SAPs shown in FIG. 80 is not established in the protocol of the CALM as well as the protocol of the IEEE, a summary at the draft stage can be known. According to this, both protocols have the same types of SAP parameters as those of the present invention, which enables application of the present invention even if the standard has yet to be determined.

For example, in a case of using an A-Command (or A-Request). CommandNo and CommandValue (RequestNo and RequestValue) are designated as the SAP parameters, while in the present application, correspondence is made by defining ACML-Connect, ACML-Notify, ACML-Registration and ACML-Deregistration for each command and request.

Further, in the present application, mibIndex and mibParameter are designated to the ACML-Set and ACML-Get, respectively, to perform setting and obtaining of data, while it is assumed that A-SetParam and A-GetParam are replaced with ParamNo and ParamValue to be achieved, which enables correspondence even if the standard has yet to be determined. Specific description is given below.

The CMCTL SAP of FIG. 18 that is described in the first embodiment is the same SAP as that of the fifth embodiment, and thus is capable of being used as such. However, the ACML SAP, CTL SAP, MLME SAP and PLME SAP of FIG. 18 are SAPs different from those of the fifth embodiment, and thus the first embodiment cannot be applied as such. Therefore, in the case of the protocol configuration shown in FIG. 79, the ACML SAP is replaced with the A-SAP, the CTL SAP is replaced with the C-SAP, and the PLME SAP and PLME SAP are replaced with the M-SAP for correspondence with interfaces provided by the CALM network layer/transport layer and the CME.

(E-2-1. SAP of Application and CME (A-SAP))

The CME provides four types of primitives to the application as shown in FIG. 80.

(1) Command Execution Primitive (A-Command)

The functions and parameters equal to the primitives of the ACML-Connect, ACML-Notify. ACML-Registration and ACML-Deregistration according to the first embodiment are provided, and execution of various commands is requested from the CALM transfer section 111 and the CALM managing section 112.

(2) Request Execution Primitive (A-Request)

Functions and parameters equal to the primitives of the ACML-Connect, ACML-Notify, ACML-Registration and ACML-Deregistration according to the first embodiment are provided, and execution of various commands is requested from the CALM transfer section 111 and the CALM managing section 112.

(3) CME Information Get Primitive (A-GetParam)

This is a primitive that provide the function and parameter equal to the ACML-Get primitive according to the first embodiment and obtains information of the CME.

(4) CME Information Set Primitive (A-SetParam)

This is a primitive that provides the function and parameter equal to the ACML-Set primitive according to the first embodiment and sets information to the CME.

(E-2-2. SAP of CTL and CALM Network Layer/Transport Layer (C-SAP))

The CTL provides the following one type of primitive to the CALM transfer section 111 as shown in FIG. 80. The C-SAP is also a primitive provided to the CALM transfer section 111 by the data link layer, and thus even if the CTL is inserted thereinto, there is no effect on communication of the CALM transfer section 111.

(1) Data Transfer Primitive (UL-UNITDATA)

There are provided the function and parameter equal to the SendData primitive according to the first embodiment. The UL-UNITDATA primitive is a primitive by which the CALM transfer section 111 performs data transmission/reception with the CTL.

(E-2-3. SAP of CME AND IME (M-SAP))

The CME provides the following two types of primitives to the IME as show in FIG. 80.

(1) IME Information Set Primitive (CIMAE-SetParam)

This is a primitive that provides the function and parameter equal to the MLME-Set and PLME-Set primitives according to the first embodiment and obtains information of the IME.

(2) IME Information Get Primitive (CIMAE-GetParam)

This is a primitive that provides the function and parameter equal to the MLME-Get primitive and PLME-Get primitive according to the first embodiment and sets information in the IME.

As described above, while the names of the SAPs are different from those of the first embodiment, when the SAPs used in FIG. 80 are used, it is possible to achieve the functions provided by the CTL and CML of the present invention even in a case where the CALM transfer section 111 and the CALM managing section 112 are used.

(E-3. Operation of on-Board Communication Device 104)

In a case where the application processing section 3 transmits data, the data to be transmitted is passed to the CALM transfer section 111, and the CALM transfer section 111 provides a CALM header including types of applications, a list of available applications and available communication media information and passes it to the car-to-car communication transfer service processing section 1.

The car-to-car communication transfer service processing section 1 obtains a type of the application from the CALM header, and obtains the priority of the corresponding application from the car-to-car communication management service processing section 2 and the CALM managing section 112. The car-to-car communication transfer service processing section 1 provides the C2C header, and then passes it to the priority control service processing section 13 to perform priority control, to thereby transmit the data from the transmission/reception service processing section 6.

In a case where an error or event occurs in the car-to-car communication transfer service processing section 1, the event information is notified to the application processing section 3 via the car-to-car communication management service processing section 2, using the CMCTL-EventReport primitive.

In a case where the application processing section 3 requires initial connection, the connection management service is performed using the A-Command primitive and A-request primitive provided by the CALM managing section 112.

In a case where a parameter by which a type of initial connection is selected is added to the A-Command primitive or A-request primitive, it is possible to perform initial connection using the function of the CALM managing section 112 and perform initial connection using the function of the car-to-car communication management service processing section 2.

The application processing section 3 registers information of the application that is ready to be provided in the CALM managing section 112 using an A-SetParam primitive, and deregisters it from the CALM managing section 112 using the same primitive in a case where the application is unable to be provided.

(E-4. Effects)

As described above, the on-board communication device 104 having the protocol configuration according to the fifth embodiment includes the CALM transfer section 111 and the CALM managing section 112, and thus also in an on-board communication device using the protocol of the CALM, it is possible to obtain an on-board communication device capable of providing services to the road-to-vehicle communication system and the car-to-car communication system, as in the on-board communication device 100 having the protocol configuration according to the first embodiment.

Further, it is possible to achieve the congestion control service that is unable to be provided in the CALM protocol by providing the car-to-car communication transfer service processing section 1 and the car-to-car communication management service processing section 2 to the on-board device using the CALM protocol.

While the invention has been shown and described in detail, the foregoing description is in all aspects illustrative and not restrictive. It is therefore understood that numerous modifications and variations can be devised without departing from the scope of the invention.

The invention claimed is:

1. An on-board communication device, which is mounted in mobile stations or a base station and serves as a receiving side or a transmitting side between said mobile stations and between said mobile stations and said base station through wireless communication, said on-board communication device comprising:
   an application processing section periodically transmitting messages to said on-board communication device on said receiving side;
   a transaction managing section connected to said application processing section and providing at least transaction services including retransmission and division/assembly of said messages received from said application processing section;
   a transfer service processing section connected to said transaction managing section and adding, to said messages received from said transaction managing section, local port numbers for identifying upper protocols including said application processing section;
   a car-to-car communication transfer service processing section connected to said transfer service processing section, transmitting said messages received from said transfer service processing section to said on-board communication device on said receiving side in an order of priorities of applications processed by said application processing section, transmitting/receiving said messages to said transfer service processing section, and notifying event information including error information;
   a transmission/reception service processing section connected to said car-to-car communication transfer service processing section and transmitting/receiving said messages received from said car-to-car communication transfer service processing section to/from said on-board communication device on said receiving side through wireless communication; and
   a car-to-car communication management service processing section connected to said application processing section and said car-to-car communication transfer service processing section, having said priority set by said application processing section, and notifying said priority in response to a request from said car-to-car communication transfer service processing section, wherein:
   said transaction managing section and said transfer service processing section constitute a road-to-vehicle communication protocol for performing road-to-vehicle communication between said mobile stations and said base station;
   said car-to-car communication transfer service processing section notifies said on-board communication device on said receiving side of communication control information of said car-to-car communication management service processing section; and
   said on-board communication device on said receiving side transmits, in said car-to-car communication transfer service processing section, said communication control information provided to said received messages to said car-to-car communication management service processing section, said received messages being transmitted to said transfer service processing section.

2. The on-board communication device according to claim 1, wherein:
   said transmission/reception service processing section further comprises a transmission/reception service managing section managing said communication control information including at least transmission power, receiver sensitivity and communication channel occupancy when said messages are transmitted/received;
   said car-to-car communication management service processing section includes:
   a first interface provided between said transmission/reception service managing section and itself for obtaining said communication channel occupancy from said transmission/reception service managing section and setting said transmission power and said receiver sensitivity to said transmission/reception service managing section;
   a second interface provided between said car-to-car communication transfer service processing section and itself and providing said communication control information to said car-to-car communication transfer service processing section; and
   a third interface provided between said application processing section and itself for setting a cyclic interval of said messages periodically transmitted; and
   via said car-to-car communication management service processing section, said application processing section notifies said car-to-car communication transfer service processing section of said event information, requests transmission of a message designating said cyclic interval, said transmission power and said receiver sensitivity of said receiving side, and sets said transmission power and said receiver sensitivity to said transmission/reception service managing section.

3. The on-board communication device according to claim 2, wherein:
  said car-to-car communication transfer service processing section adds information of said cyclic interval to said transmission power, said receiver sensitivity and said communication channel occupancy obtained from said car-to-car communication management service processing section to make said communication control information, and adds said communication control information to said messages received from said transfer service processing section, to thereby notify said on-board communication device on said receiving side of said communication control information; and
  said car-to-car communication management service processing section on said receiving side determines transmission power, receiver sensitivity and cyclic interval when transmitting the messages from said application processing section on said receiving side, based on said communication control information on said transmitting side.

4. The on-board communication device according to claim 1, wherein said car-to-car communication management service processing section of said on-board communication device on said transmitting side starts transmission of a message for performing initial connection with said on-board communication device on said receiving side to said car-to-car communication management service processing section on said receiving side via said car-to-car communication transfer service processing section, in response to a request from said application processing section.

5. The on-board communication device according to claim 1, wherein said car-to-car communication management service processing section notifies the upper protocols including said application processing section and said transaction managing section of at least a communication connection status and information of an event occurring in said car-to-car communication management service processing section.

6. The on-board communication device according to claim 1, wherein:
  said car-to-car communication transfer service processing section of said on-board communication device on said receiving side receives said messages from said on-board communication device on said transmitting side and sets said communication control information included in said messages to said car-to-car communication management service processing section; and
  said car-to-car communication management service processing section of said on-board communication device on said receiving side starts, upon setting of said communication control information, a connection procedure of initial connection to said on-board communication device on said transmitting side.

7. The on-board communication device according to claim 1, wherein:
  said application processing section registers types of applications in said car-to-car communication management service processing section; and
  said car-to-car communication transfer service processing section obtains and identifies the types of said applications from said car-to-car communication management service processing section using the local port numbers added to said messages to perform a transmitting/receiving processing in accordance with the types of said applications, and transmits said messages to said transmission/reception service processing section in preference to a car-to-car communication application in a case of a road-to-vehicle communication application.

8. An on-board communication device, which is mounted in mobile stations or a base station and serves as a receiving side or a transmitting side between said mobile stations and between said mobile stations and said base station through wireless communication, said on-board communication device comprising:
  an application processing section transmitting messages from said transmitting side to said receiving side using road-to-vehicle communication and car-to-car communication;
  a cooperative road-to-vehicle/car-to-car communication service processing section providing transaction services including retransmission and division/assembly of said messages received from said application processing section, adding local port numbers for identifying upper protocols including said application processing section, and distinguishing transmission destinations of said messages in accordance with said upper protocols;
  a car-to-car communication transfer service processing section transmitting said messages received from said cooperative road-to-vehicle/car-to-car communication service processing section to said on-board communication device on said receiving side in an order of priorities of applications processed by said application processing section;
  a transmission/reception service processing section providing identifies for identification to said messages provided via said car-to-car communication transfer service processing section and said messages directly provided from said cooperative road-to-vehicle/car-to-car communication service processing service, to thereby transmit said messages to said on-board communication device on said receiving side through wireless communication; and
  a car-to-car communication management service processing section having said priority set by said application processing section, and notifying said priority in response to a request from said car-to-car communication transfer service processing section, wherein:
  said cooperative road-to-vehicle/car-to-car communication service processing section distinguishes whether to transmit said messages received from said application processing section by road-to-vehicle communication or car-to-car communication, provides said messages directly to said transmission/reception service processing section in a case of said road-to-vehicle communication, and provides said messages to said transmission/reception service processing section via said car-to-car communication transfer service processing section in a case of said car-to-car communication; and
  said transmission/reception service processing section of said on-board communication device on said receiving side transmits said messages to said cooperative road-to-vehicle/car-to-car communication service processing section or said car-to-car communication transfer service processing section, based on said identifies provided to said messages received from said on-board communication device on said transmitting side.

9. The on-board communication device according to claim 1, wherein:
  said car-to-car communication transfer service processing section notifies said car-to-car communication management service processing section that a message of a road-to-vehicle communication application has been received; and
  said car-to-car communication management service processing section controls, upon reception of the message of said road-to-vehicle communication application, said transmission power and said cyclic interval when transmitting a message of a car-to-car communication application, to thereby preferentially transmit/receive the message of the road-to-vehicle communication application.

10. An on-board communication device, which is mounted in mobile stations or a base station and serves as a receiving side or a transmitting side between said mobile stations and between said mobile stations and said base station through wireless communication, said on-board communication device comprising:
   a car-to-car communication transfer service processing section transmitting messages received from applications to said on-board communication device on said receiving side in an order of priorities of the applications, transmitting/receiving messages corresponding to the applications, notifying event information including error information, and adding communication control information to the messages received from the applications to notify said on-board communication device on said receiving side of said communication control information, the communication control information being obtained by adding information of a cyclic interval to transmission power, receiver sensitivity and communication channel occupancy; and
   a car-to-car communication management service processing section connected to said applications and said car-to-car communication transfer service processing section, having a priority set by the application, notifying said priority in response to a request from said car-to-car communication transfer service processing section, and setting transmission power, receiver sensitivity and cyclic interval when transmitting a message based on said communication control information to transmit, in response to a request from the application, a message for performing initial connection with said on-board communication device to said car-to-car communication management service processing section on said receiving side via said car-to-car communication transfer service processing section, wherein:
   said car-to-car communication transfer service processing section notifies said on-board communication device on said receiving side of the communication control information of said car-to-car communication management service processing section; and
   said on-board communication device on said receiving side transmits, by said car-to-car communication transfer service processing section, said communication control information provided to said received messages to said car-to-car communication management service processing section, and transmits said received messages to the application.

11. An on-board communication device, which is mounted in mobile stations or a base station and serves as a receiving side or a transmitting side between said mobile stations and between said mobile stations and said base station through wireless communication, said on-board communication device comprising:
   an application processing section periodically transmitting messages to said on-board communication device on said receiving side;
   a transfer section connected to said application processing section, transmitting said messages received from said application processing section, and providing, to said messages received from said application processing section, application numbers for identifying upper protocols including said application processing section, a list of available applications, and information of an available frequency channel;
   a car-to-car communication transfer service processing section connected to said transfer section, transmitting said messages received from said transfer section to said on-board communication device on said receiving side in an order or priorities of applications processed by said application processing section, transmitting/receiving said messages to said transfer section, notifying event information including error information, and adding communication control information to said messages received from the applications to notify said on-board communication device on said receiving side of said communication control information, the communication control information being obtained by adding information of a cyclic interval to transmission power, receiver sensitivity and communication channel occupancy;
   a transmission/reception service processing section connected to said car-to-car communication transfer service processing section, and transmitting/receiving said messages received from said car-to-car communication transfer service processing section to/from said on-board communication device on said receiving side through wireless communication;
   a transmission/reception service managing section managing said communication control information including at least transmission power, receiver sensitivity and communication channel occupancy when said transmission/reception service processing section transmits/receives said messages; and
   a managing section connected to said application processing section, said car-to-car communication transfer service processing section and said transmission/reception service managing section, and managing information of said application processing section as well as starting a connection management service in response to a request of said application, wherein:
   said managing section includes a car-to-car communication management service processing section having said priority set by said application processing section, notifying said priority in response to a request from said car-to-car communication transfer service processing section, and determining or setting transmission power, receiver sensitivity and cyclic interval when the messages are sent based on said communication control information;
   said transfer section and said managing section constitute a protocol for performing road-to-vehicle communication and car-to-car communication between said mobile stations and said base station;
   said car-to-car communication transfer service processing section notifies said on-board communication device on said receiving side of said communication control information of said car-to-car communication management service processing section; and
   said on-board communication device on said receiving side transmits, by said car-to-car communication transfer service processing section, said communication control information provided to said received messages to said car-to-car communication management service processing section, said received messages being transmitted to said transfer section.

12. A cooperative road-to-vehicle/car-to-car communication system, which includes said on-board communication device according to claim 1, and performs wireless communication between said mobile stations and between said mobile stations and said base station.

13. A cooperative road-to-vehicle/car-to-car communication system, which includes said on-board communication device according to claim 8, and performs wireless communication between said mobile stations and between said mobile stations and said base station.

14. A cooperative road-to-vehicle/car-to-car communication system, which includes said on-board communication device according to claim 10, and performs wireless communication between said mobile stations and between said mobile stations and said base station.

15. A cooperative road-to-vehicle/car-to-car communication system, which includes said on-board communication device according to claim 11, and performs wireless communication between said mobile stations and between said mobile stations and said base station.

* * * * *